United States Patent
Kuwayama et al.

(10) Patent No.: US 10,065,705 B2
(45) Date of Patent: Sep. 4, 2018

(54) BICYCLE DERAILLEUR

(71) Applicant: Shimano Inc., Sakai, Osaka (JP)

(72) Inventors: Kazuya Kuwayama, Osaka (JP); Atsuhiro Emura, Osaka (JP)

(73) Assignee: Shimano Inc., Osaka (JP)

( * ) Notice: Subject to any disclaimer, the term of this patent is extended or adjusted under 35 U.S.C. 154(b) by 189 days.

(21) Appl. No.: 14/879,410

(22) Filed: Oct. 9, 2015

(65) Prior Publication Data

US 2016/0229488 A1 Aug. 11, 2016

Related U.S. Application Data

(63) Continuation-in-part of application No. 14/614,714, filed on Feb. 5, 2015, now abandoned.

(51) Int. Cl.

| F16H 9/00 | (2006.01) |
|---|---|
| F16H 59/00 | (2006.01) |
| F16H 61/00 | (2006.01) |
| F16H 63/00 | (2006.01) |
| B62M 9/1344 | (2010.01) |
| B62M 9/1342 | (2010.01) |
| B62M 9/1346 | (2010.01) |

(52) U.S. Cl.
CPC ........ B62M 9/1344 (2013.01); B62M 9/1342 (2013.01); B62M 9/1346 (2013.01)

(58) Field of Classification Search
CPC .... B62M 9/1342; B62M 9/137; B62M 25/02; B62M 9/127; B62M 9/1348

USPC .................................................... 474/80, 82
See application file for complete search history.

(56) References Cited

U.S. PATENT DOCUMENTS

| 4,486,182 A | * | 12/1984 | Coue | B62M 9/1342 474/78 |
|---|---|---|---|---|
| 4,617,006 A | * | 10/1986 | Nagano | B62M 9/1342 474/78 |
| 4,833,937 A | * | 5/1989 | Nagano | B62M 9/127 474/82 |
| 5,104,358 A | * | 4/1992 | Kobayashi | B62M 9/1342 474/82 |
| 5,312,301 A | * | 5/1994 | Kobayashi | B62M 9/136 474/140 |
| 5,620,384 A | * | 4/1997 | Kojima | B62M 9/1342 474/123 |

(Continued)

*Primary Examiner* — Henry Y Liu
(74) *Attorney, Agent, or Firm* — Global IP Counselors, LLP

(57) ABSTRACT

A bicycle derailleur is provided with a base member, a chain guide, a linkage assembly and a cable fixing structure. The base member is configured to be mounted to a bicycle frame. The chain guide is movable between retracted and extended positions with respect to the base member. The linkage assembly operatively couples the chain guide to the base member. The cable fixing structure is configured to fix an operation cable that moves the linkage assembly in response to an operation of the operation cable. The cable fixing structure is mounted to one of the chain guide and the linkage assembly. The cable fixing structure includes a cable attachment member to which the operation cable is fixed. The cable attachment member is movable with respect to the one of the chain guide and the linkage assembly with the operation cable being fixed to the cable attachment member.

22 Claims, 35 Drawing Sheets

(56) References Cited

U.S. PATENT DOCUMENTS

| | | | | |
|---|---|---|---|---|
| 5,857,932 | A * | 1/1999 | Sugimoto | B62L 1/14 188/24.22 |
| 5,865,698 | A * | 2/1999 | Huang | B62M 9/1242 474/80 |
| 6,066,057 | A * | 5/2000 | Nakamura | B62M 9/122 280/216 |
| RE36,830 | E * | 8/2000 | Lumpkin | B62M 9/127 474/79 |
| 6,135,905 | A * | 10/2000 | Soon | B62M 9/00 180/231 |
| 6,234,927 | B1 * | 5/2001 | Peng | B62M 9/1342 474/80 |
| 6,341,538 | B1 * | 1/2002 | Takachi | B62M 9/137 188/24.19 |
| 6,405,613 | B1 * | 6/2002 | Lim | B62M 25/02 474/80 |
| 6,419,602 | B1 * | 7/2002 | Soon | B62M 9/00 474/80 |
| 6,470,767 | B2 * | 10/2002 | Takachi | B62M 9/137 188/24.21 |
| 6,482,115 | B2 * | 11/2002 | Takachi | B62M 9/137 188/24.19 |
| 6,491,597 | B2 * | 12/2002 | Chen | B62M 9/1342 474/80 |
| 6,837,815 | B2 * | 1/2005 | Meggiolan | B62M 9/1242 474/82 |
| 6,923,740 | B2 * | 8/2005 | Nanko | B62M 9/1342 474/78 |
| 7,014,584 | B2 * | 3/2006 | Nanko | B62M 9/1342 474/80 |
| 7,081,058 | B2 * | 7/2006 | Nankou | B62M 9/1348 474/80 |
| 7,104,908 | B2 * | 9/2006 | Nagano | B62M 9/126 474/82 |
| 7,186,194 | B2 * | 3/2007 | Nankou | B62M 9/1348 474/80 |
| 7,677,998 | B2 * | 3/2010 | Tetsuka | B62M 9/1342 474/80 |
| 7,824,285 | B2 * | 11/2010 | Tan | B62M 9/1244 474/80 |
| 7,914,407 | B2 * | 3/2011 | Fukushima | B62M 9/1342 474/80 |
| 8,662,258 | B2 | 3/2014 | Watarai et al. | |
| 2004/0127314 | A1 * | 7/2004 | Nanko | B62M 9/1342 474/80 |
| 2004/0166973 | A1 * | 8/2004 | Nanko | B62M 9/1342 474/80 |
| 2006/0135301 | A1 * | 6/2006 | Shahana | B62M 9/1248 474/82 |
| 2008/0153639 | A1 * | 6/2008 | Tan | B62M 9/127 474/80 |
| 2008/0182689 | A1 * | 7/2008 | Fujii | B62M 9/136 474/82 |
| 2008/0300076 | A1 * | 12/2008 | Fukushima | B62M 9/1342 474/80 |
| 2009/0054183 | A1 * | 2/2009 | Takachi | B62M 9/121 474/80 |
| 2013/0079184 | A1 * | 3/2013 | Yamaguchi | B62M 9/124 474/80 |
| 2014/0349793 | A1 * | 11/2014 | Emura | B62M 9/137 474/80 |

* cited by examiner

BICYCLE DERAILLEUR

CROSS-REFERENCE TO RELATED APPLICATIONS

This application is a continuation-in-part application of patent application Ser. No. 14/614,714 that was filed on Feb. 5, 2015. The entire disclosure of patent application Ser. No. 14/614,714 is hereby incorporated herein by reference.

BACKGROUND

Field of the Invention

This invention generally relates to a bicycle derailleur. More specifically, the present invention relates to a bicycle derailleur having a cable fixing structure configured to fix an operation cable that moves a chain guide relative to a base member via a linkage assembly in response to an operation of the operation cable.

Background Information

A bicycle typically uses a chain drive transmission for transmitting a pedaling force to a rear wheel. The chain drive transmission of a bicycle often uses one or two derailleurs to selectively move a chain from one of a plurality of sprockets to another for changing speeds of the bicycle. A typical derailleur has a base member, a chain guide and a linkage assembly (e.g., a moving mechanism) coupled between the base member and the chain guide so that the chain guide moves laterally relative to the base member. A spring typically biases the chain guide to either an innermost or outermost position relative to the sprockets. A Bowden-type control cable is typically coupled between the derailleur and a conventional shift control device. The Bowden-type control cable has an outer casing (sheath) and an inner operation cable. The inner operation cable is slidably disposed within the outer casing. Often, a barrel adjuster (an inline hollow bolt) is provided for adjusting the cable tension of the inner operation cable, which effectively lengthens or shortens the length of the outer casing relative to a fixed anchor point. Lengthening the outer casing (turning the barrel adjuster out) tightens the inner operation cable, while shortening the outer casing (turning the barrel adjuster in) loosens the inner operation cable. The chain guide of the derailleur is moved laterally by moving the linkage assembly via the inner operation cable sliding within the outer casing. Pulling the inner operation cable moves the movable member and the chain guide against the biasing force of the spring, while releasing the inner operation cable causes the movable member and the chain guide to move due to the biasing force of the spring.

SUMMARY

One aspect is to provide a bicycle derailleur having a cable fixing structure configured to fix an operation cable that moves a chain guide relative to a base member via a linkage assembly in response to an operation of the operation cable.

In view of the state of the known technology and in accordance with a first aspect of the present disclosure, a bicycle derailleur is basically provided with a base member, a chain guide, a linkage assembly and a cable fixing structure. The base member is configured to be mounted to a bicycle frame. The chain guide is configured to be movable between a retracted position and an extended position with respect to the base member. The linkage assembly operatively couples the chain guide to the base member. The cable fixing structure is configured to fix an operation cable that moves the linkage assembly in response to an operation of the operation cable. The cable fixing structure is mounted to one of the chain guide and the linkage assembly. The cable fixing structure includes a cable attachment member to which the operation cable is fixed. The cable attachment member is movable with respect to the one of the chain guide and the linkage assembly in a state where the operation cable is fixed to the cable attachment member.

In accordance with a second aspect of the present invention, the bicycle derailleur according to the first aspect is configured so that the cable fixing structure includes a cable tension adjusting structure that is configured to move the cable attachment member relative to the one of the chain guide and the linkage assembly.

In accordance with a third aspect of the present invention, the bicycle derailleur according to the first aspect is configured so that the cable fixing structure is mounted to the linkage assembly.

In accordance with a fourth aspect of the present invention, the bicycle derailleur according to the second aspect is configured so that the cable tension adjusting structure includes an adjusting member to adjust a position of the cable attachment member with respect to the one of the chain guide and the linkage assembly.

In accordance with a fifth aspect of the present invention, the bicycle derailleur according to the fourth aspect is configured so that the adjusting member is a screw that is threaded into a bore of the one of the chain guide and the linkage assembly.

In accordance with a sixth aspect of the present invention, the bicycle derailleur according to the fourth aspect is configured so that the adjusting member is configured to abut the cable attachment member for restricting a movement of the cable attachment member in a cable releasing direction.

In accordance with a seventh aspect of the present invention, the bicycle derailleur according to the first aspect is configured so that the cable attachment member is configured to be movable in a cable pulling direction in the state where the operation cable is fixed to the cable attachment member.

In accordance with an eighth aspect of the present invention, the bicycle derailleur according to the first aspect is configured so that the cable attachment member includes a restricting structure that is configured to selectively restrict a movement of the cable attachment member in a cable pulling direction.

In accordance with a ninth aspect of the present invention, the bicycle derailleur according to the eighth aspect is configured so that the restricting structure includes a first tool access portion, which is configured for a tool to access in order to restrict the movement of the cable attachment member in the cable pulling direction.

In accordance with a tenth aspect of the present invention, the bicycle derailleur according to the ninth aspect is configured so that the cable fixing structure includes a cable tension adjusting structure configured to move the cable attachment member relative to the one of the chain guide and the linkage assembly. The cable tension adjusting structure includes an adjusting member to adjust a position of the cable attachment member with respect to the one of the chain guide and the linkage assembly. The adjusting member includes a second tool access portion, which is configured for the tool to access to operate the adjusting member, the first and second tool access portions have profiles configured such that the tool can access both the first and second tool access portions.

In accordance with an eleventh aspect of the present invention, the bicycle derailleur according to the ninth aspect is configured so that the cable fixing structure includes a cable tension adjusting structure configured to move the cable attachment member relative to the one of the chain guide and the linkage assembly. The cable tension adjusting structure includes an adjusting member to adjust a position of the cable attachment member with respect to the one of the chain guide and the linkage assembly. The adjusting member includes a second tool access portion, which is configured for a tool to access to operate the adjusting member. The second tool access portion is arranged relative to the one of the chain guide and the linkage assembly to prohibit the tool from accessing the second tool access portion while the chain guide is positioned in one of the retracted position and the extended position.

In accordance with a twelfth aspect of the present invention, the bicycle derailleur according to the first aspect is configured so that the cable fixing structure includes a fastener to fix the operation cable to the cable attachment member. The fastener extends through the cable attachment member in a direction of a fixing axis.

In accordance with a thirteenth aspect of the present invention, the bicycle derailleur according to the twelfth aspect is configured so that the cable attachment member is rotatably mounted around the fixing axis.

In accordance with a fourteenth aspect of the present invention, the bicycle front derailleur according to the thirteenth aspect is configured so that the cable fixing structure includes a cable tension adjusting structure configured to move the cable attachment member relative to the one of the chain guide and the linkage assembly. The cable tension adjusting structure includes an adjusting member to adjust a position of the cable attachment member with respect to the one of the chain guide and the linkage assembly. The adjusting member is configured to abut an abutment of the cable attachment member to define an angular position of the cable attachment member about the fixing axis.

In accordance with a fifteenth aspect of the present invention, the bicycle cable fixing structure according to the fourteenth aspect is configured so that the fastener is rotatably mounted in a fixing direction about the fixing axis to fix the operation cable to the cable attachment member. The adjusting member is disposed at a downstream side of the abutment with respect to the fixing direction.

In accordance with a sixteenth aspect of the present invention, the bicycle cable fixing structure according to the fifteenth aspect is configured so that the linkage assembly includes a first link pivotally coupled to the base member about a mounting axis. The fixing axis extends along a second reference plane that is perpendicular to the mounting axis.

In accordance with a seventeenth aspect of the present invention, the bicycle cable fixing structure according to the fifteenth aspect is configured so that the adjusting member includes a second tool access portion, which is configured for a tool to access to operate the adjusting member. The second tool access portion is accessibly arranged relative to the one of the chain guide and the linkage assembly to allow the tool to access the second tool access portion while the chain guide is positioned in the retracted position and while the chain guide is positioned in the extended position.

In accordance with an eighteenth aspect of the present invention, the bicycle cable fixing structure according to the fifteenth aspect is configured so that the adjusting member includes a second tool access portion, which is configured for a tool to access to operate the adjusting member. The second tool access portion is accessibly arranged relative to the one of the chain guide and the linkage assembly to allow the tool to access the second tool access portion from a side opposite to the bicycle frame in a state where the base member is mounted to the bicycle frame.

In accordance with a nineteenth aspect of the present invention, the bicycle derailleur according to the first aspect is configured so that the cable fixing structure is free of an outer casing holder in which an end of an outer casing of the operation cable is held.

In accordance with a twentieth aspect of the present invention, the bicycle derailleur according to the fourth aspect is configured so that the cable attachment member includes a cable clamping portion to which the operation cable is clamped. The cable attachment member is configured to selectively rotate in a cable pulling direction and a cable releasing direction by the operation of the adjusting member.

In accordance with a twenty-first aspect of the present invention, the bicycle derailleur according to the first aspect is configured so that the linkage assembly includes first and second links pivotally coupling the chain guide to the base member, and an input link pivotally mounted to the base member to transmit a pulling force of the operation cable to one of the first and second links. The cable fixing structure is mounted to the input link.

In accordance with a twenty-second aspect of the present invention, the bicycle derailleur according to the twenty-first aspect is configured so that the linkage assembly includes at least one connecting link operatively connecting the input link to one of the first and second links.

In accordance with a twenty-third aspect of the present invention, the bicycle derailleur according to the twenty-first aspect is configured an that the cable attachment member is rotatably mounted to the input link.

In accordance with a twenty-fourth aspect of the present invention, the bicycle derailleur according to the twenty-third aspect is configured so that the cable fixing structure includes a cable tension adjusting structure configured to move the cable attachment member relative to the input link. The cable tension adjusting structure includes an adjusting member to adjust a position of the cable attachment member with respect to the input link. The adjusting member is a screw that is threaded into a bore of the input link.

In accordance with a twenty-fifth aspect of the present invention, the bicycle derailleur according to the first aspect further comprises a cover configured to be detachably attached to the one of the chain guide and the linkage assembly to cover the cable fixing structure.

In accordance with a twenty-sixth aspect of the present invention, the bicycle derailleur according to the twenty-fifth aspect is configured so that the cover includes a cable holder configured to hold an end of the operation cable.

In accordance with a twenty-seventh aspect of the present invention, a bicycle cable fixing structure is provided that is configured to fix an operation cable that moves a bicycle component in response to an operation of the operation cable. The bicycle cable fixing structure basically comprises a cable attachment member and a cable tension adjusting structure. The cable attachment member is configured to have the operation cable fixed thereto by a fastener. The cable attachment member has a fixing axis. The cable tension adjusting structure is configured to move the cable attachment member in a direction parallel to a first reference plane that is perpendicular to the fixing axis while in a state where the operation cable is fixed to the cable attachment member.

In accordance with a twenty-eighth aspect of the present invention, the bicycle cable fixing structure according to the twenty-seventh aspect is configured so that the cable attachment member is rotatably mounted around the fixing axis of the fastener.

In accordance with a twenty-ninth aspect of the present invention, the bicycle cable fixing structure according to the twenty-seventh aspect is configured so that the cable attachment member is configured to be slidable in the direction parallel to the first reference plane.

In accordance with a thirtieth aspect of the present invention, the bicycle cable fixing structure according to the twenty-seventh aspect is configured so that the base member includes a first indicator and the linkage assembly includes a second indicator, the first and second indicators being configured to indicate a first initial position of the linkage assembly with respect to the base member.

Also other objects, features, aspects and advantages of the disclosed bicycle derailleur will become apparent to those skilled in the art from the following detailed description, which, taken in conjunction with the annexed drawings, discloses several illustrative embodiments of the bicycle derailleur.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
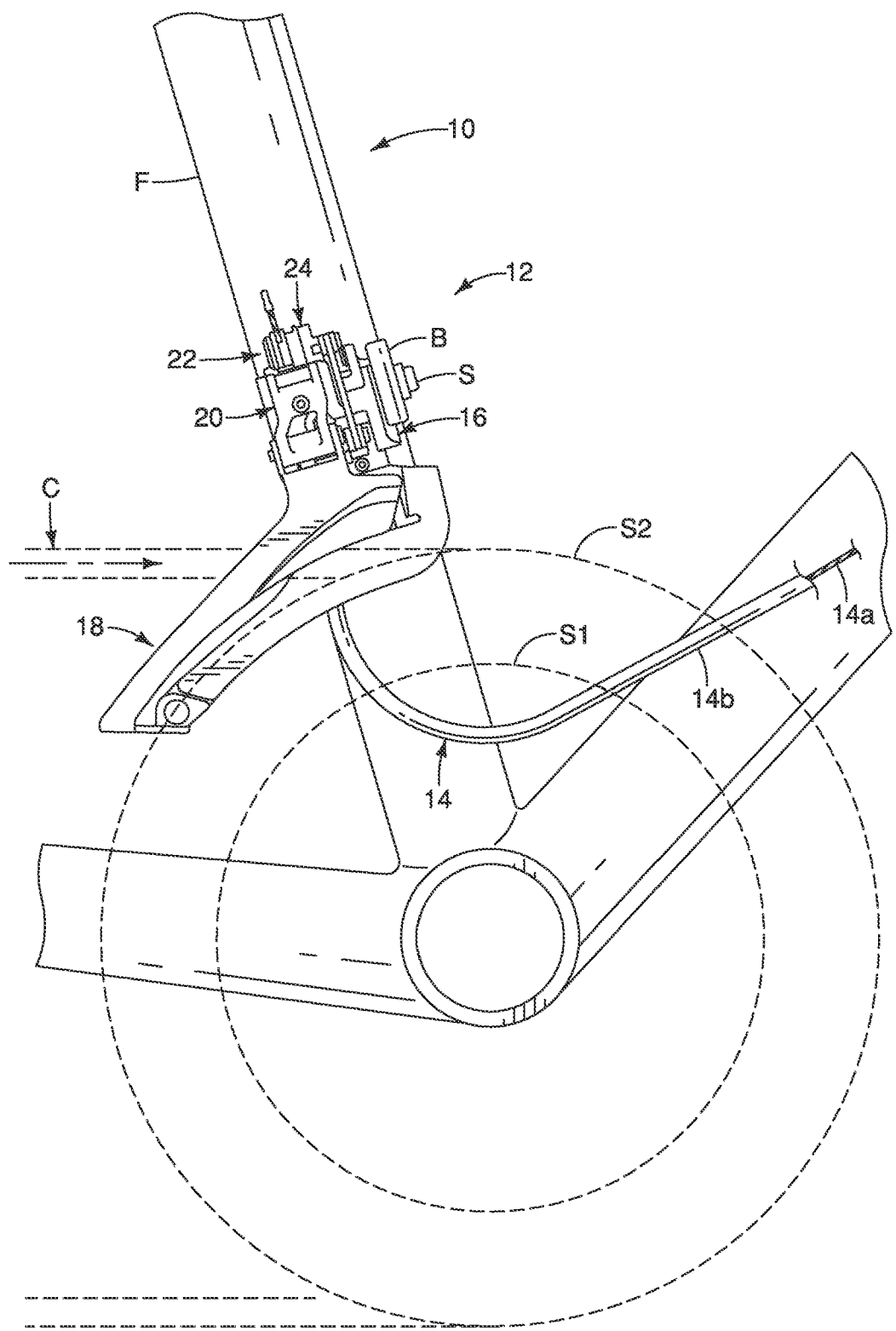
FIG. 1 is a partial side elevational view of a bicycle frame with a bicycle front derailleur mounted thereto in accordance with a first illustrated embodiment.
Figure 2:
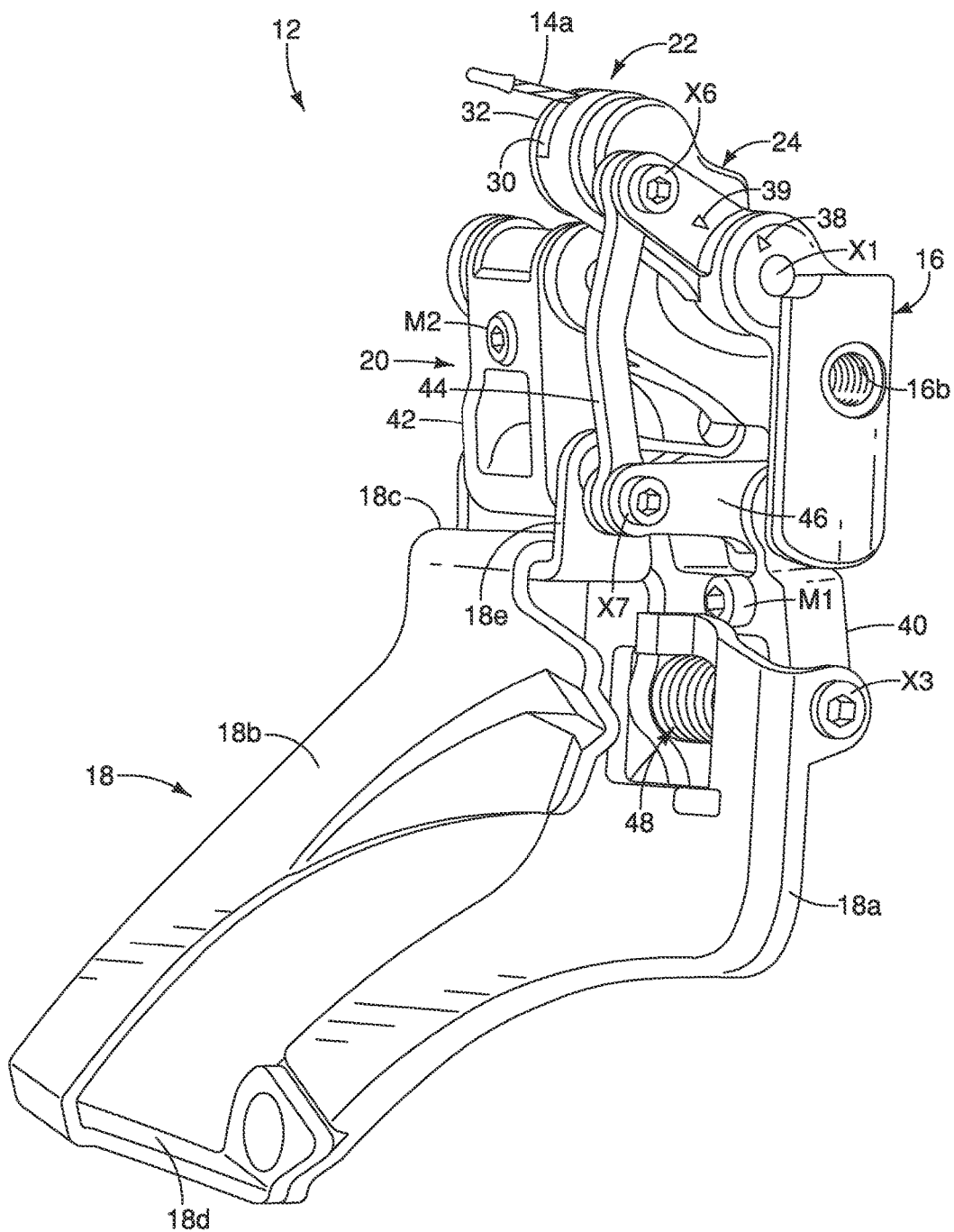
FIG. 2 is an outer side perspective view of the front derailleur illustrated in FIG. 1.

Referring initially to FIG. 1, a portion of a bicycle 10 is illustrated that is equipped with a bicycle derailleur 12 in accordance with a first embodiment. Here, the bicycle derailleur 12 is mounted to a bicycle frame F of the bicycle 10. In particular, the bicycle derailleur 12 is mounted to the seat tube of the bicycle frame F by a bracket B. Thus, the bicycle derailleur 12 is a front derailleur in the first embodiment. It will be apparent to those skilled in the bicycle field from this disclosure that certain aspects of the present invention can be applied to a rear derailleur. Thus, certain aspects of the present invention are not limited to a front derailleur as shown. For the sake of convenience, the bicycle derailleur 12 shall be hereinafter referred to the front derailleur 12.

The front derailleur 12 is a cable operated derailleur that is operated in response to the operation of a shifter (not shown) in a conventional manner. In particular, the front derailleur 12 is operated by a bicycle component control cable 14 that has a first end connected to the front derailleur 12 and a second end connected to the shifter. The control cable 14 is a conventional bicycle component control cable that has an inner operation cable 14a covered by an outer casing 14b. In other words, the bicycle component control cable 14 is a Bowden type cable in which the inner operation cable 14a is slidably disposed within the outer casing 14b. The inner operation cable 14a is a flexible cable that typically made of a metallic material such as stainless steel. The outer casing 14b is a flexible hollow tube that typically made of a plastic material, and is often lined with nylon.

The shifter (not shown) operates the front derailleur 12 by selectively pulling and releasing the inner operation cable 14a in response to operation of a shifter. Thus, the inner operation cable 14a transmits mechanical force or energy from shifter (not shown) to the front derailleur 12 by the movement of the inner operation cable 14a. It will be apparent to those skilled in the bicycle field from this disclosure that the inner operation cable 14a can be used without having the outer casing 14b. Thus, hereinafter, the inner operation cable 14a will be simply referred to as an operation cable.

Referring to FIGS. 2 to 7, the front derailleur 12 basically comprises abuse member 16, a chain guide 18, a linkage assembly 20 and a cable fixing structure 22. The chain guide 18 is configured to be movable between a retracted position and an extended position with respect to the base member 16 via the linkage assembly 20. In other words, the linkage assembly 20 operatively couples the chain guide 18 to the base member 16. Basically, the chain guide 18 moves a chain C in a transverse direction with respect to a center longitudinal plane of the bicycle frame F. In particular, the chain guide 18 is movably supported to the base member 16 by the linkage assembly 20 for moving the chain guide 18 relative to the base member 16 in response to operation of the operation cable 14a. Here, the bicycle frame F is provided with a pair of chain rings S1 and S2. Of course, the bicycle frame F can be provided with more than two chain rings as needed and/or desired. The chain guide 18 is designed to shift the chain C between the chain rings S1 and S2 as the chain guide 18 moves between a retracted position and an extended position depending on whether the operation cable 14a is pulled or released.

Specifically, the cable fixing structure 22 is mounted to one of the chain guide 18 and the linkage assembly 20. Here, in the first embodiment, the cable fixing structure 22 is mounted to the linkage assembly 20. In particular, in the first embodiment, the linkage assembly 20 includes an input link 24 that is pivotally mounted to the base member 16 about a pivot axis A1 by a first pivot axle X1.

Figure 6:
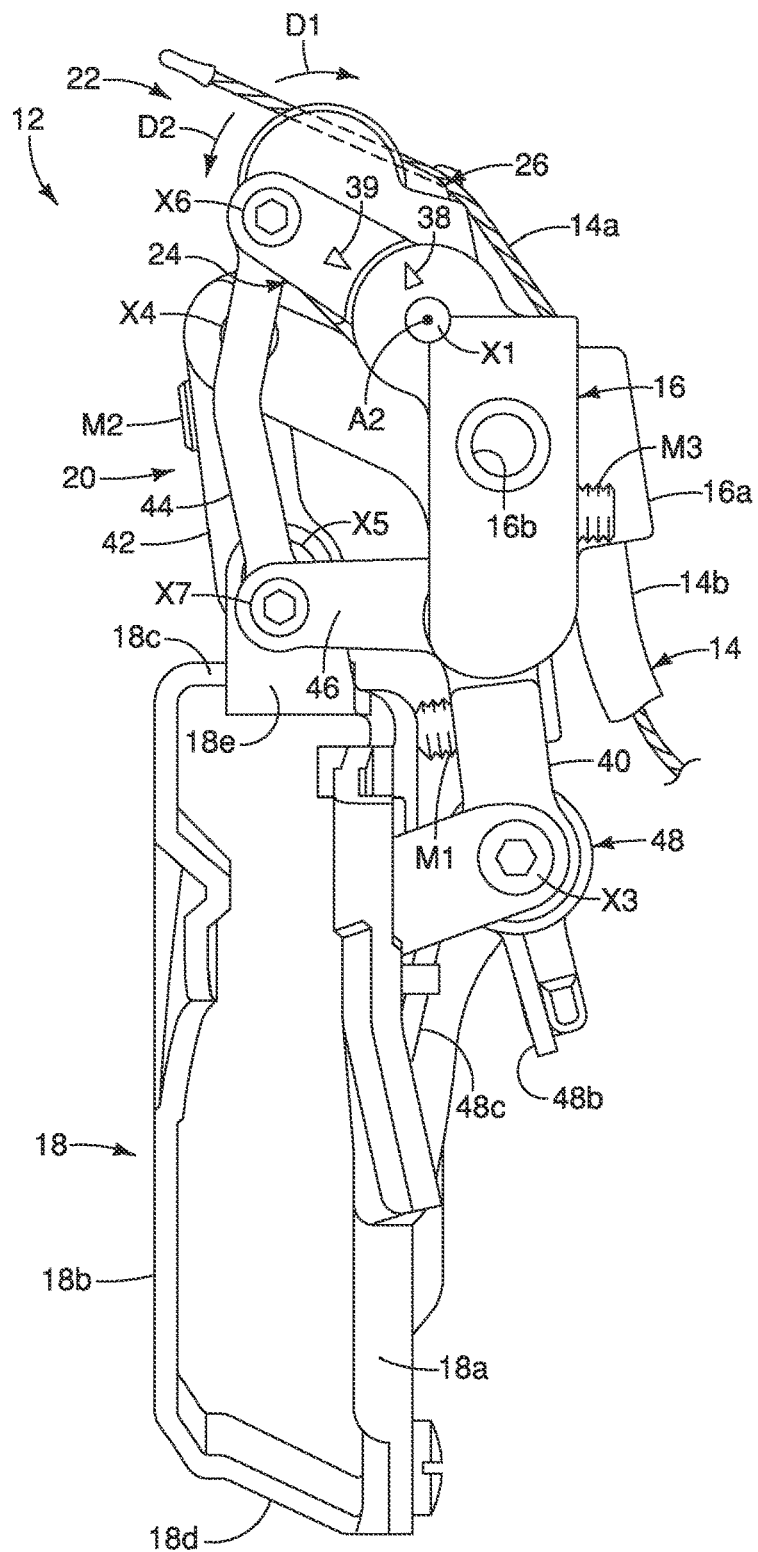
FIG. 6 is a front elevational view of the front derailleur illustrated in FIGS. 1 to 5 in which the chain guide is disposed the retracted position (i.e., the closest position with respect to the bicycle frame)
Figure 7:
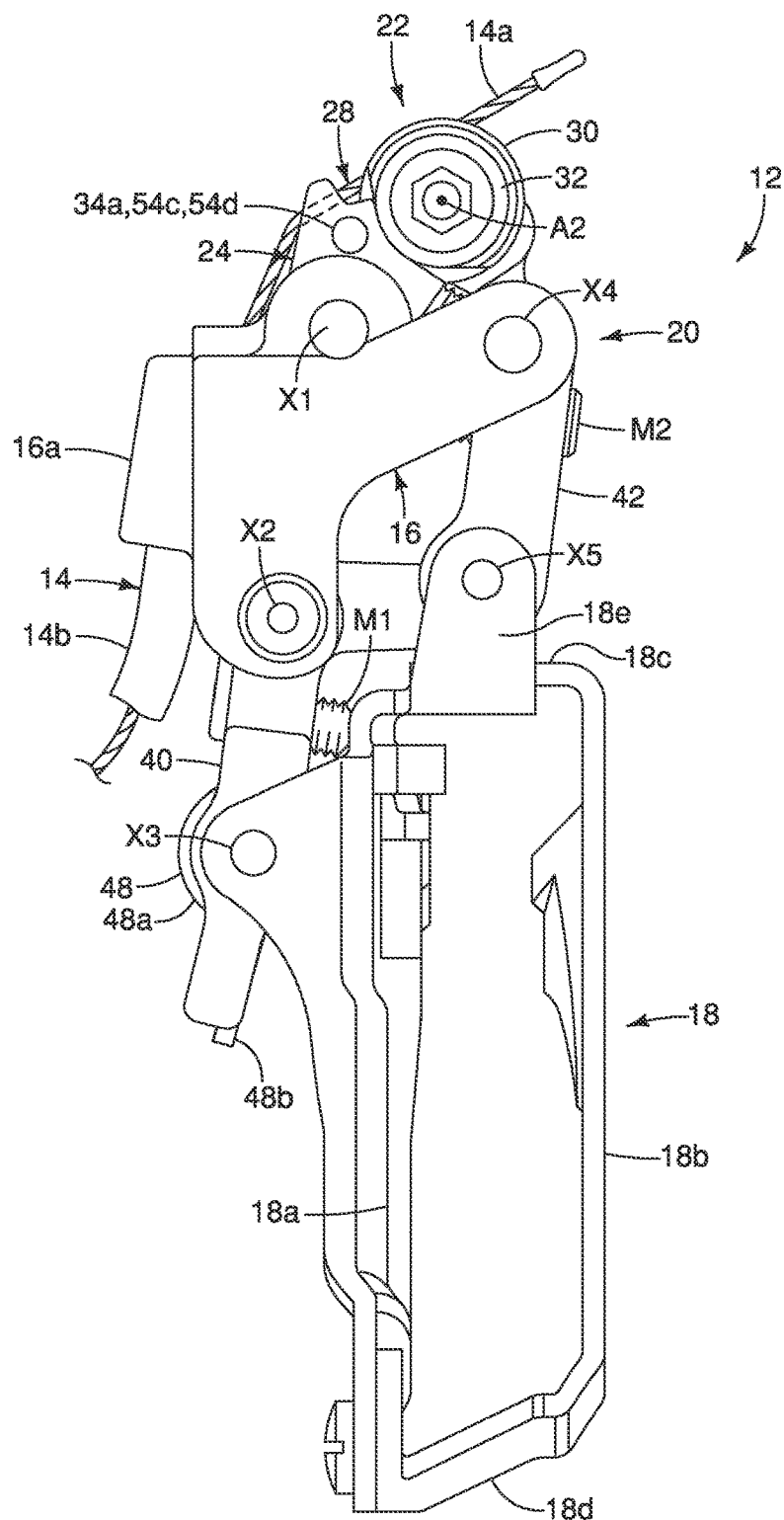
FIG. 7 is a rear elevational view of the front derailleur illustrated in FIGS. 1 to 6 in which the chain guide is disposed the retracted position (i.e., the closest position with respect to the bicycle frame)
Figure 8:
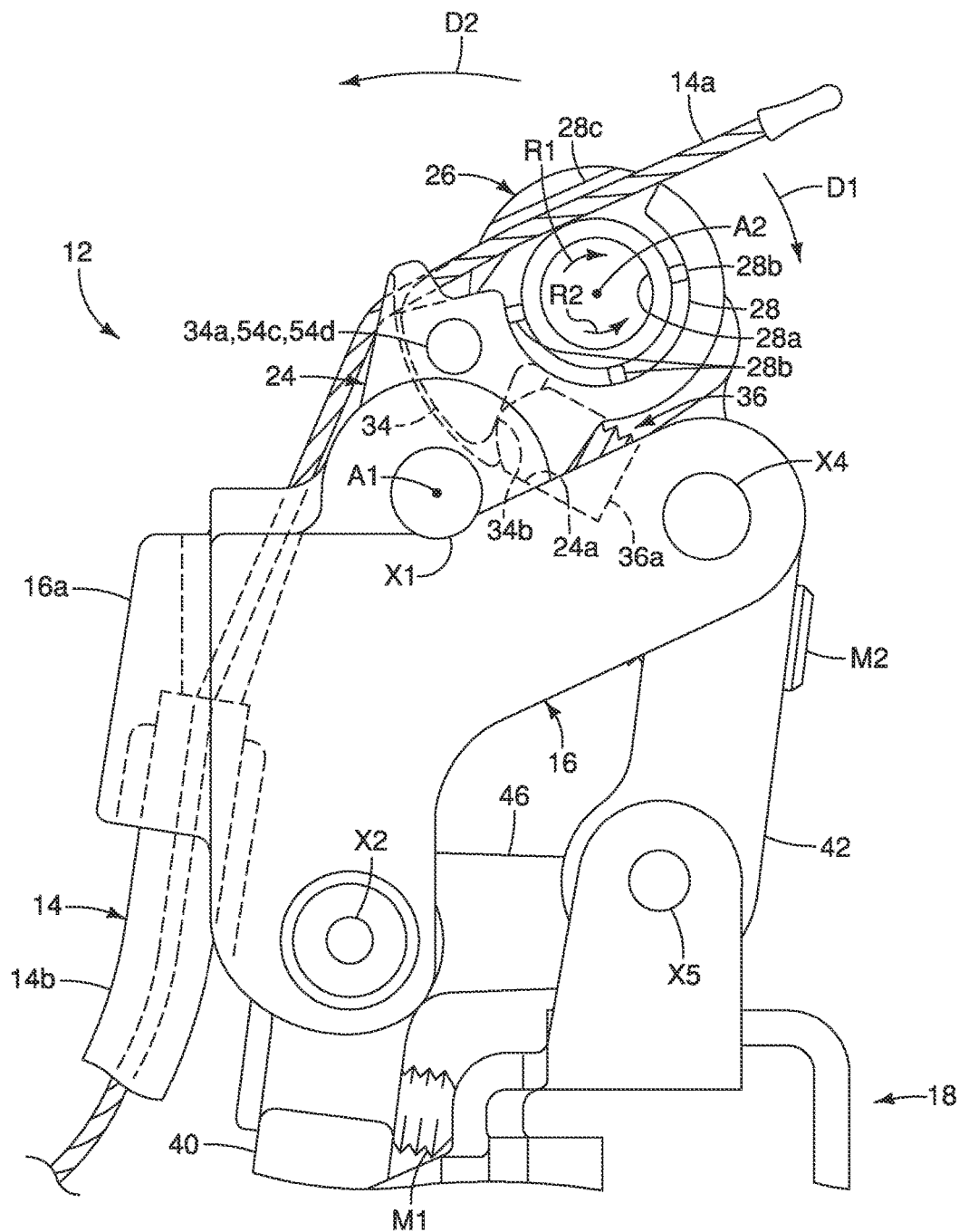
FIG. 8 is an enlarged, elevational view of a portion of the front derailleur illustrated in FIGS. 1 to 7 in which the chain guide is disposed the retracted position (i.e., the closest position with respect to the bicycle frame), and in which the cable attachment member has been removed.
Figure 10:
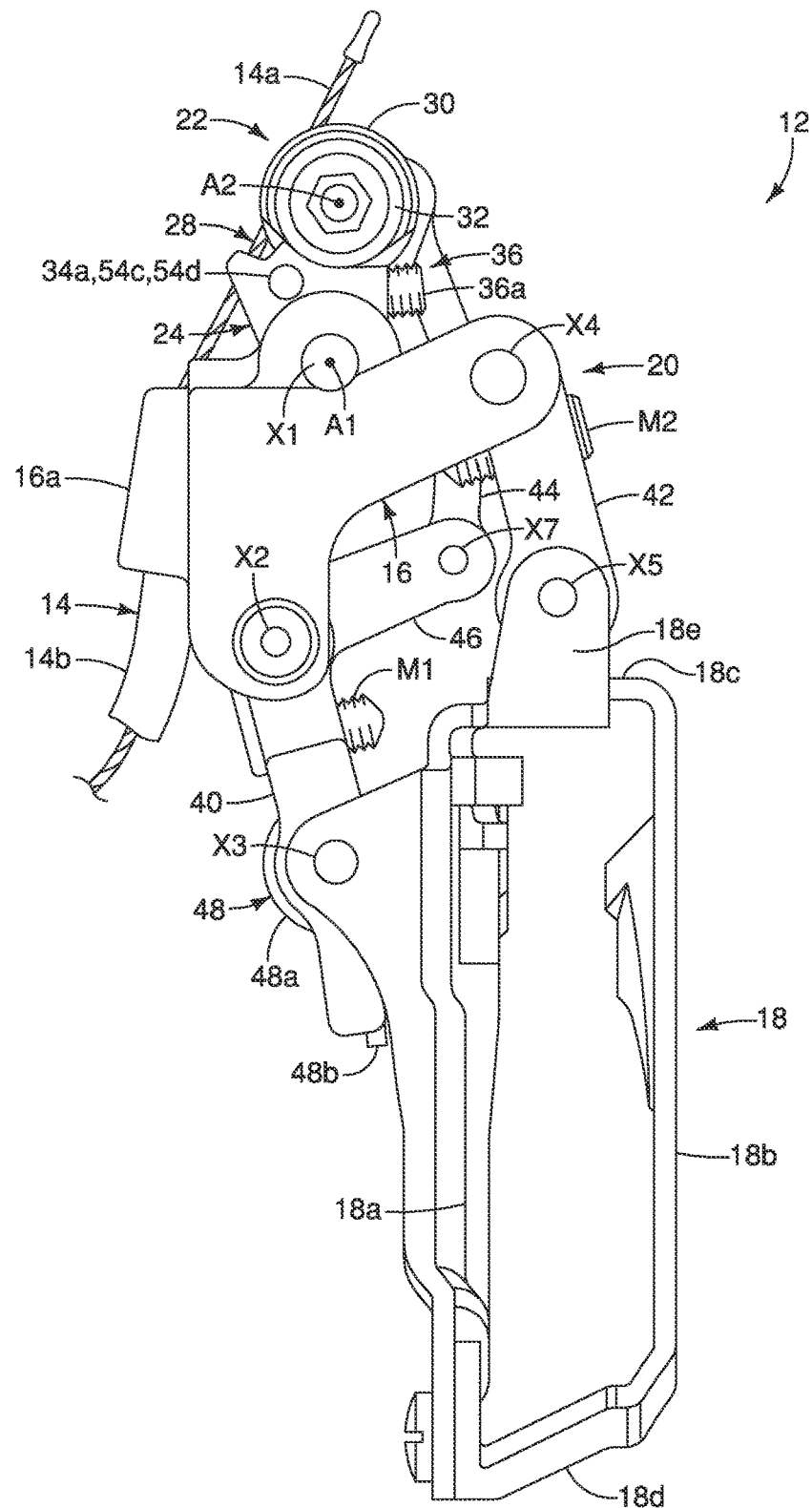
FIG. 10 is a rear elevational view of the front derailleur illustrated in FIGS. 1 to 9 in which the chain guide is disposed the extended position (i.e., the farthest position with respect to the bicycle frame)
Figure 11:
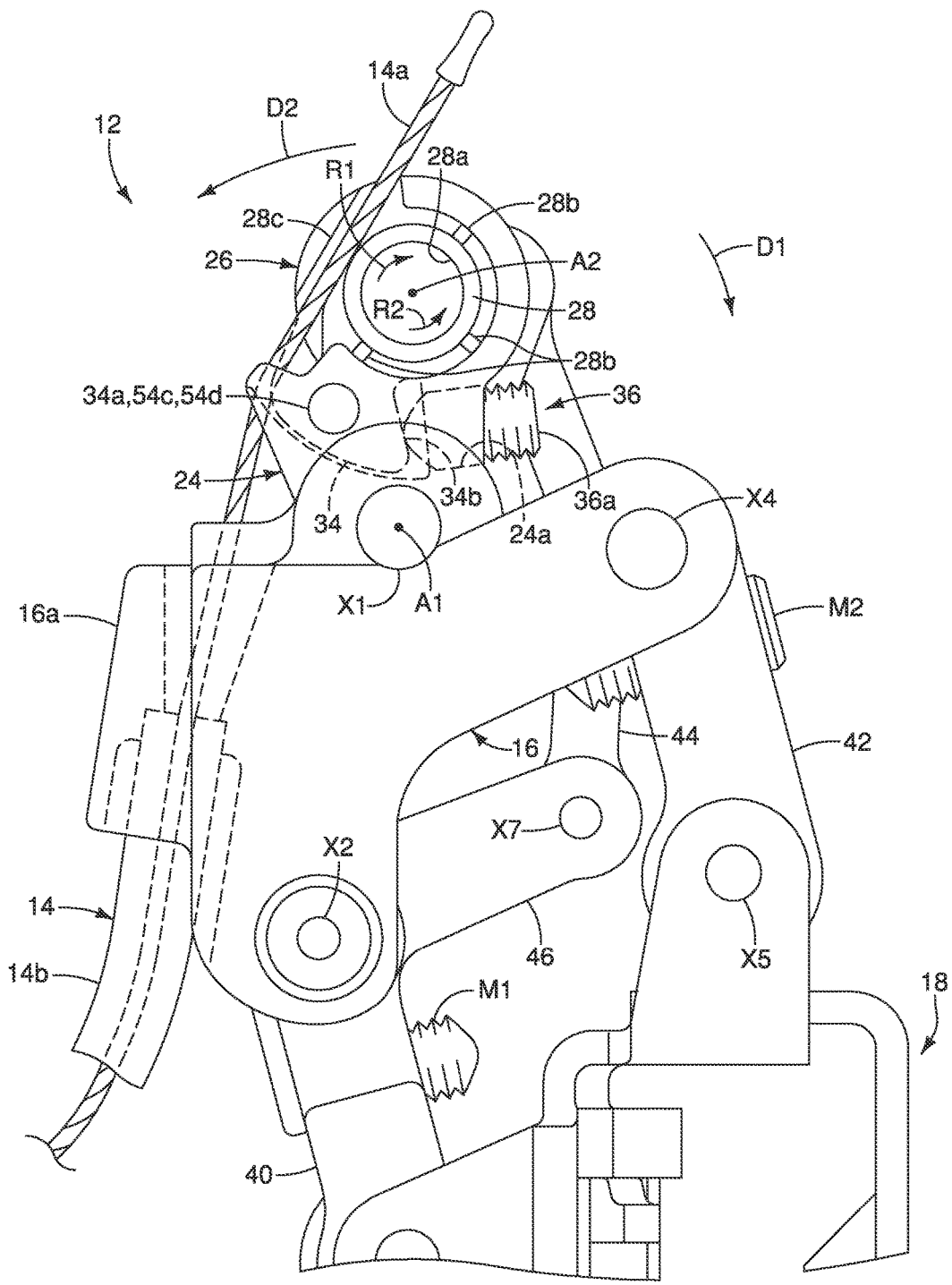
FIG. 11 is an enlarged, elevational view of a portion of the front derailleur illustrated in FIGS. 1 to 10 in which the chain guide is disposed the extended position (i.e., the farthest position with respect to the bicycle frame), and in which the cable attachment member has been removed.
Figure 12:
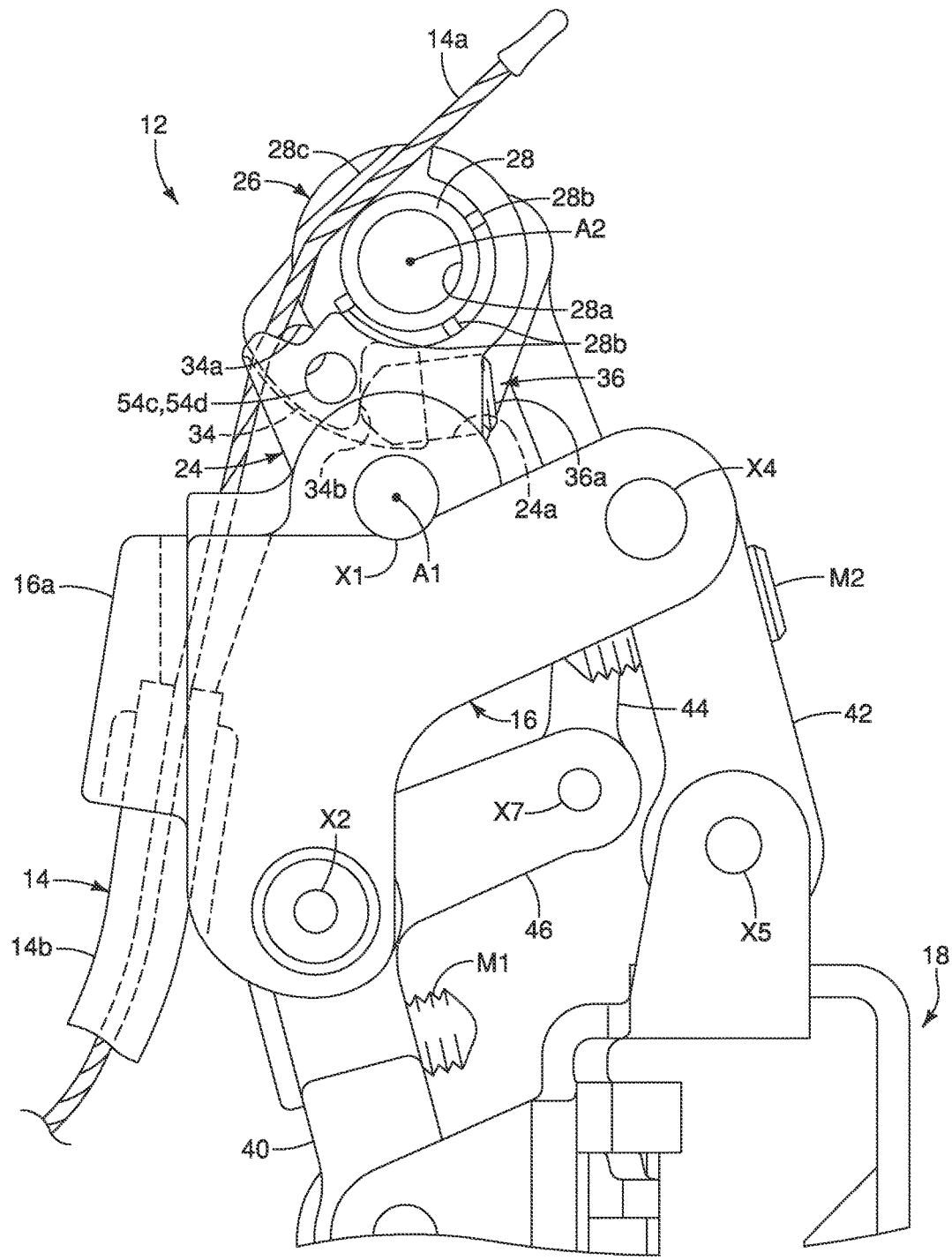
FIG. 12 is an enlarged, elevational view, similar to FIG. 11, of the portion of the front derailleur but with the cable attachment member adjusted from the preset position to a first adjusted position in a first (pulling) direction about the fixing axis.
Figure 13:
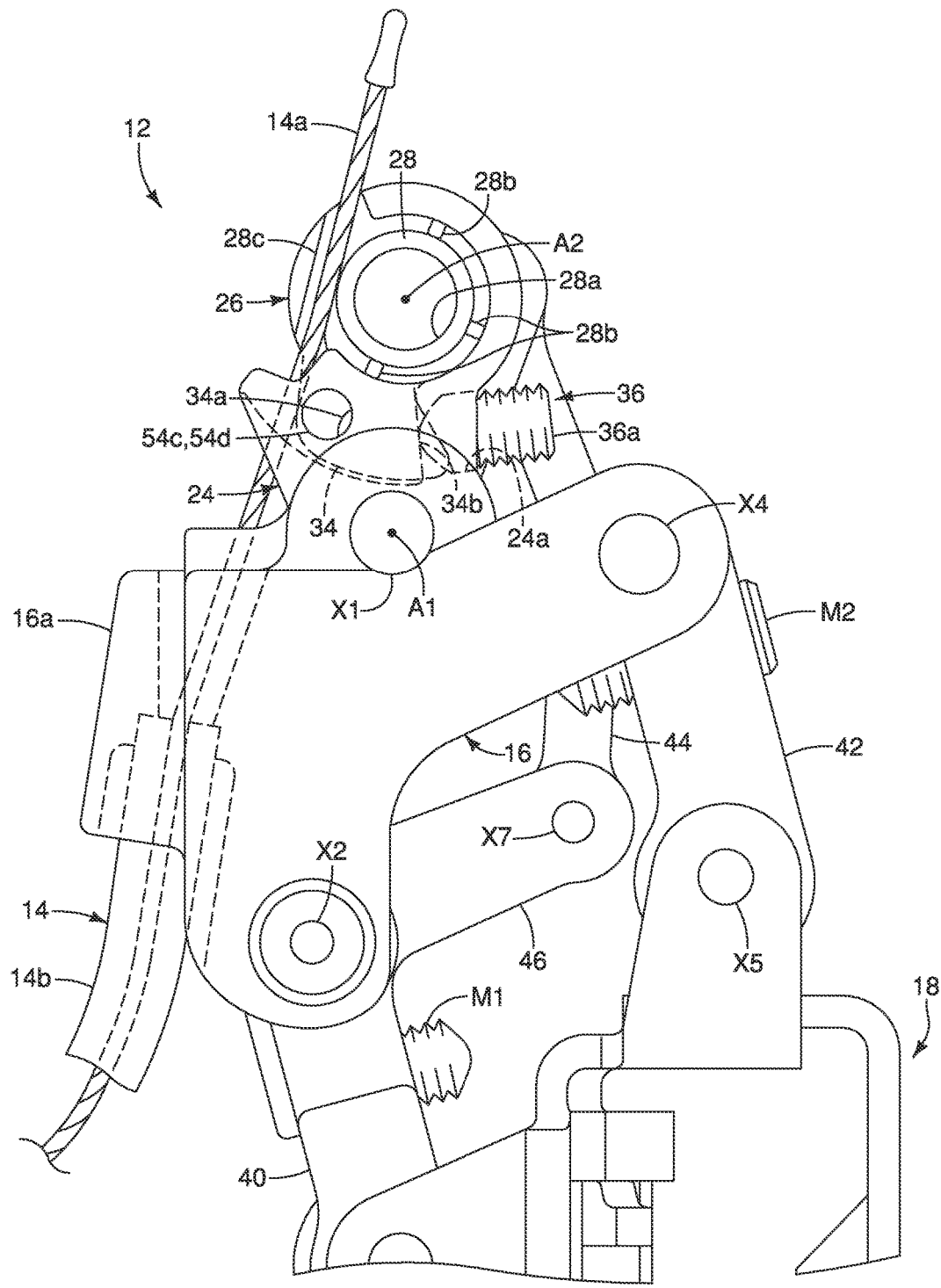
FIG. 13 is an enlarged, elevational view, similar to FIGS. 11 and 12, of the portion of the front derailleur but with the cable attachment member adjusted from the preset position to a second adjusted position in a second (releasing) direction about the fixing axis.
Figure 14:
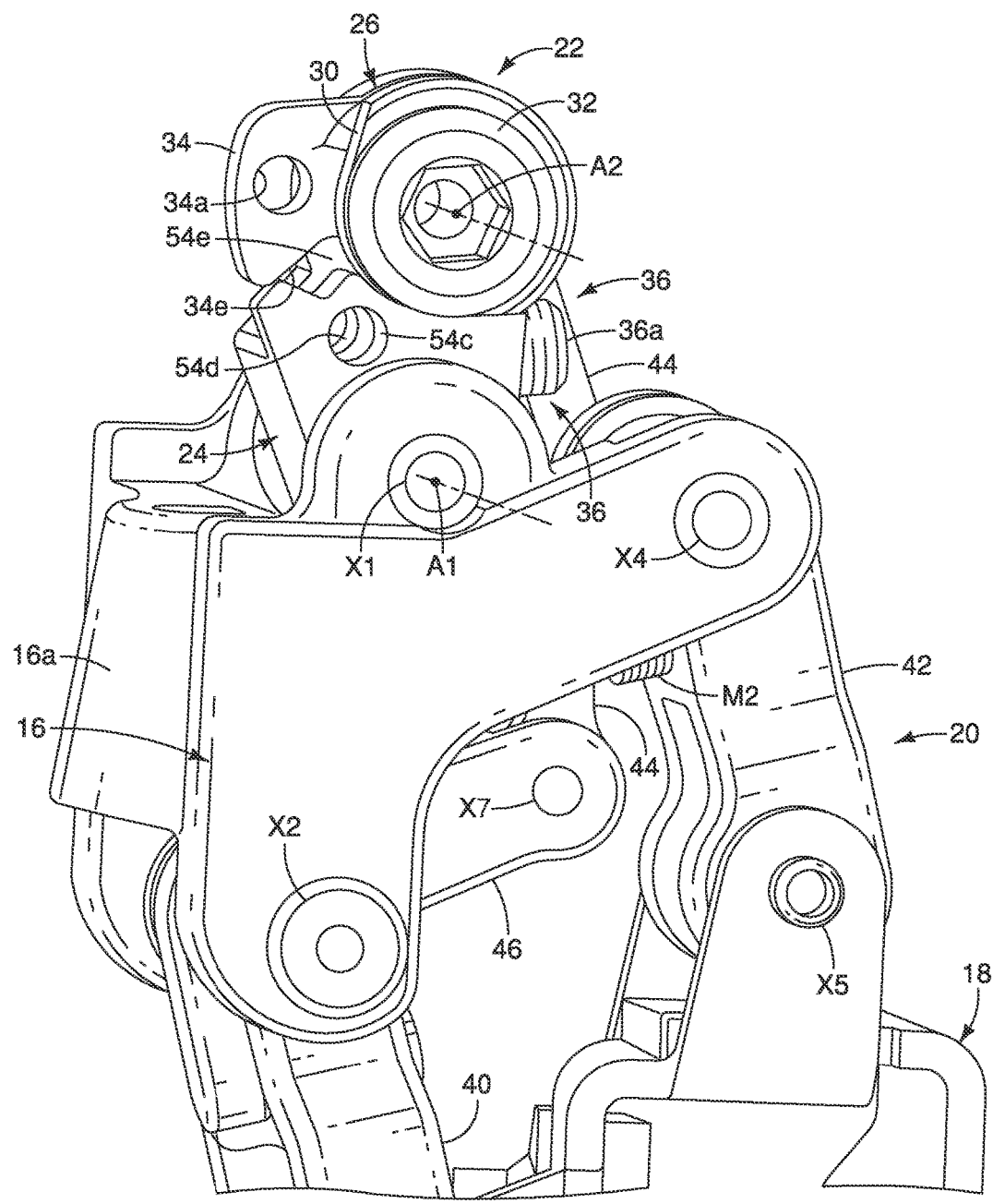
FIG. 14 is an enlarged, perspective view of the portion of the front derailleur shown FIGS. 11 to 13, but with the cable attachment member rotated about the fixing axis in the second (releasing) direction to more clearly illustrate the tool access portions of the cable attachment member and adjusting member.
Figure 15:
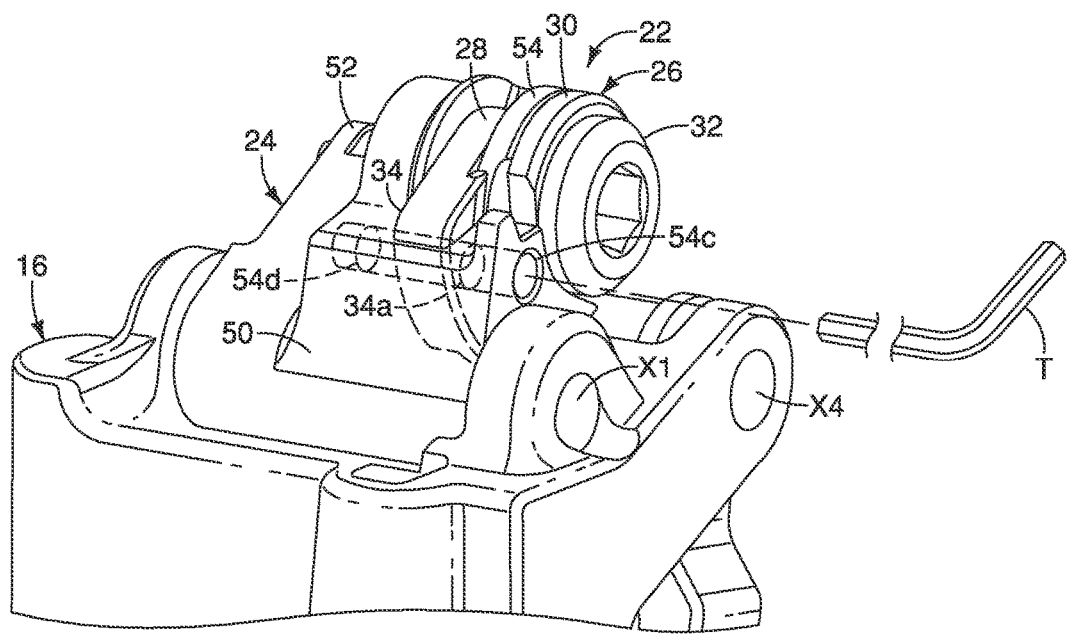
FIG. 15 is a perspective view of an upper portion of the front derailleur illustrated in FIGS. 1 to 13 showing a tool just prior to insertion into the tool access portion of the restricting structure the openings of the cable attachment part.
Figure 16:
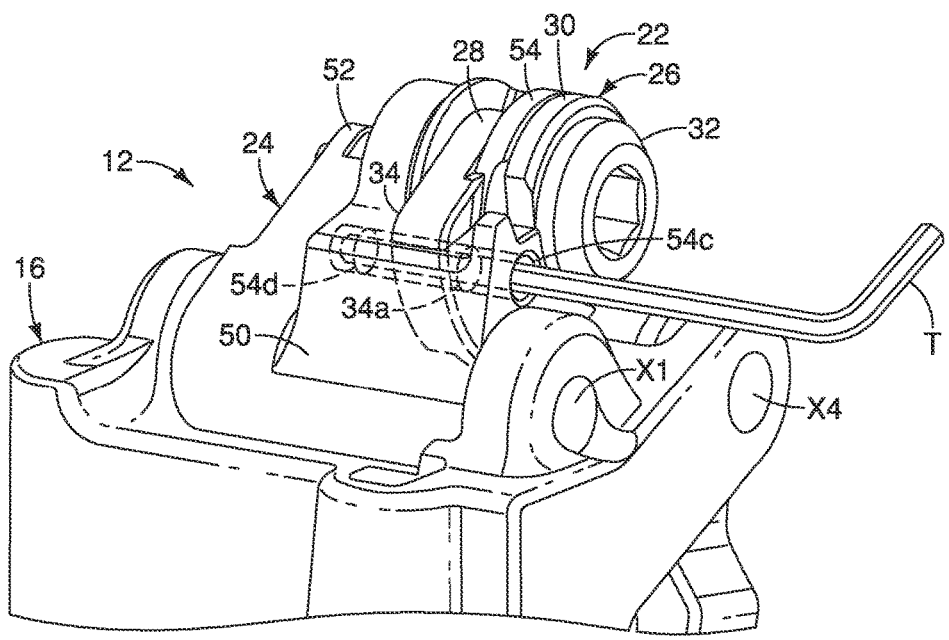
FIG. 16 is a perspective view of the upper portion of the front derailleur illustrated in FIG. 15 showing the tool inserted into the tool access portion of the restricting structure the openings of the cable attachment part.
Figure 17:
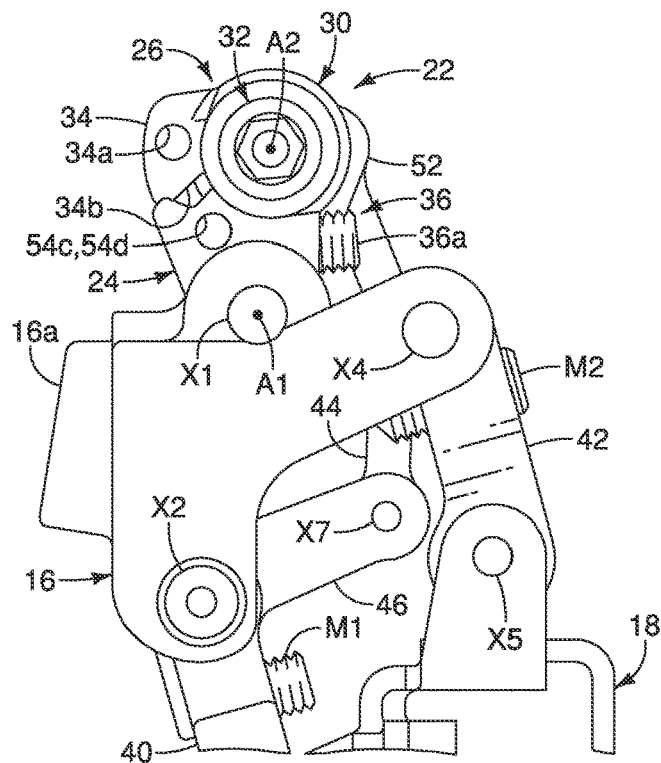
FIG. 17 is an elevational view of the portion of the front derailleur shown FIG. 14 with the cable attachment member rotated about the fixing axis in the second (releasing) direction to more clearly illustrate the tool access portions of the cable attachment member and adjusting member.
Figure 18:
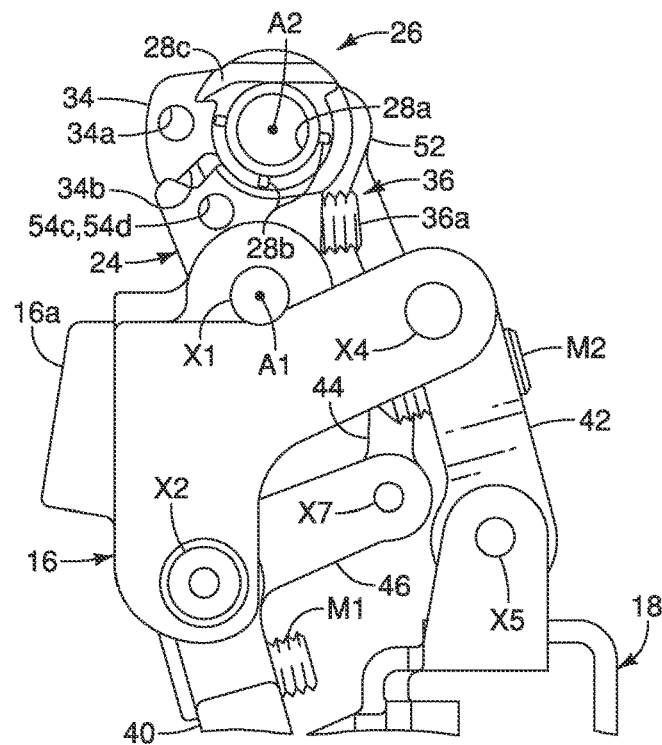
FIG. 18 is an elevational view, similar to FIG. 17, of the portion of the front derailleur but with the cable attachment fastener removed to show the cable attachment member contacting an abutment of the input link.
Figure 19:
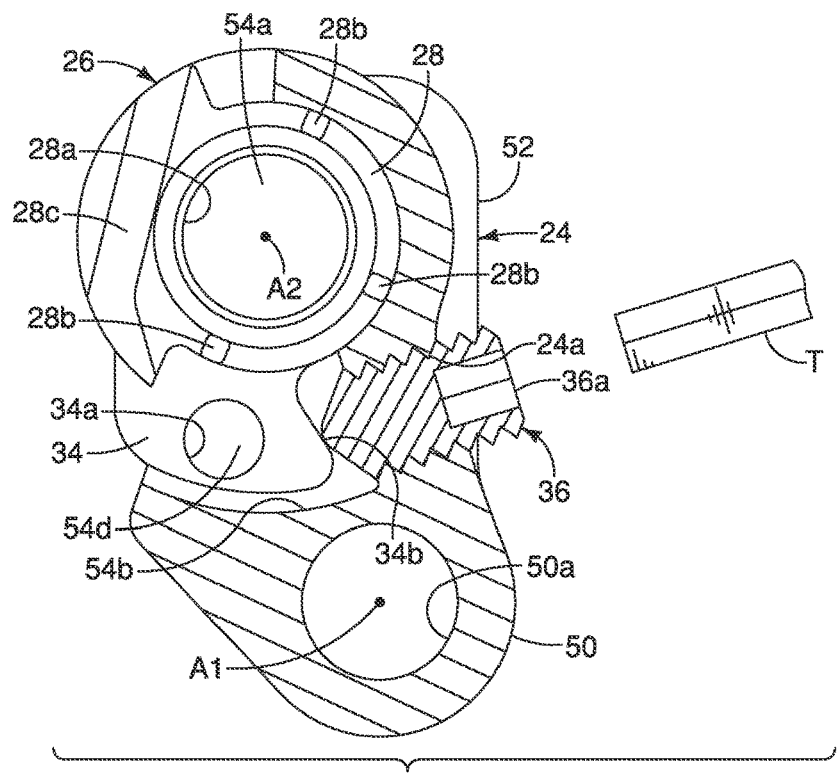
FIG. 19 is a cross sectional view of the input link of the front derailleur with the cable attachment member in the preset position.
Figure 20:
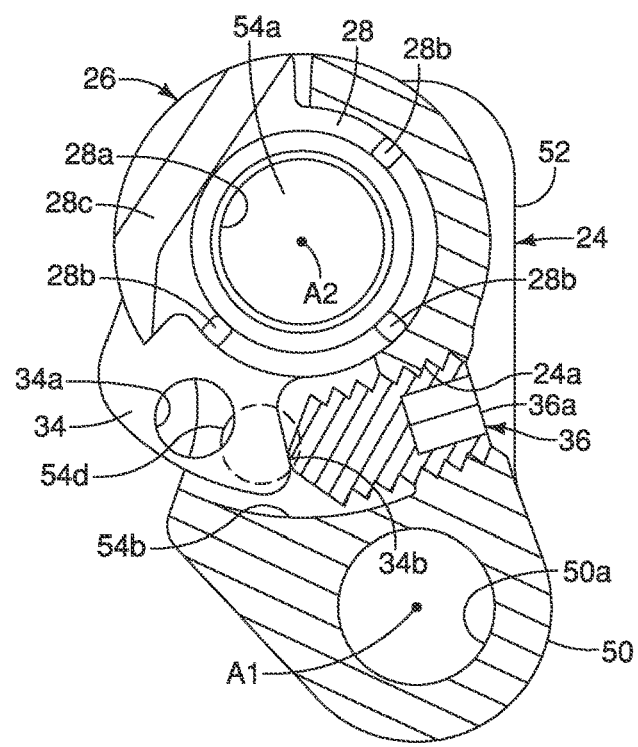
FIG. 20 is a cross sectional view, similar to FIG. 19, of the input link of the front derailleur but with the cable attachment member in the first adjusted position.

As seen in FIGS. 6, 8 and 11, the cable fixing structure 22 is mounted to the input link 24. Thus, the cable fixing structure 22 is configured to fix the operation cable 14a that moves the linkage assembly 20 in response to an operation of the operation cable 14a. More specifically, in the first illustrated embodiment, when the chain guide 18 is in the retracted position, the chain guide 18 shifts from the retracted position (FIGS. 6 to 8) to the extended position (FIGS. 9 to 11) in response to the operation cable 14a being pulled. As explained below, the input link 24 is biased so that the chain guide 18 is biased towards retracted position (FIGS. 6 to 8). As a result of the operation cable 14a being released, the cable fixing structure 22 and the input link 24 rotate together about the pivot axis A1 in a first operating direction D1. When the operation cable 14a is pulled, the cable fixing structure 22 and the input link 24 rotate together about the pivot axis A1 in a second operating direction D2. Thus, when the chain guide 18 is in the extended position, the chain guide 18 shifts from the extended position (FIGS. 9 to 11) to the retracted position (FIGS. 6 to 8) in response to the operation cable 14a being released.

Here, in the first embodiment, as seen in FIGS. 8 and 11, the cable fixing structure 22 basically comprises a cable attachment member 26 to which the operation cable 14a is fixed. The cable fixing structure 22 is free of an outer casing holder in which an end of the outer casing 14b for the operation cable 14a is held. In the first embodiment, as explained later, the base member 16 provided with an outer casing holder 16a. The cable attachment member 26 is movable with respect to the one of the chain guide 18 and the linkage assembly 20, to which the cable attachment member 26 is mounted, in a state where the operation cable 14a is fixed to the cable attachment member 26. Thus, broadly speaking, the bicycle cable fixing structure 22 is configured to fix the operation cable 14a, which moves a bicycle component (e.g., the front derailleur 12) in response to an operation of the operation cable 14a.

Here, in the first embodiment, the cable attachment member 26 has a fixing axis A2 of a fastener 32 (explained later). In this embodiment, the fixing axis A2 and the pivot axis A1 are substantially parallel to each other. The cable attachment member 26 is rotatably mounted around the fixing axis A2 of the fastener 32. The cable attachment member 26 is configured to rotate in a cable pulling direction R1 and a cable releasing direction R2 around the fixing axis A2 of the fastener 32 relative to the linkage assembly to which the cable attachment member 26 is mounted. The cable attachment member 26 is configured to be movable in the cable pulling direction R1 in the state where the operation cable 14a is fixed to the cable attachment member 26. In other words, the cable attachment member 26 is movable with respect to the input link 24 around the fixing axis A2, while the operation cable 14a is fixed to the cable attachment member 26. As explained below, this arrangement permits the tension in the operation cable 14a to be adjusted while the operation cable 14a is fixed to the cable attachment member 26.

The cable attachment member 26 includes a cable clamping portion 26a to which the operation cable 14a is clamped. The cable clamping portion 26a of the cable attachment member 26 is formed by a mounting part 28 and a fixing washer 30. The mounting part 28 is rotatably mounted to the input link 24 for rotation about the fixing axis A2 within a predefined range of movement. The cable fixing structure 22 further includes the fastener 32 (i.e., a fixing bolt) to fix the operation cable 14a to the cable attachment member 26. In particular, the fastener 32 pushes the fixing washer 30 against the mounting part 28 as the fastener 32 is tightened to clamp the operation cable 14a therebetween. In this way, the cable attachment member 26 is configured to have the operation cable 14a fixed thereto by the fastener 32. Thus, the mounting part 28, the fixing washer 30 and the fastener 32 define a cable clamp that fixes the operation cable 14a to the cable attachment member 26. The fastener 32 extends through the cable attachment member 26 in a direction of the fixing axis A2. The fixing axis A2 coincides with the longitudinal center axis of the fastener 32. The fastener 32 has a threaded shaft 32a and a head 32b. The mounting part 28 includes a threaded bore 28a for threadedly engaging the threaded shaft 32a of the fastener 32. The fixing washer 30 includes a non-threaded bore 30a for the threaded shaft 32a of the fastener 32 to pass therethrough. The mounting part 28 also includes three tabs 28b that engages three recesses or notches 30b in the fixing washer 30 so that the fixing washer 30 does not rotate relative to the mounting part 28 about the fixing axis A2. Here, the surface of the mounting part 28 that contacts the fixing washer 30 has a groove 28c for receiving the operation cable 14a.

The cable attachment member 26 includes a restricting structure 34 that is configured to selectively restrict a movement of the cable attachment member 26 in the cable pulling direction R1. The restricting structure 34 is integrally formed with the mounting part 28. The mounting part 28 and the restricting structure 34 are configured with respect to the input link 24 to form a twist mount arrangement that is similar to a bayonet mount for attaching the cable attachment member 26 to the input link 24. The attachment of the cable attachment member 26 to the input link 24 will be explained later. The restricting structure 34 is used for preventing a rotation of the mounting part 28 together with the fastener 32 relative to the input link 24, when the operation cable 14 a is fixed to the cable attachment member 26. It will be explained later how to restrict the rotation of the mounting part together with the fastener 32 by using restricting structure.

Referring to FIGS. 14 to 19, the restricting structure 34 includes a first tool access portion 34a and an abutment 34b. The first tool access portion 34a is configured for a tool T (FIGS. 15, 16 and 19) to access in order to restrict the movement of the cable attachment member 26 in the cable pulling direction R1 as explained below. In the first illustrated embodiment, the first tool access portion 34a is a cylindrical bore that is dimensioned to receive a two millimeter hex key, for example. By inserting the tool into the first tool access portion 34a, the cable attachment member 26 can be held in a prescribed position with respect to the input link 24. As explained later, the first tool access portion 34a aids in setting the cable attachment member 26 to the prescribed position. The restricting structure 34 is not limited only to a first tool access portion to be operated by the tool T. The restricting structure 34 can include a restricting member such as a pin which selectively engages with the input link 24 to restrict the movement of the restricting structure 34 of the cable attachment member 26. Alternatively, the restricting member can be provided on the input link 24 to engage a part of the cable fixing structure 22.

In the first embodiment, the bicycle cable fixing structure 22 further comprises a cable tension adjusting structure 36. Thus, in the first embodiment, the bicycle cable fixing structure 22 basically comprises the cable attachment member 26 and the cable tension adjusting structure 36. The cable tension adjusting structure 36 is configured to move the cable attachment member 26 relative to the one of the chain guide 18 and the linkage assembly 20, to which the cable attachment member 26 is mounted. Preferably, the cable tension adjusting structure 36 includes an adjusting member 36a to adjust a position of the cable attachment member 26 with respect to the one of the chain guide 18 and the linkage assembly 20, to which the cable attachment member 26 is mounted. Specifically, the adjusting member 36a is a screw that is threaded into a bore of the one of the chain guide 18 and the linkage assembly 20. Here, the adjusting member 36a threaded into a bore 24a of the input link 24 of the linkage assembly 20.

Figure 9:
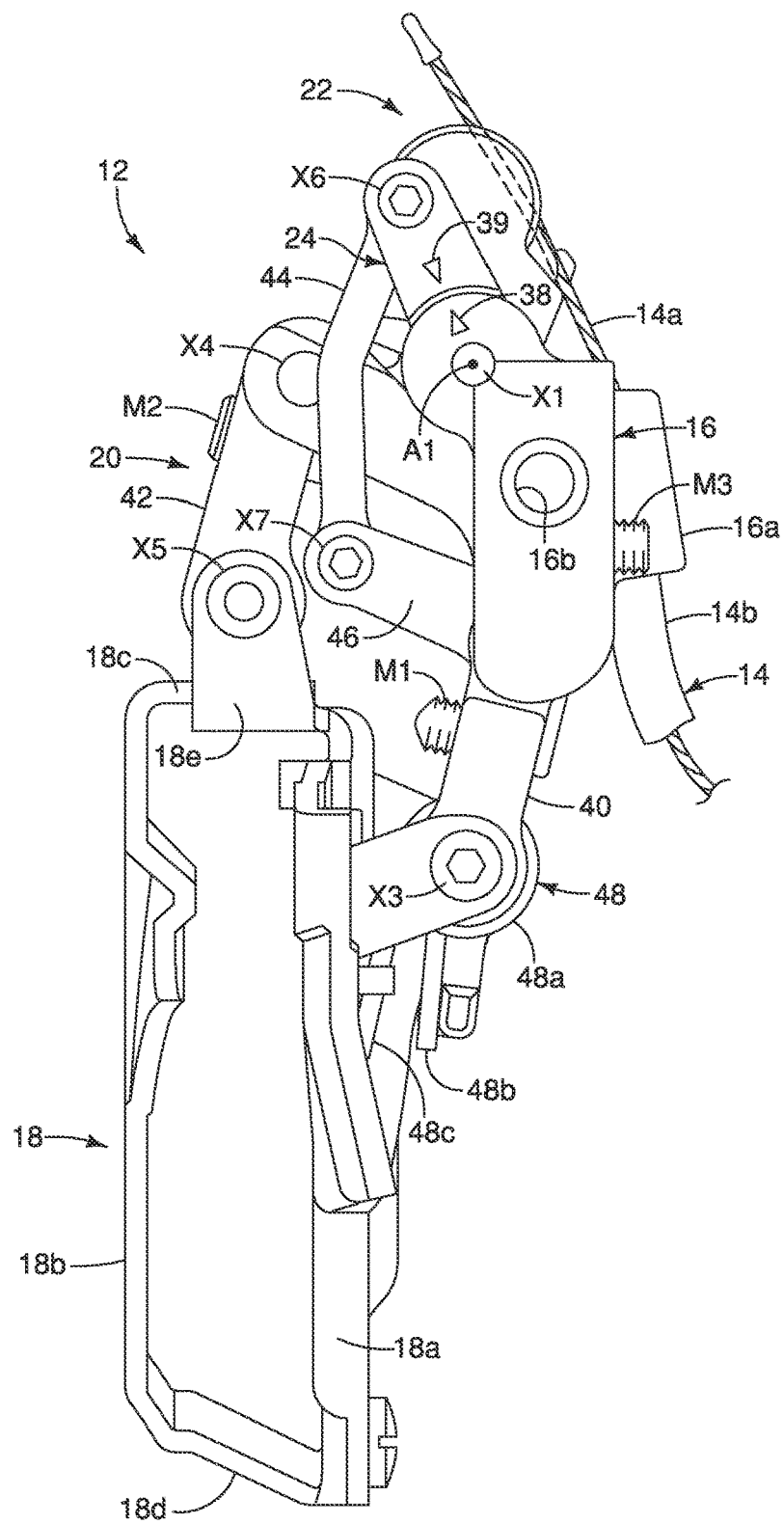
FIG. 9 is a front elevational view of the front derailleur illustrated in FIGS. 1 to 8 in which the chain guide is disposed the extended position (i.e., the farthest position with respect to the bicycle frame)

In the illustrated, as seen in FIGS. 6 and 9, the base member 16 includes a first indicator 38 (i.e., indicia) and the linkage assembly 20 includes a second indicator 39 (i.e., indicia) on the input link 24. The first and second indicators 38 and 39 are aligned with each other while the input link 24 of the linkage assembly 20 is in a first initial position (FIG. 9) with respect to the base member 16. The first and second indicators 38 and 39 are misaligned with each other while the input link 24 of the linkage assembly 20 is in a second initial position with respect to the base member 16. The first and second indicators 38 and 39 are arranged to indicate a suitable relative position between the input link 24 and the base member 16 when the tension of the inner operation cable 14a is adjusted by the adjusting structure 36.

Now a tensioning operation of the inner operation cable 14a will be discussed. Basically, there are two tensioning stages in a tensioning operation of the inner operation cable 14a. During the first tensioning stage, the adjusting member 36a is turned to screw into the input link 24, which causes the tip of the adjusting member 36a pushes against the cable attachment member 26 to rotate the cable attachment member 26 about the fixing axis A2 in the cable pulling direction R1. As the cable attachment member 26 rotates about the fixing axis A2, the inner operation cable 14a is pulled and tension of the inner operation cable 14a increases. In the first tensioning stage, the only the cable attachment member 26 rotates relative to the input link 24 about the fixing axis A2, and the tension of the inner operation cable 14a increases. The second tensioning stage occurs after the first tensioning stage when the tension of the inner operation cable 14a has increases to the point that the inner operation cable 14a cannot or is difficult to further deform under strong tension. Thus, during the second tensioning stage, the adjusting member 36a is turned to screw further into the input link 24. This further turning of the adjusting member 36a causes both the cable attachment member 26 and the input link 24 to rotate. Specifically, during the second tensioning stage, the cable attachment member 26 rotates relative to the input link 24 about the fixing axis A2 in the cable pulling direction R1. However, the tension of the inner operation cable 14a is not decreased, but rather this relative rotation of the cable attachment member 26, during the second tensioning stage, is a result of the input link 24 rotating relative to the base member 16 on the first pivot axle X1 in the second operating direction D2. As the input link 24 rotates relative to the base member 16 on the first pivot axle X1, the chain guide 18 is moved in an outward direction away from the frame F. Thus, as the adjusting member 36a is turned during the second tensioning stage, the chain guide 18 moves (pivots) with respect to the base member 16 to adjust an initial position of the chain guide 18 relative to the base member 16. During the tensioning operation, the user can know suitable tension, a suitable initial position of the linkage assembly and a suitable initial position of the chain guide 18 relative to the base member 16 have been obtained when the second indicator 39 on the input link 24 points to the first indicator 38 on the base member 16.

Referring to FIGS. 12, 13, 19 and 20, the adjusting member 36a includes a second tool access portion 36b, which is configured for the tool T (FIG. 19) to access to operate the adjusting member 36a. The second tool access portion 36b is arranged relative to the one of the chain guide 18 and the linkage assembly 20 to prohibit the tool T from accessing the second tool access portion 36b while the chain guide 18 is positioned in one of the retracted position and the extended position.

Here, as seen in FIG. 8, the second tool access portion 36b is inaccessible from being operated by the tool T while the chain guide 18 is positioned in the retracted position. This arrangement can guide the user to adjust a tension of the operation cable 14a while the chain guide 18 is positioned in the other of the retracted position and the extended position, which is more suitable position for the tension of the operation cable 14a to be adjusted than the one of the retracted position and the extended position. In the first illustrated embodiment, the second tool access portion 36b is a blind bore with hexagonal cross section. The first and second tool access portions have profiles configured such that the tool T (e.g., a two millimeter hex key) can access both the first and second tool access portions 34a and 36b. Therefore, the user can use the same tool T for preventing rotation of the mounting part 28 together with the fastener 32 relative to the input link 24 and for adjusting a tension of the operation cable 14a.

In the first embodiment, the cable tension adjusting structure 36 is provided on the input link 24 of the linkage assembly 20. As a result, the cable tension adjusting structure 36 is configured to move the cable attachment member 26 relative to the input link 24 of the linkage assembly 20. The adjusting member 36a is configured to abut the cable attachment member 26 for restricting a movement of the cable attachment member 26 in the cable releasing direction R2. Thus, in the first embodiment, the cable attachment member 26 is configured to selectively rotate in the cable pulling direction R1 and the cable releasing direction R2 by the operation of the adjusting member 36a. In other words, if the adjusting member 36a is screwed into the bore 24a of the input link 24 of the linkage assembly 20, then the cable attachment member 26 is configured to rotate in the cable pulling direction R1 about the fixing axis A2. On the other hand, if the adjusting member 36a is screwed out of the input link 24 of the linkage assembly 20, then the cable attachment member 26 is configured to rotate in the cable releasing direction R2 about the fixing axis A2 by pulling force via the operation cable 14a. In this way, the adjusting member 36a is configured to abut the cable attachment member 26 to define an angular position of the cable attachment member 26 about the fixing axis A2 with respect to the input link 24. The adjusting member 36a of the cable tension adjusting structure 36 is configured to move the cable attachment member 26 in a direction parallel to a first reference plane PL1 (see FIGS. 4 and 5) that is perpendicular to the fixing axis A2 while in a state where the operation cable 14a is fixed to the cable attachment member 26. In particular, the cable attachment member 26 rotates in a direction parallel to the second reference plane PL2.

As best seen in FIG. 1, the base member 16 is configured to be mounted to the bicycle frame F. Basically, the base member 16 is fixedly coupled to the bracket B on a seat tube of the bicycle frame F by a mounting screw S as shown in FIG. 1. The screw S is threaded into a threaded hole 16b of the base member 16. While the base member 16 is illustrated as a "braze-on type" of mounting structure, the base member 16 is not limited to this type of mounting structure. For example, the base member 16 of the front derailleur 12 can be replaced with a base member have a "clamp band type" of a bicycle mounting portion, if needed and/or desired.

In the first embodiment, as mentioned above, the outer casing holder 16a is provided on the base member 16 and constitutes an outer casing receiving part in which an end of the outer casing 14b of the operation cable 14a is held. The outer casing holder 16a has a stepped through bore that receives an end portion of the outer casing 14b in through an inlet end of the through bore such that the inner operation cable 14a passing out though an outlet end of the through bore. Here in the illustrated embodiment, the outer casing holder 16a and the base member 16 are formed as a one-piece member. However, it will be apparent from this disclosure that the outer casing holder 16a could be a separate member from the base member 16 and attached to the bicycle frame F.

Referring to FIGS. 2 to 7, the linkage assembly 20 will now be discussed in further detail. The linkage assembly 20 pivotally connects the chain guide 18 to the base member 16. In addition to the input link 24, the linkage assembly 20 further includes a first link 40 and a second link 42. The first and second links 40 and 42 pivotally couple the chain guide 18 to the base member 16. The linkage assembly 20 further includes at least one connecting link 344 that operatively connects the input link 24 to one of the first and second links 40 and 42. In the first illustrated embodiment, the linkage assembly 20 further includes an extension link 46 for operatively connecting the input link 24 to the first link 40. In the first illustrated embodiment, the connecting link 344 interconnects the input link 24 to the first link 40. In this way, operation of the operation cable 14a causes the chain guide 18 to move with respect to the base member 16 via the linkage assembly 20.

As best seen in FIGS. 6 to 10, the connections of the linkage assembly 20 between the base member 16 and the chain guide 18 will now be explained. The first link 40 has a first end portion pivotally mounted to the base member 16 via a second pivot axle X2, and a second end portion pivotally mounted to the chain guide 18 by a third pivot axle X3. The second link 42 has a first end portion pivotally mounted to the base member 16 via, a fourth pivot axle X4, and a second end portion pivotally mounted to the chain guide 18 by a fifth pivot axle X5. Thus, the base member 16, the chain guide 18 and the first and second links 40 and 42 define the four-bar linkage. The connecting link 344 has a first end portion pivotally coupled to the input link 24 by a sixth pivot axle X6, and a second end portion pivotally coupled to the extension link 46 at a seventh pivot axle X7. The extension link 46 is pivotally mounted on the second pivot axle X2 and transmits the movement of the input link 24 to the first link 40 via the connecting link 344. During operation of the operation cable 14a, the extension link 46 pivots about the second pivot axle X2 and transfers the operating force to the first link 40 of the linkage assembly 20. At the same time, the second link 42 pivots about the fourth and fifth pivot axles X4 and X5.

In the illustrated embodiment, as seen in FIGS. 6 to 11, the linkage assembly 20 preferably includes a first adjustment member M1, a second adjustment member M2 and a support member M3. Each of the first, second adjustment members M1 and M2 and the support member M3 is a screw. The first adjustment member M1 is threaded into a threaded hole in the first link 40, and has a free end that abuts against an end of the extension link 46. By screwing or unscrewing the first adjustment member M1, an angular position of the extension link 46 can be adjusted with respect to the first link 40 about the second pivot axle X2. Of course, it will be apparent from this disclosure that the first link 40 and the extension link 46 can be formed as a single member if needed and/or desired. The second adjustment member M2 is threaded into a threaded hole in the second link 42, and has a free end that abuts against the base member 16. By screwing or unscrewing the second adjustment member M2, an end point of the retracted position of the chain guide 18 can be adjusted. Thus, the second adjustment member M2 limits the movement of the chain guide 18 towards the bicycle frame F by abuts against the base member 16 to create the end point of the movement of the chain guide 18. The support member M3 is threaded into a threaded hole in the base member 16, and has a free end that abuts against the bracket B or the bicycle frame F. By screwing or unscrewing the support member M3, the angle of the chain guide 18 can be adjusted with respect to the longitudinal, vertical center plane. The support member M3 can support the base member 16 so that the base member 16 does not move relative to the bicycle frame F during a shifting operation of the chain guide from the retracted position to the extended position. Because the adjustment members are known in the bicycle field, the first and second adjustment members M1 and M2 and support member M3 will not be further discussed herein.

Referring back to FIGS. 2 to 7, the chain guide 18 will now be discussed in greater detail. In the first illustrated embodiment, the chain guide 18 includes a first guide plate 18a and a second guide plate 18b. The first and second guide plates 18a and 18b form a chain receiving slot therebetween. As previously mentioned, the chain guide 18 is pivotally coupled to the base member 16 by the first and second links 40 and 42 of the linkage assembly 20. In particular, the chain guide 18 is pivotally coupled to the first and second links 40 and 42 to move between the retracted position (i.e., the drawing at left end in FIGS. 8 and 9) and the extended position (i.e., the drawing at right end in FIGS. 8 and 9). The first guide plate 18a is connected to the second guide plate 18b by a first or upper connecting portion 18c and a second or rear-end connecting portion 18d. In the illustrated embodiment, the first guide plate 18a, the second guide plate 18b, the first connecting portion 18c and the second connecting portion 18d are formed as a one-piece, unitary member by bending a single piece of a metal sheet. The chain guide 18 further includes a U-shaped attachment part 18e that is fixed (e.g., riveted) to the first connecting portion 18c. As best seen in FIGS. 6 and 7, the first guide plate 18a is pivotally connected to the first link 40 by the third pivot axle X3. The attachment part 18e is pivotally connected to the second link 42 by the fifth pivot axle X5.

Figure 3:
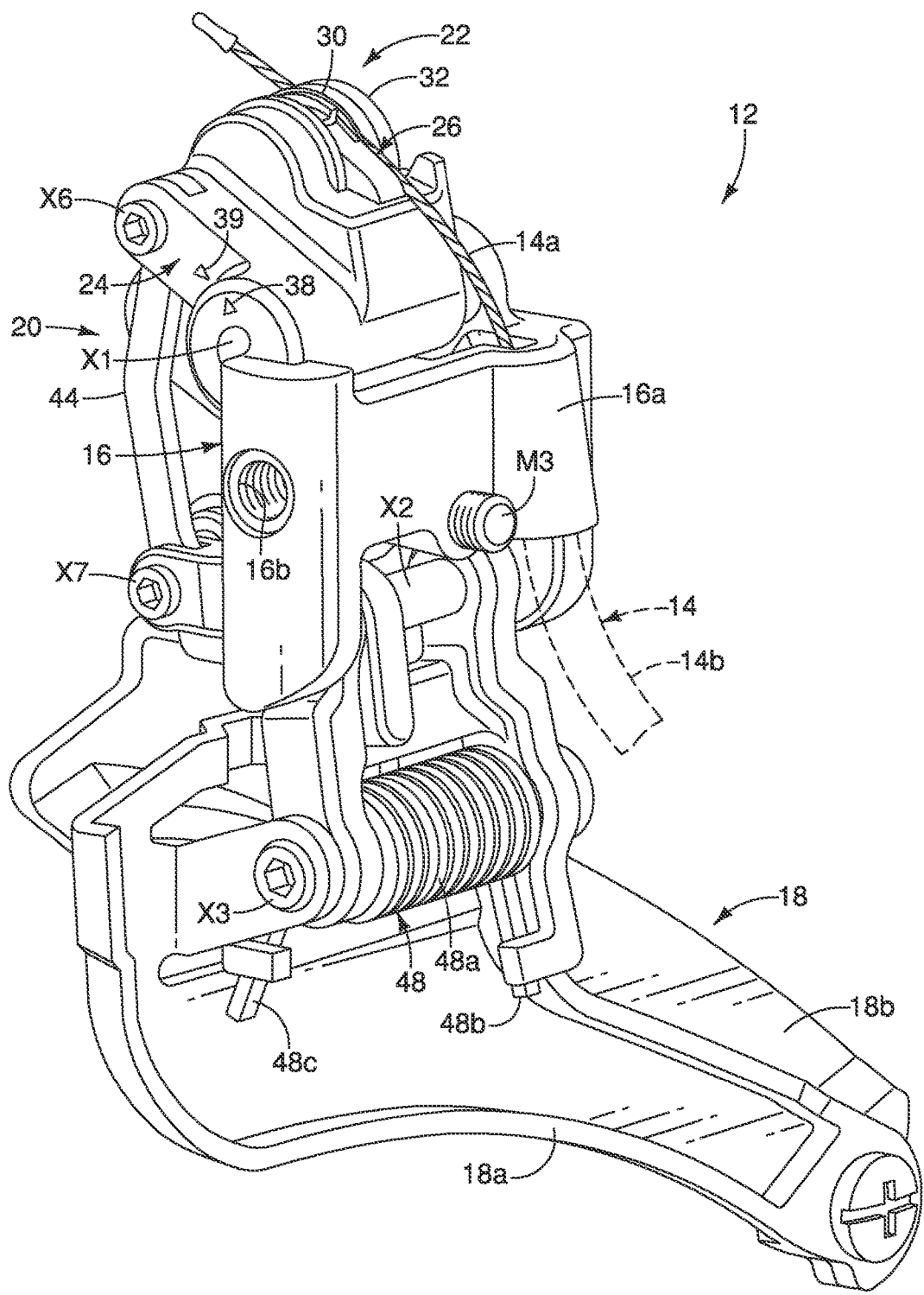
FIG. 3 is an inner side perspective view of the front derailleur illustrated in FIGS. 1 and 2.
Figure 4:
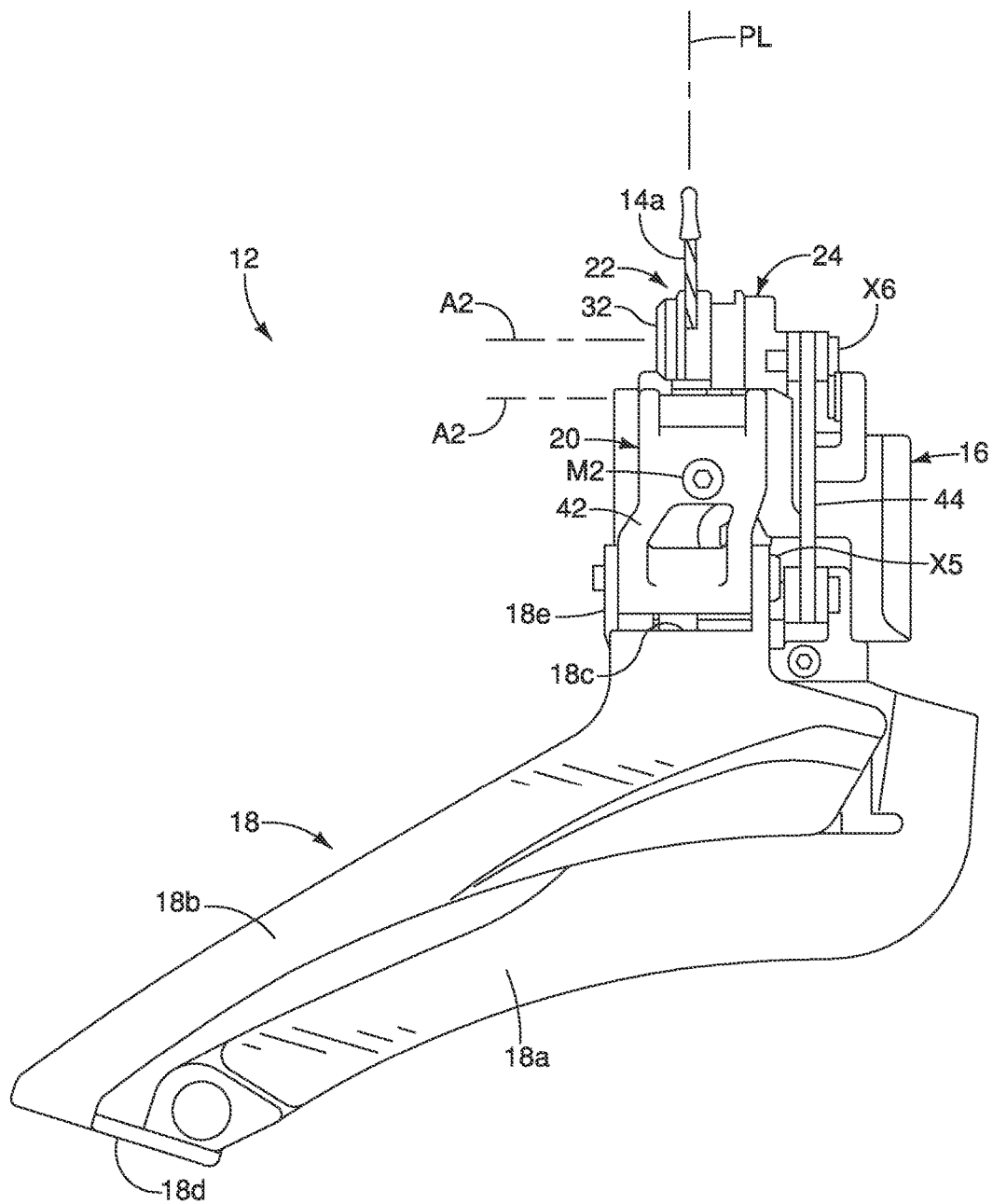
FIG. 4 is an outer side elevational view of the front derailleur illustrated in FIGS. 1 to 3.
Figure 5:
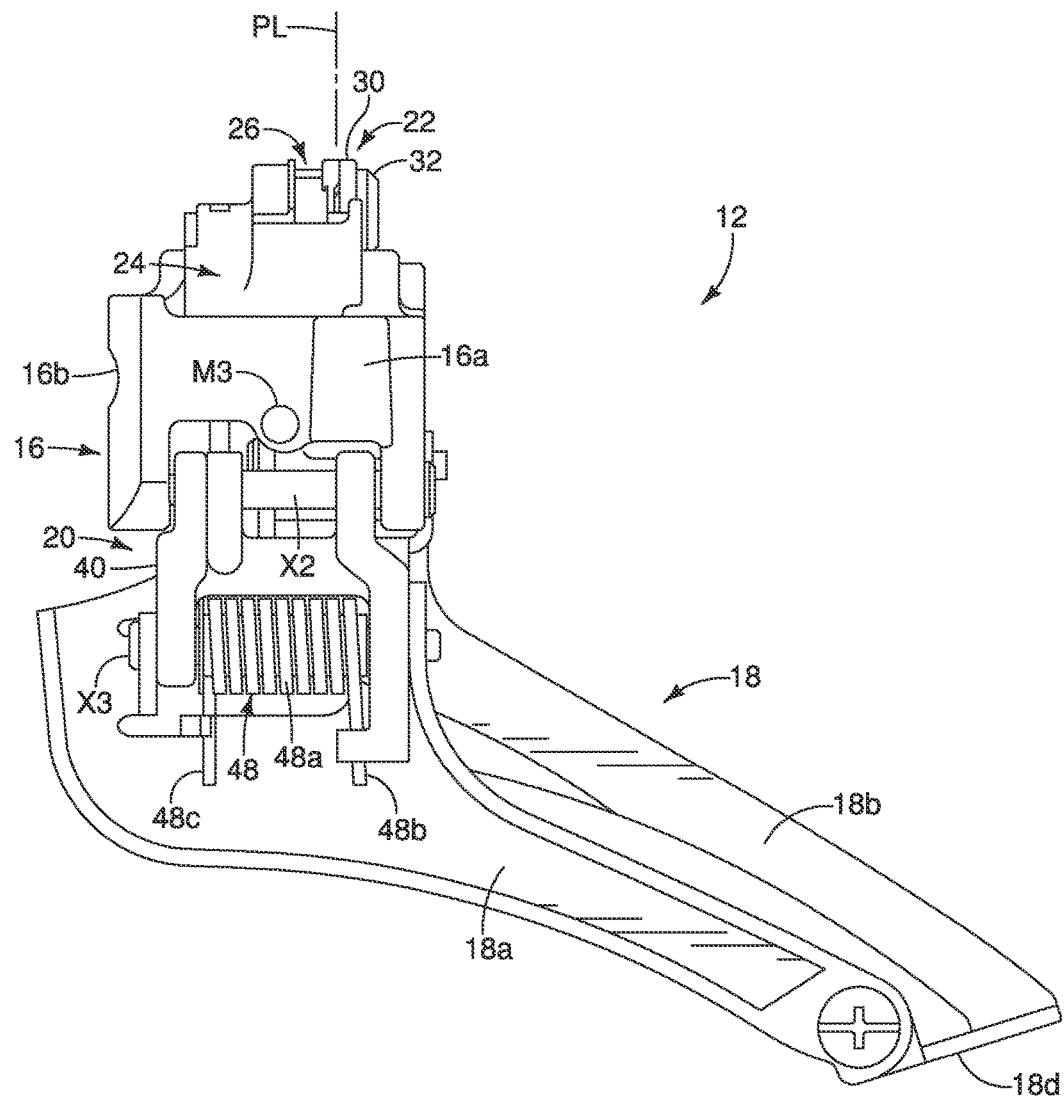
FIG. 5 is an inner side elevational view of the front derailleur illustrated in FIGS. 1 to 4.

In the first illustrated embodiment, as seen in FIG. 3, the chain guide 18 is biased in the retracted position relative to the base member 16 by a biasing member 48. The biasing member 48 has a coiled portion 48a that is disposed around the third pivot axle X3. The biasing member 48 has a first free end portion 48b that contacts the first link 40 and a second free end portion 48c that contacts the first guide plate 18a. Thus, the biasing member 48 is operatively disposed between the base member 16 and the chain guide 18. The biasing member 48 biases the chain guide 18 towards the retracted position so as to position the chain guide 18 over the small chain ring S1. Thus, in the first illustrated embodiment, the retracted position (i.e., the drawing at left end in FIGS. 8 and 9) constitutes an initial state or rest position of the chain guide 18. In particular, the biasing member 48 maintains the chain guide 18 at the retracted position when the operation cable 14a is released or detached from the front derailleur 12.

In the first illustrated embodiment, the biasing member 48 and the linkage assembly 20 are arranged with respect to the base member 16 and the chain guide 18 to form a down-swing derailleur. The down-swing derailleur refers to a derailleur that has its chain guide is mounted at the bottom pivot axes of the four-bar linkage that carries it. The outer casing holder 16a and the cable attachment member 26 are arranged with respect to the base member 16 to form a bottom-pull derailleur. The bottom-pull derailleur refers to a derailleur that has the operation cable 14a being pulled in a downward direction to move the chain guide 18 against the biasing force of the biasing member 48 while the bicycle frame F is in a level, upright position. The operation cable 14a is often routed across the top or along a bottom of a bottom bracket shell of the bicycle frame F on an operating cable guide (not shown), which redirects the operation cable 14a upward along the bottom of a down tube of the bicycle frame F to the shifter in a conventional manner. Thus, in the first illustrated embodiment, the front derailleur 12 is a bottom-pull derailleur.

Figure 21:
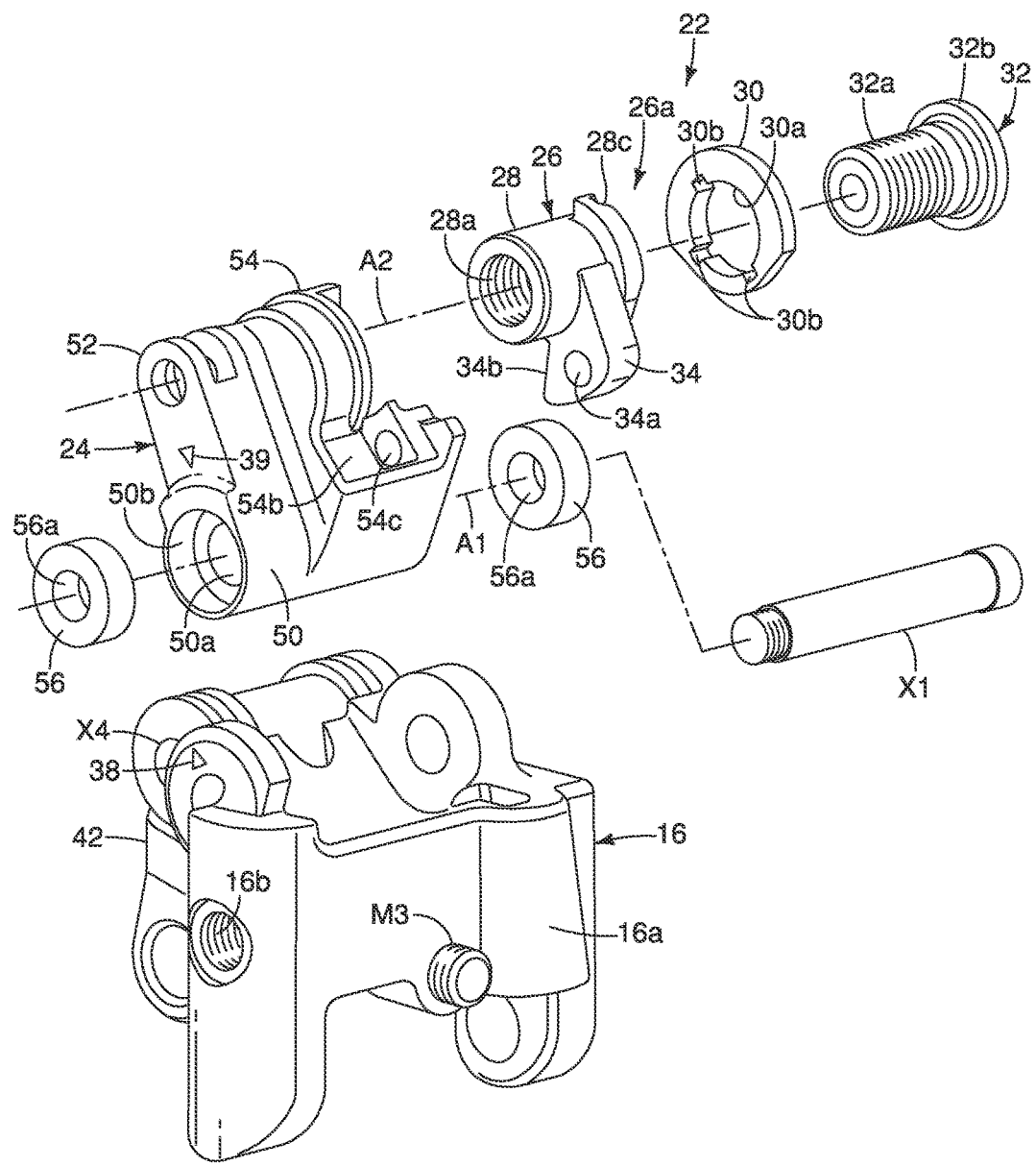
FIG. 21 is an exploded perspective view of selected parts of the front derailleur illustrated in FIGS. 1 to 13 as viewed from the front end and from frame facing side of the front derailleur.
Figure 22:
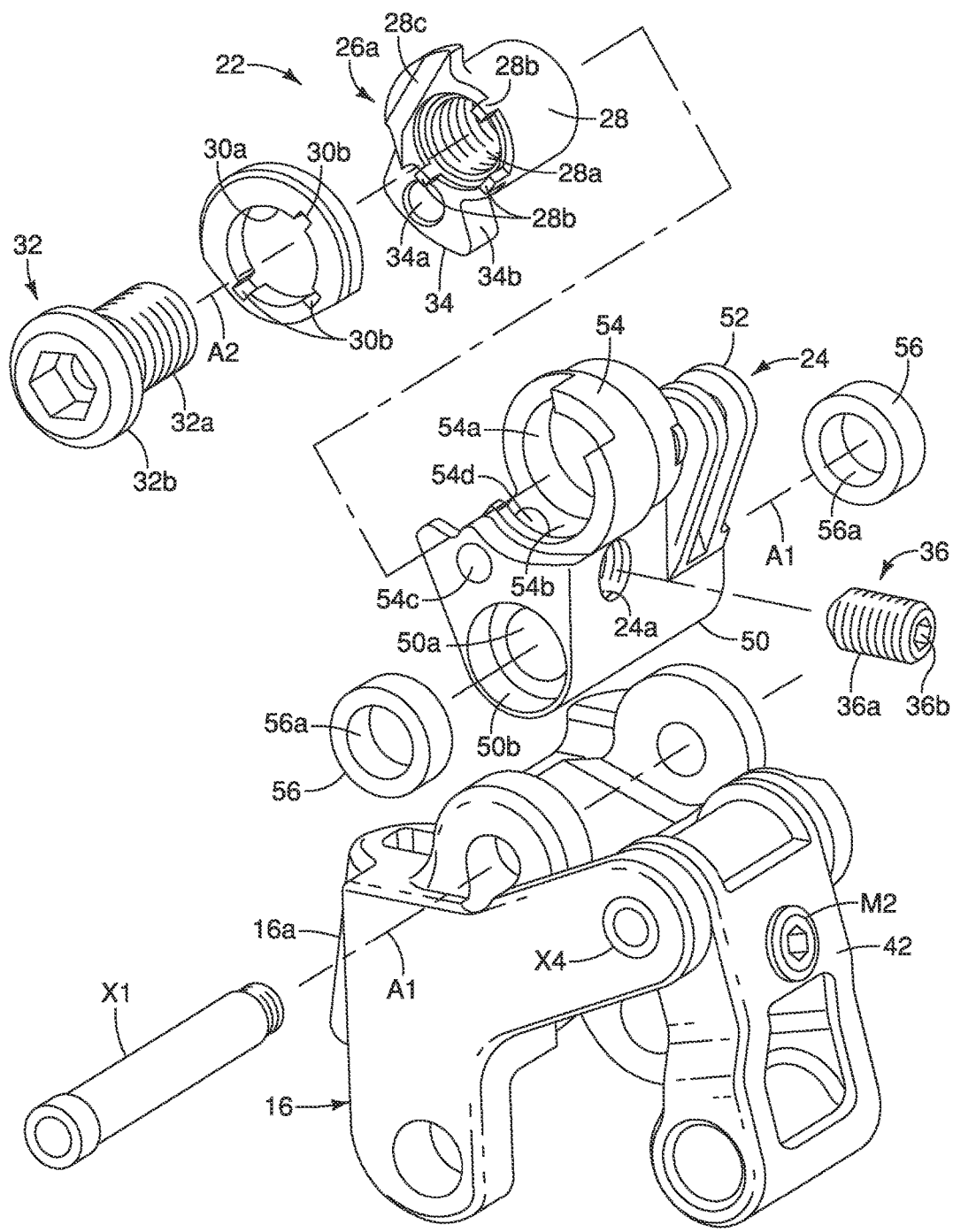
FIG. 22 is an exploded perspective view of selected parts of the front derailleur illustrated in FIGS. 1 to 13 as viewed from the rear end and from non-frame facing side of the front derailleur.
Figure 23:
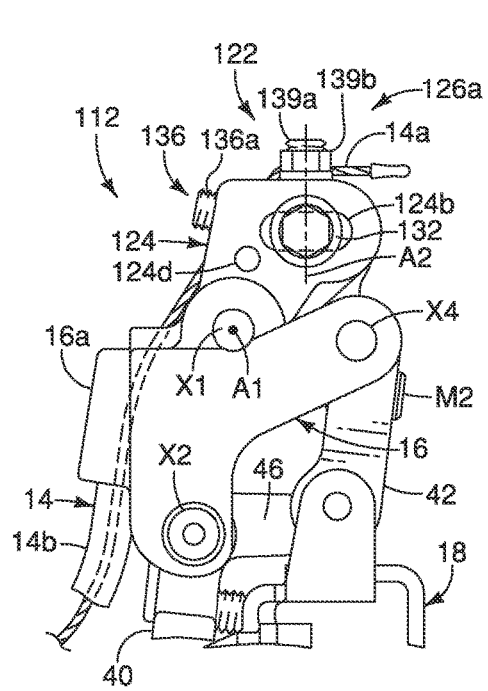
FIG. 23 is a rear elevational view of a portion of a front derailleur in accordance with a second illustrated embodiment.

Referring mainly to FIGS. 21 and 22, the input link 24 will now be discussed in further detail. The input link 24 basically includes a pivot portion 50, a connecting link coupling portion 52 and a cable attachment part 54. The pivot portion 50 is configured to pivotally attach the input link 24 to the base member 16. In particular, the pivot portion 50 has a pivot axle receiving bore 50a for receiving the first pivot axle X1. The connecting link coupling portion 52 is configured to pivotally attach the connecting link 344 to the input link 24 as seen in FIG. 6.

The cable attachment part 54 has a bore 54a and a curved recess 54b for rotatably supporting the cable attachment member 26 on the input link 24. In particular, the mounting part 28 is received in the bore 54a while the restricting structure 34 is received in the curved recess 54. The cable attachment member 26 is installed on the input link 24 by first inserting the mounting part 28 into the bore 54a and that rotating the restricting structure 34 into the curved recess 54. In this way, the cable attachment member 26 cannot be removed from the input link 24 by pulling the cable attachment member 26 along the fixing axis A2. Thus, a twist mount arrangement is formed that is similar to a bayonet mount for attaching the cable attachment member 26 to the input link 24.

As seen in FIGS. 15, 16, 21 and 22, the cable attachment part 54 also has a pair of openings 54c and 54d that provide access to the first tool access portion 34a (i.e., an opening). In particular, the first tool access portion 34a (i.e., an opening) can be aligned with the openings 54c and 54d using the tool T so that the cable attachment member 26 can be set to the prescribed position with respect to the input link 24. Thus, by aligning the first tool access portion 34a (i.e., an opening) with the openings 54c and 54d, the user can reset the cable attachment member 26 back to the prescribed position after previously adjusting the position of the cable attachment member 26 with respect to the input link 24. In a state where the tool T is inserted into the tool access portion 34a and the openings 54c and 54d, the user can fix the operation cable 14a to the cable attachment structure with preventing the rotation of the mounting part 28 together with the fastener 32 relative to the input link 24.

The front derailleur 12 further comprises at least one bearing member 56 disposed between the first pivot axle X1 and the input link 24. In the illustrated embodiment, the front derailleur 12 includes two bearing members 56 that are disposed on either side of the input link 24. In particular, the input link 24 includes a pair of recesses 50b that are located at opposite faces of the pivot portion 50 to receive the bearing members 56. Preferably, the bearing members 56 are either sealed bearings having inner and outer races with rolling members therebetween, or a single ring made of a material (e.g., nylon) having a lower coefficient of friction than the material (e.g., aluminum alloy) of the input link 24. Preferably, each of the bearing members 56 has a pivot axle receiving opening 56a for receiving the first pivot axle X1. The pivot axle receiving bore 50a is slightly larger than the pivot axle receiving openings 56a so that the first pivot axle X1 does not contact the input link 24. The bearing members 56 can be replaced with bushings for a reduction of a friction relative to the first pivot axle X1.

Figure 24:
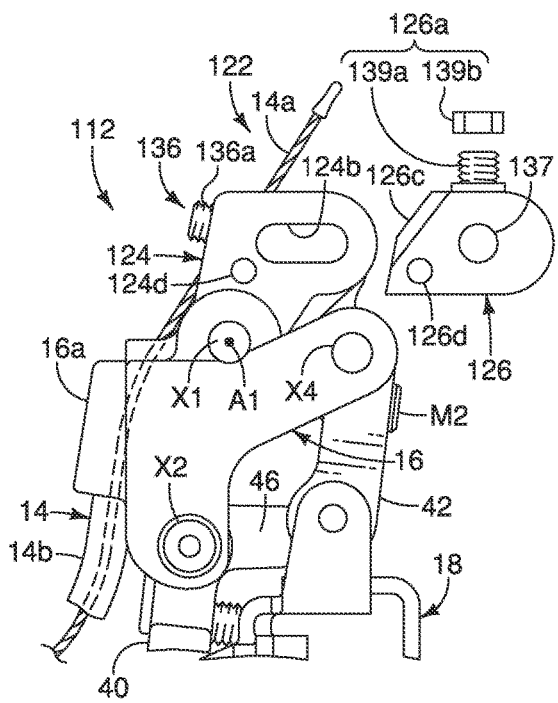
FIG. 24 is a rear elevational view of the portion of the front derailleur illustrated in FIG. 23, with selected parts exploded from the input link.
Figure 25:
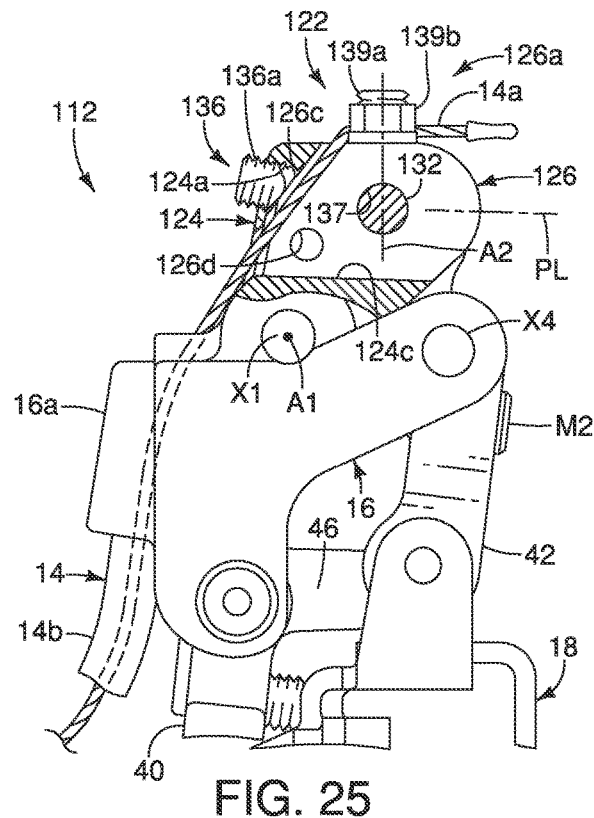
FIG. 25 is a rear elevational view of the portion of the front derailleur illustrated in FIGS. 23 and 24, with a portion of the input link broken away to show the cable attachment structure.
Figure 26:
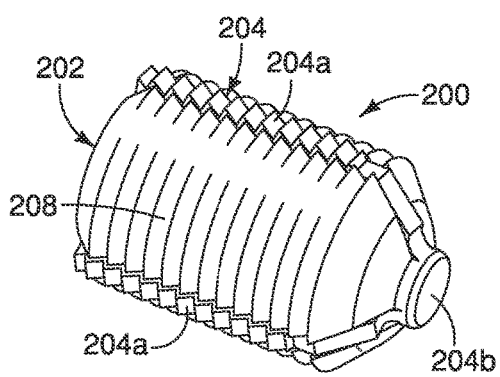
FIG. 26 is a first perspective view of a composite adjustment bolt that is used in conjunction with the front derailleurs of the first and second embodiments.
Figure 27:
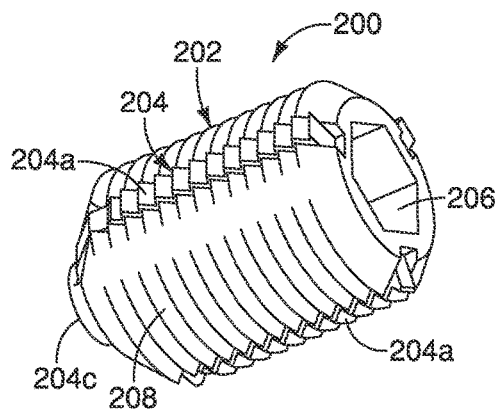
FIG. 27 is a second perspective view of the composite adjustment bolt illustrated in FIG. 26.
Figure 28:
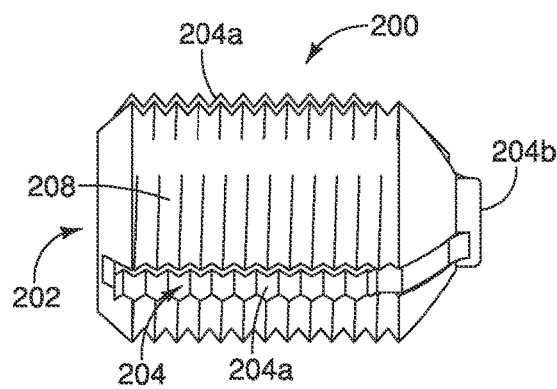
FIG. 28 is a side elevational view of the composite adjustment bolt illustrated in FIGS. 26 and 27.
Figure 29:
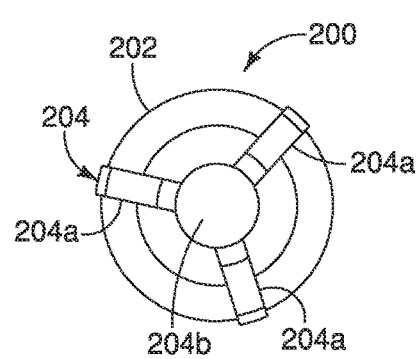
FIG. 29 is an end elevational view of the composite adjustment bolt illustrated in FIGS. 26 to 28.
Figure 30:
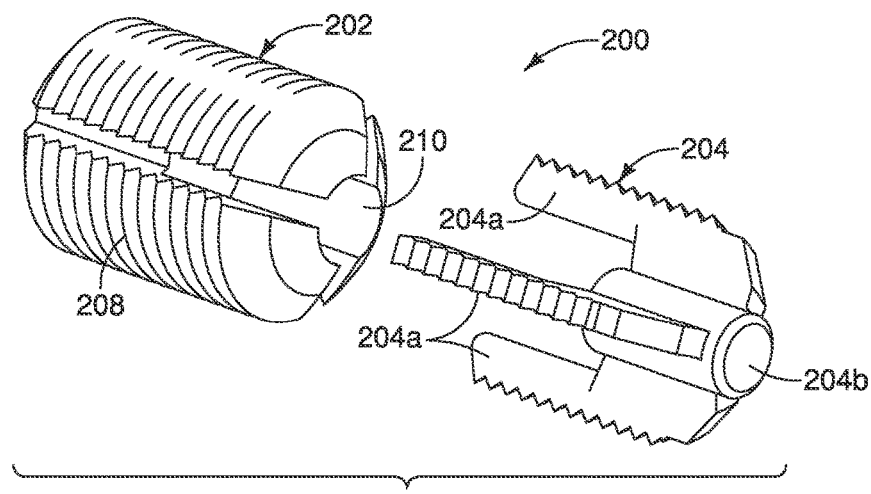
FIG. 30 is an exploded perspective view of the composite adjustment bolt illustrated in FIGS. 26 to 29.

Referring now to FIGS. 24 and 25, a modified bicycle front derailleur 112 will now be discussed. Basically, the bicycle front derailleur 112 is identical to the front derailleur 12, except that the input link 24 and the cable fixing structure 22 of the front derailleur 12 has been replaced with a modified input link 124 and a cable fixing structure 122. In view of the similarity between the bicycle front derailleurs 12 and 112, the bicycle derailleur 112 will only be briefly discussed for the sake of brevity. Moreover, the parts of the bicycle derailleur 112 which are identical or identical in function to the corresponding parts of the bicycle derailleur 12 will be given the same reference numbers.

The cable fixing structure 122 is mounted to the input link 124. The cable fixing structure 122 basically comprises a cable attachment member 126 to which the operation cable 14a is fixed. The cable fixing structure 122 further includes a fastener 132 (i.e., a fixing bolt) to slidably mount the cable attachment member 126 to the input link 124. In the second embodiment, the bicycle cable fixing structure 122 further comprises a cable tension adjusting structure 136. Thus, the cable fixing structure 122 is configured to attach the operation cable 14a to the input link 124, and to adjust the tension of the operation cable 14a relative to the input link 124. Here, the cable tension adjusting structure 136 includes an adjusting member 136a that is threaded into a bore 124a (FIG. 25) of the input link 124.

The input link 124 has a slot 124b (FIG. 25) that receives the fastener 132 that is fixed to the cable attachment member 126. In particular, the cable attachment member 126 has a threaded bore 137 in which the fastener 132 screwed into for attaching the cable attachment member 126 for sliding movement within a recess 124c (FIG. 25). A threaded shaft 139a of a cable clamping portion 126a (explained below) defines a fixing axis A2 which is a central longitudinal axis of the threaded shaft 139a. Here, in the first embodiment, the cable attachment member 126 is configured to be slide in a direction parallel to the first reference plane PL1 that is perpendicular to the fixing axis A2 while in a state where the operation cable 14a is fixed to the cable attachment member 126. The cable attachment member 126 includes the cable clamping portion 126a to which the operation cable 14a is clamped. The cable clamping portion 126a of the cable attachment member 126 is formed by the threaded shaft 139a and a fixing nut 139b. Preferably, the input link 124 has an opening 124d for receiving a tool such as tool T (see FIG. 19). The cable attachment member 126 has an opening 126d (i.e., a first tool access portion) for receiving a tool such as tool T (see FIG. 17). The In particular, the opening 126d can be aligned with the opening 124d so that the cable attachment member 126 can be set to the prescribed position with respect to the input link 124.

Referring now to FIGS. 26 to 30, a composite adjustment screw 200 is illustrated. One, some of all of the adjustment screws M1, M2, M3 and 36a can be replaced with the composite adjustment screw 200 as needed and/or or desired. The composite adjustment screw 200 is formed of at least two pieces. In particular, the composite adjustment screw 200 includes a screw body 202 and an insert member 204. The screw body 202 and the insert member 204 are made of different materials. The screw body 202 is preferably made of a hard rigid material such as a metallic material. The insert member 204 is preferably made of a material such as a plastic material (i.e., nylon) that resists loosening under vibrations and the like. The screw body 202 has a tool access portion 206 and an external thread 208. In the first illustrated embodiment, the tool access portion 206 is a blind bore with hexagonal cross section for receiving a two millimeter hex key, for example. The screw body 202 has also has a recess 210 for receiving the insert member 204. The insert member 204 can be adhesively and/or frictionally attached to the screw body 202. Here, the insert member 204 has three leg portions 204a and a connecting portion 204b. The connecting portion 204b interconnects the leg portions 204a. While the insert member 204 is illustrated as a single piece member having a unitary construction (e.g., molded), the insert member 204 can be made of several individual pieces. Also while the leg portions 204a are illustrated with grooves that basically form portions of the external thread 208, the grooves of the leg portions 204a can be omitted. In either case, preferably, the leg portions 204a are configured to protrude outwardly relative to the external thread 208 of the screw body 202 so that the leg portions 204a are deformed when screwed into a threaded hole with an internal thread that mates with the external thread 208.

Figure 31:
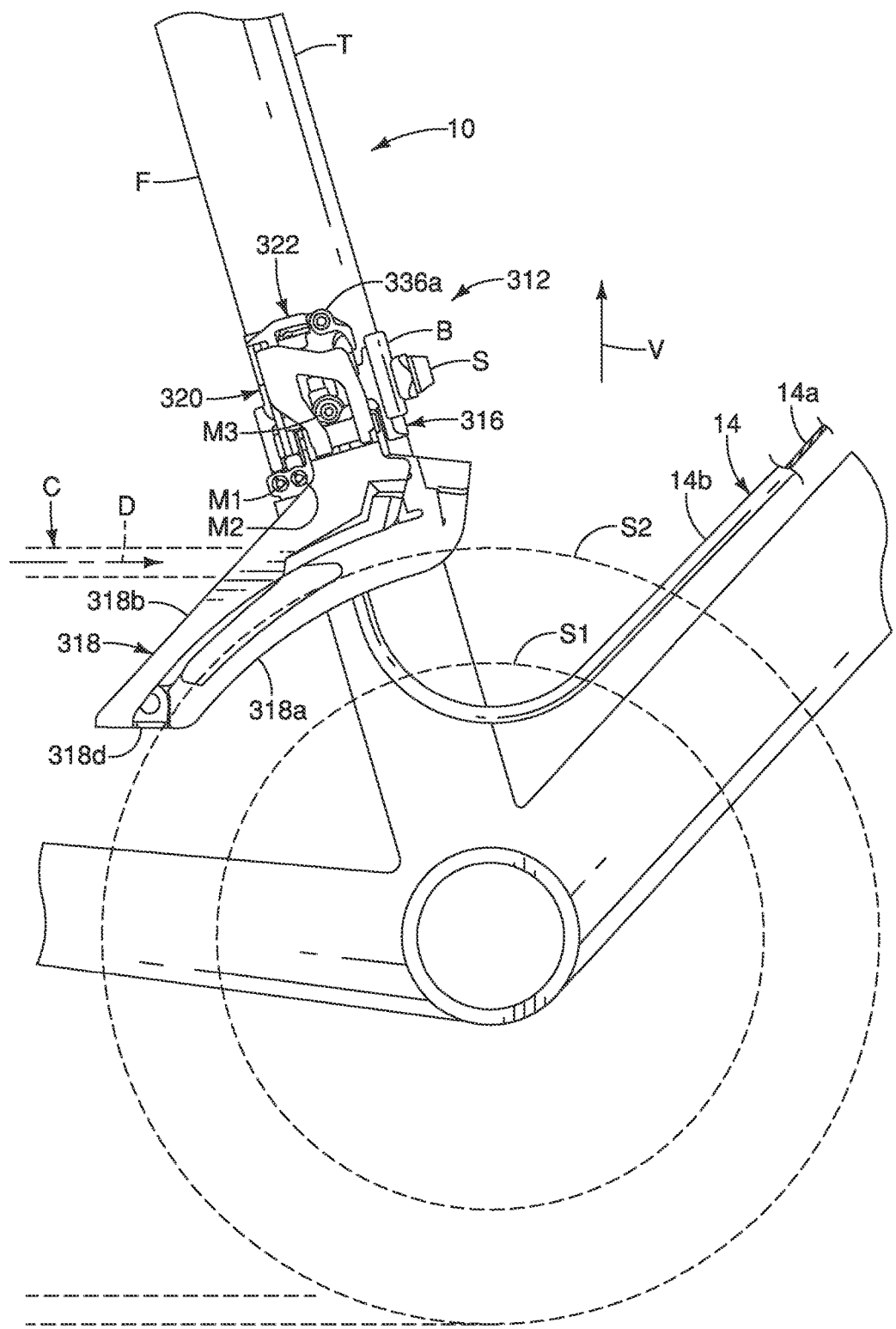
FIG. 31 is a partial side elevational view of the bicycle frame of FIG. 1, but with a bicycle front derailleur mounted thereto in accordance with a third embodiment.

Referring initially to FIG. 31, the bicycle 10 is illustrated that is equipped with a bicycle derailleur 312 in accordance with a third embodiment. Here, the derailleur 312 is mounted to the bicycle frame F of the bicycle 10 instead of the derailleur 312. In particular, the derailleur 312 is mounted to the seat tube T of the bicycle frame F by the bracket B and connected to the operation cable 14 in the same manner as the third embodiment.

Referring to FIGS. 32 to 40, the bicycle derailleur 312 basically comprises a base member 316, a chain guide 318, a linkage assembly 320 and a cable fixing structure 322. Basically, the base member 316 is fixedly mounted to the bicycle frame F in a conventional manner. The chain guide 318 is movably supported to the base member 316 by the linkage assembly 320 for moving the chain guide 318 relative to the base member 316. Thus, the linkage assembly 320 operatively couples the chain guide 318 to the base member 316. The cable fixing structure 322 is configured to fix the operation cable 14 that moves the linkage assembly 320 in response to an operation of the operation cable 14. Specifically, the inner wire 14a is attached to the linkage assembly 320, which receives the input force from a gear shifting operation to shift the chain guide 318. In this way, operation of the operation cable 14 causes the chain guide 318 to move with respect to the base member 316.

Specifically, the cable fixing structure 322 is mounted to one of the chain guide 318 and the linkage assembly 320. Here, in the third embodiment, the cable fixing structure 322 is mounted to the linkage assembly 320. In particular, in the third embodiment, the linkage assembly 320 includes an input link 324 that is pivotally mounted to the base member 316 about a pivot or mounting axis A1 by a first pivot axle X1.

Figure 37:
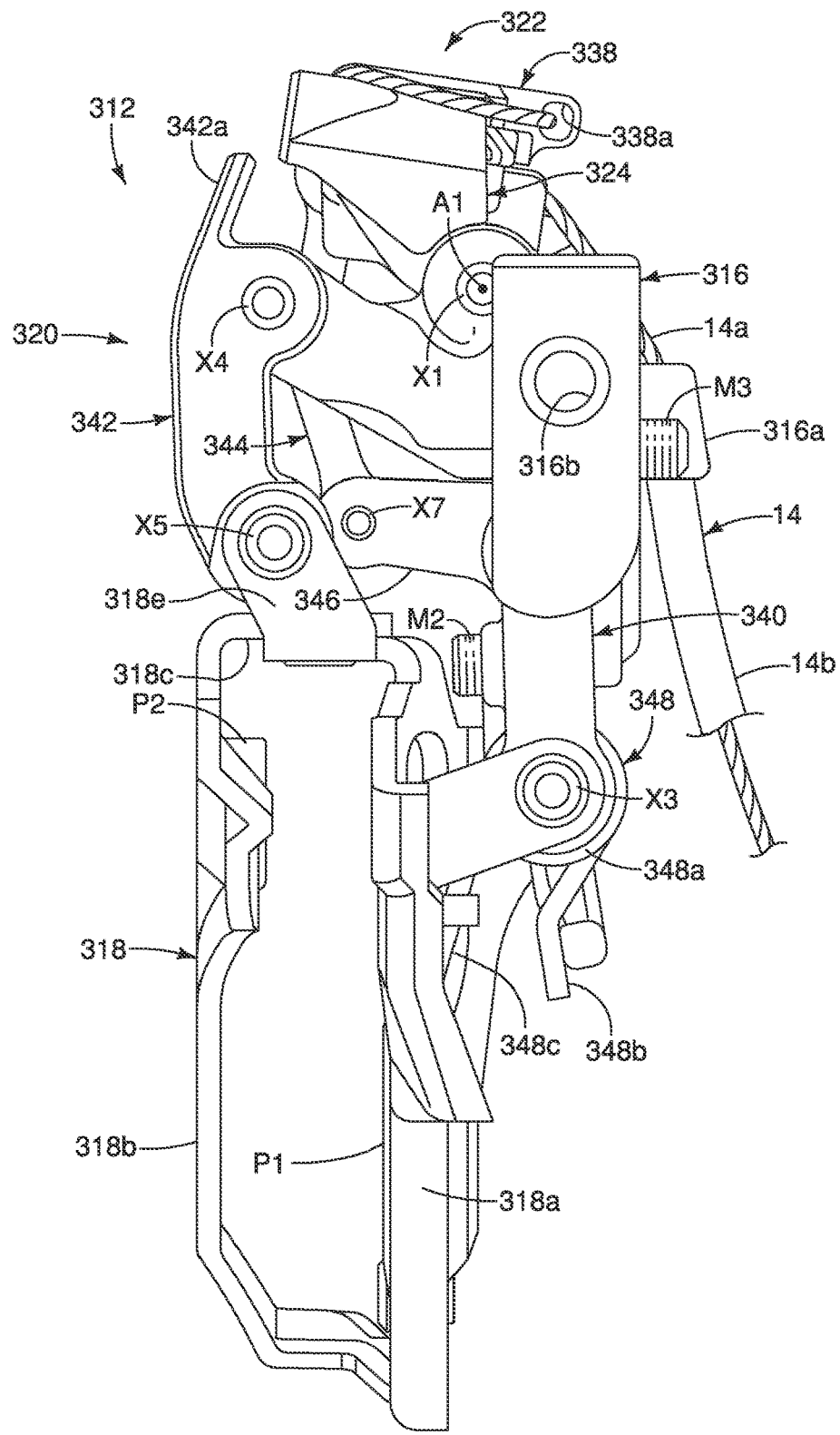
FIG. 37 is a front elevational view of the front derailleur illustrated in FIGS. 1 to 6 with the chain guide in the retracted position.
Figure 38:
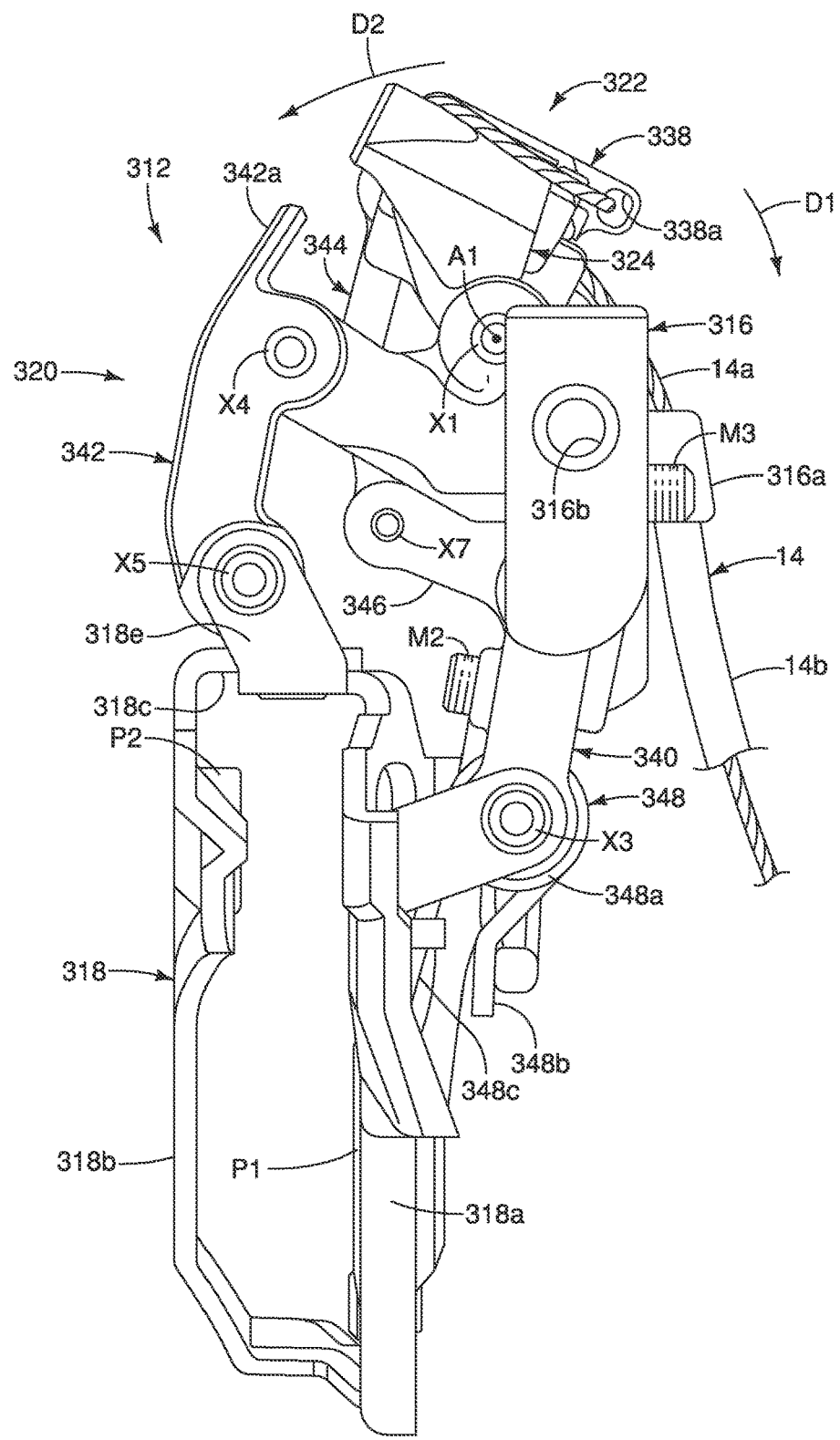
FIG. 38 is a front elevational view of the front derailleur illustrated in FIGS. 31 to 37 with the chain guide in the extended position.
Figure 39:
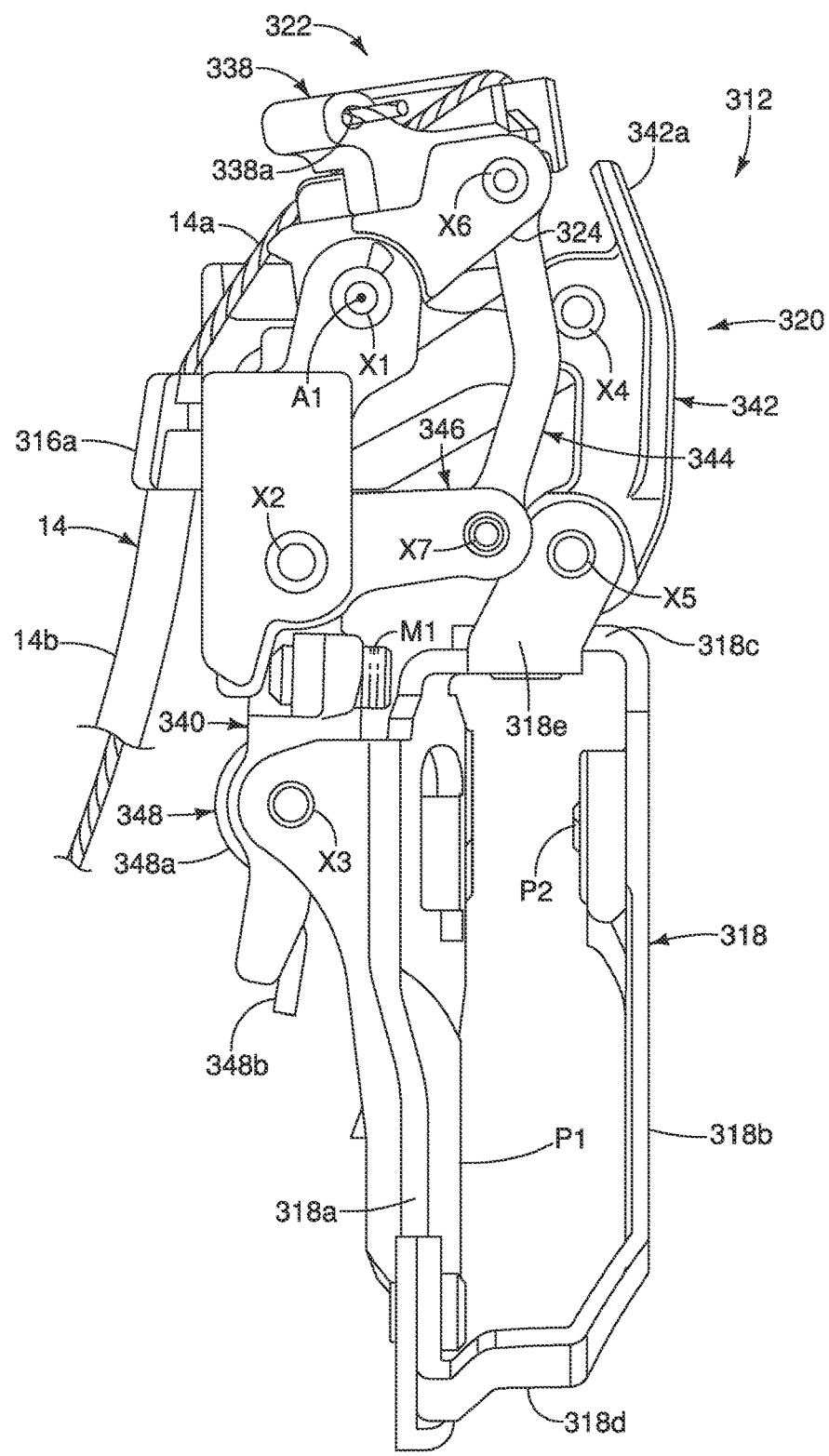
FIG. 39 is a rear elevational view of the front derailleur illustrated in FIGS. 31 to 38 with the chain guide in the retracted position.

As best seen in FIGS. 40 to 47, the cable fixing structure 322 is mounted to the input link 324. Thus, the cable fixing structure 322 is configured to fix the operation cable 14a that moves the linkage assembly 320 in response to an operation of the operation cable 14a. More specifically, in the first illustrated embodiment, when the chain guide 318 is in the retracted position, the chain guide 318 shifts from the retracted position (FIGS. 37 and 39) to the extended position (FIGS. 38 and 40) in response to the operation cable 14a being pulled. As explained below, the input link 324 is biased so that the chain guide 318 is biased towards retracted position (FIGS. 37 and 39). As a result of the operation cable 14a being released, the cable fixing structure 322 and the input link 324 rotate together about the pivot axis A1 in a first operating direction D1. When the operation cable 14a is pulled, the cable fixing structure 322 and the input link 324 rotate together about the pivot axis A1 in a second operating direction D2. Thus, when the chain guide 318 is in the extended position, the chain guide 318 shifts from the extended position (FIGS. 38 and 40) to the retracted position (FIGS. 37 and 39) in response to the operation cable 14a being released.

Here, in the third embodiment, as seen in FIGS. 41 to 47, the cable fixing structure 322 includes a cable attachment member 326 to which the operation cable 14 is fixed. The cable fixing structure 322 is free of an outer casing holder in which an end of the outer casing 14b for the operation cable 14a is held. In the third embodiment, as explained later, the base member 316 is provided with an outer casing holder 316a. The cable attachment member 326 is movable with respect to the one of the chain guide 318 and the linkage assembly 320, to which the cable attachment member 326 is mounted, in a state where the operation cable 14 is fixed to the cable attachment member 326. Thus, broadly speaking, the bicycle cable fixing structure 322 is configured to fix the operation cable 14a, which moves a bicycle component (e.g., the front derailleur 312) in response to an operation of the operation cable 14a.

Here, in the third embodiment, the cable fixing structure 322 includes a fastener 332 to fix the operation cable 14 to the cable attachment member 326. The fastener 332 extends through the cable attachment member 326 in a direction of a fixing axis A2. The cable attachment member 326 is rotatably mounted around the fixing axis A2 of the fastener 332. In this embodiment, the fixing axis A2 and the pivot axis A1 are transverse (nonparallel) to each other as viewed from a direction perpendicular to both the pivot axis A1 and the fixing axis A2.

As seen in FIGS. 41 to 47, the cable attachment member 326 is rotatably mounted to the input link 324. The cable attachment member 326 is configured to selectively rotate in a cable pulling direction R1 and a cable releasing direction R2 around the fixing axis A2 of the fastener 332 relative to the linkage assembly 320 to which the cable attachment member 326 is mounted. The cable attachment member 326 is configured to be movable in the cable pulling direction R1 in the state where the operation cable 14a is fixed to the cable attachment member 326. In other words, the cable attachment member 326 is movable with respect to the input link 324 around the fixing axis A2, while the operation cable 14a is fixed to the cable attachment member 326. As explained below, this arrangement permits the tension in the operation cable 14a to be adjusted while the operation cable 14a is fixed to the cable attachment member 326.

The cable attachment member 326 includes a cable clamping portion 326a to which the operation cable 14 is clamped. The cable clamping portion 326a of the cable attachment member 326 is formed by a mounting part 328 and a fixing washer 330. The mounting part 328 is rotatably mounted to the input link 324 for rotation about the fixing axis A2 within a predefined range of movement. The cable fixing structure 322 further includes the fastener 332 (i.e., a fixing bolt) to fix the operation cable 14a to the cable attachment member 326. In particular, the fastener 332 pushes the fixing washer 330 against the mounting part 328 as the fastener 332 is tightened to clamp the operation cable 14a therebetween. In this way, the cable attachment member 326 is configured to have the operation cable 14a fixed thereto by the fastener 332. Thus, the mounting part 328, the fixing washer 330 and the fastener 332 define a cable clamp that fixes the operation cable 14a to the cable attachment member 326. The fastener 332 extends through the cable attachment member 326 in a direction of the fixing axis A2. The fixing axis A2 coincides with the longitudinal center axis of the fastener 332. The fastener 332 has a threaded shaft 332a and a head 332b. The mounting part 328 includes a threaded bore 328a for threadedly engaging the threaded shaft 332a of the fastener 332. The fixing washer 330 includes a non-threaded bore 330a for the threaded shaft 332a of the fastener 332 to pass therethrough. Here, the surface of the mounting part 328 that contacts the fixing washer 330 has a groove 328b for receiving the operation cable 14a.

The cable attachment member 326 includes a restricting structure 334 that is configured to selectively restrict a movement of the cable attachment member 326 in the cable pulling direction R1. The restricting structure 334 is integrally formed with the mounting part 328. The restricting structure 334 includes a first abutment 334a and a second abutment 334b. The mounting part 328 and the restricting structure 334 are configured with respect to the input link 324 to form a twist mount arrangement that is similar to a bayonet mount for attaching the cable attachment member 326 to the input link 324. The attachment of the cable attachment member 326 to the input link 324 will be explained later. The restricting structure 334 is used for preventing a rotation of the mounting part 328 together with the fastener 332 relative to the input link 324, when the operation cable 14 a is fixed to the cable attachment member 326. It will be explained later how to restrict the rotation of the mounting part together with the fastener 332 by using restricting structure.

In the third embodiment, the bicycle cable fixing structure 322 further includes a cable tension adjusting structure 336. The cable tension adjusting structure 336 is provided on the input link 324 of the linkage assembly 20. Thus, in the third embodiment, the bicycle cable fixing structure 322 basically comprises the cable attachment member 326 and the cable tension adjusting structure 336. The cable tension adjusting structure 336 is configured to move the cable attachment member 326 relative to the one of the chain guide 318 and the linkage assembly 320, to which the cable attachment member 326 is mounted. Preferably, the cable tension adjusting structure 336 includes an adjusting member 336a to adjust a position of the cable attachment member 326 with respect to the one of the chain guide 318 and the linkage assembly 320, to which the cable attachment member 326 is mounted. Specifically, the adjusting member 336a is a screw that is threaded into a bore of the one of the chain guide 318 and the linkage assembly 320. Here the adjusting member 336a threads into a bore 324a of the input link 324 of the linkage assembly 320. The adjusting member 336a contacts the first abutment 334a of the restricting structure 334, while the fixing washer 330 contacts the second abutment 334b so that the fixing washer 330 and the restricting structure 334 rotate together about the fixing axis A2. By turning the adjusting member 336a, the adjusting member 336a allows the restricting structure 334 to rotate in either in the cable pulling direction R1 or the cable releasing direction R2. Thus, the cable tension adjusting structure 336 is configured to move the cable attachment member 326 relative to the input link 324.

Now a tensioning adjusting operation of the inner operation cable 14a will be discussed. Basically, the adjusting member 336a is turned in a clockwise direction to screw into the input link 324, which causes the tip of the adjusting member 336a pushes against the first abutment 334a of the restricting structure 334 to rotate the cable attachment member 326 about the fixing axis A2 in the cable pulling direction R1. As the cable attachment member 326 rotates about the fixing axis A2, the inner operation cable 14a is pulled and tension of the inner operation cable 14a increases. When the adjusting member 336a is turned in a counterclockwise direction to screw out of the input link 324, the tip of the adjusting member 336a moves in an opposite direction from the first abutment 334a of the restricting structure 334 so that the cable attachment member 326 rotates along with the adjusting member 336a about the fixing axis A2 in the cable releasing direction R2 by a pulling force of the inner operation cable 14a.

In the third embodiment, the cable tension adjusting structure 336 is provided on the input link 324 of the linkage assembly 320. As a result, the cable tension adjusting structure 336 is configured to move the cable attachment member 326 relative to the input link 324 of the linkage assembly 320. The adjusting member 336a is configured to abut the cable attachment member 326 for restricting a movement of the cable attachment member 326 in the cable releasing direction R2. Thus, in the third embodiment, the cable attachment member 326 is configured to selectively rotate in the cable pulling direction R1 and the cable releasing direction R2 by the operation of the adjusting member 336a. In other words, if the adjusting member 336a is screwed into the bore 324a of the input link 324 of the linkage assembly 320, then the cable attachment member 326 is configured to rotate in the cable pulling direction R1 about the fixing axis A2. On the other hand, if the adjusting member 336a is screwed out of the input link 234 of the linkage assembly 320, then the cable attachment member 326 is configured to rotate in the cable releasing direction R2 about the fixing axis A2 by pulling force via the operation cable 14a. In this way, the adjusting member 336a is configured to abut the abutment 334a of the cable attachment member 326 to define an angular position of the cable attachment member 326 about the fixing axis A2 with respect to the input link 324. In other words, the adjusting member 336a is configured to abut the abutment 334b of the cable attachment member 326 for restricting a movement of the cable attachment member 326 in a cable releasing direction R2. The adjusting member 336a of the cable tension adjusting structure 336 is configured to move the cable attachment member 326 in a direction parallel to a second reference plane PL2 (see FIG. 40) that is perpendicular to the fixing axis A2 while in a state where the operation cable 14a is fixed to the cable attachment member 326. In particular, the cable attachment member 326 rotates in a direction parallel to the reference plane PL.

The adjusting member 336a is disposed at a downstream side of the abutment 334b with respect to a fixing direction. The fixing direction is defined as a rotational direction of the fastener 332 to fix the operation cable 14 to the cable attachment member 326. Therefore, when the fastener 332 is turned to fix the cable 14 to the cable attachment member 326, the cable attachment member 326 is prevented to rotate together with the fastener by the abutment 334b abutting the adjusting member 336a. Thus, in the third embodiment, the tool to prevent the rotation of the cable attachment member, which is used in the first embodiment, is not needed. The adjusting member 336a includes a second tool access portion 336b, which is configured for a tool to access to operate the adjusting member 336a. The second tool access portion 336b is accessibly arranged relative to the one of the chain guide 318 and the linkage assembly 320 to allow the tool to access the second tool access portion 336b while the chain guide 318 is positioned in the retracted position and while the chain guide 318 is positioned in the extended position.

The second tool access portion 336b is accessibly arranged relative to the one of the chain guide 318 and the linkage assembly 320 to allow the tool to access the second tool access portion 336b from a side opposite to the bicycle frame F in a state where the base member 316 is mounted to the bicycle frame F.

Figure 42:
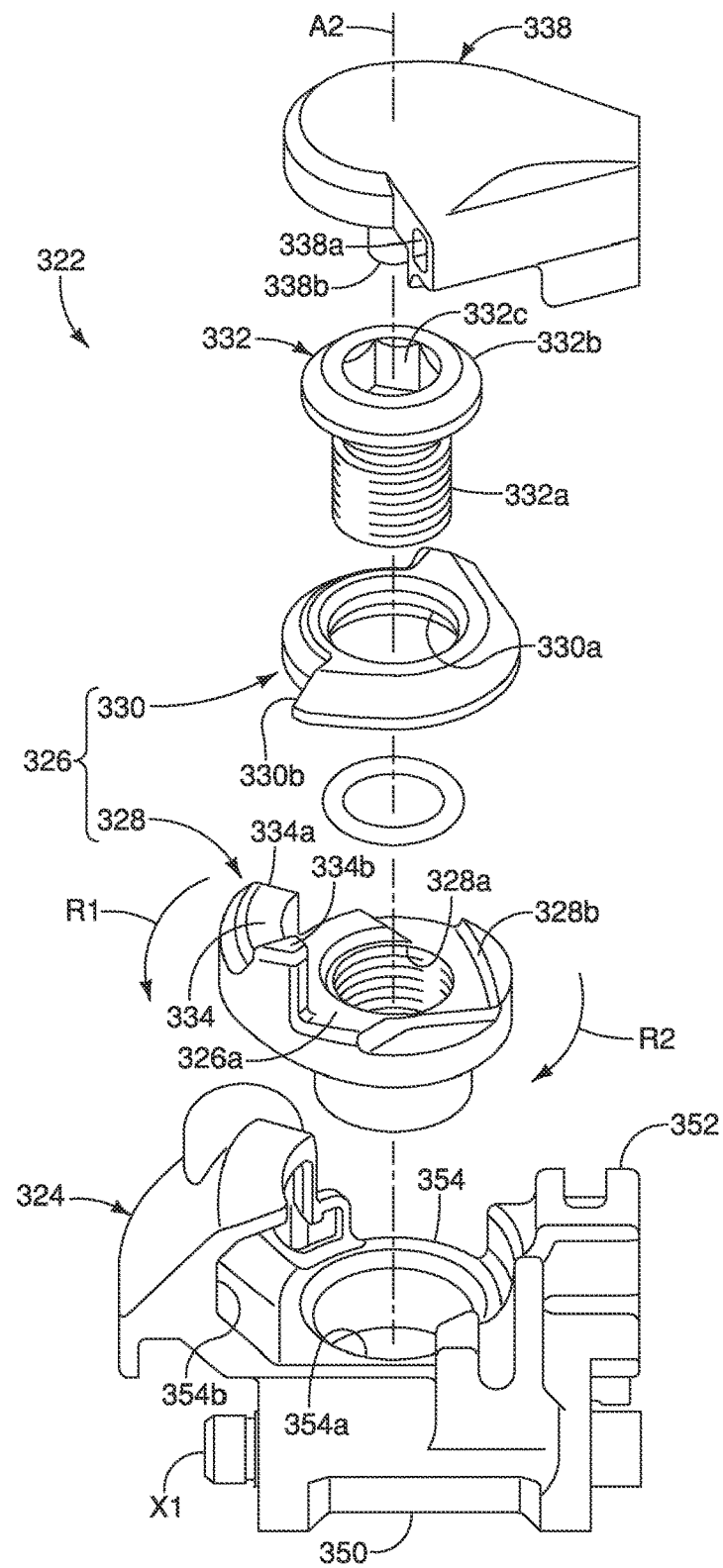
FIG. 42 is an exploded top perspective view of the bicycle cable fixing structure and the input link of the front derailleur illustrated in FIGS. 31 to 39.

As seen in FIG. 42, the bicycle derailleur further comprises a cover 338 configured to be detachably attached to the one of the chain guide 318 and the linkage assembly 320 to cover the cable fixing structure 322. The cover 338 includes a cable holder 338a that is configured to hold an end of the operation cable 14. The cover 338 includes a projection 338b that frictionally engages a through hole 332c of the fastener 332.

As best seen in FIG. 31, the base member 316 is configured to be mounted to the bicycle frame F. Basically, the base member 316 is fixedly coupled to the bracket B on a seat tube of the bicycle frame F by a mounting screw S as shown in FIG. 31. The screw S is threaded into a threaded hole 16b of the base member 316. While the base member 316 is illustrated as a "braze-on type" of mounting structure, the base member 316 is not limited to this type of mounting structure. For example, the base member 316 of the front derailleur 12 can be replaced with a base member have a "clamp band type" of a bicycle mounting portion, if needed and/or desired.

In the third embodiment, as mentioned above, the outer casing holder 16a is provided on the base member 316 and constitutes an outer casing receiving part in which an end of the outer casing 14b of the operation cable 14a is held. The outer casing holder 316a has a stepped through bore that receives an end portion of the outer casing 14b in through an inlet end of the through bore such that the inner operation cable 14a passing out though an outlet end of the through bore. Here in the illustrated embodiment, the outer casing holder 316a and the base member 316 are formed as a one-piece member. However, it will be apparent from this disclosure that the outer casing holder 316a could be a separate member from the base member 316 and attached to the bicycle frame F.

Referring to FIGS. 32 to 40, the linkage assembly 320 will now be discussed in further detail. The linkage assembly 320 pivotally connects the chain guide 318 to the base member 316. In addition to the input link 324, the linkage assembly 320 further includes a first link 340 and a second link 342 that are pivotally mounted to the base member 316 to transmit a pulling force of the operation cable 14 to one of the first and second links 340 and 342. The linkage assembly 320 includes a first link 340 pivotally coupled to the base member 316. The cable fixing structure 322 is mounted to the input link 324.

The linkage assembly 320 further includes at least one connecting link 344 that operatively connects the input link 324 to one of the first and second links 340 and 342. In the first illustrated embodiment, the linkage assembly 320 further includes an extension link 346 for operatively connecting the connecting link 344 to the first link 340. In the first illustrated embodiment, the connecting link 344 interconnects the input link 324 to the extension link 346. In this way, operation of the operation cable 14a causes the chain guide 318 to move with respect to the base member 316 via the linkage assembly 320.

As best seen in FIGS. 36 to 40, the connections of the linkage assembly 320 between the base member 316 and the chain guide 318 will now be explained. The first link 340 has a first end portion pivotally mounted to the base member 316 via a second pivot axle X2, and a second end portion pivotally mounted to the chain guide 318 by a third pivot axle X3. The second link 342 has a first end portion pivotally mounted to the base member 316 via a fourth pivot axle X4, and a second end portion pivotally mounted to the chain guide 318 by a fifth pivot axle X5. Thus, the base member 316, the chain guide 318 and the first and second links 340 and 342 define the four-bar linkage. The connecting link 344 has a first end portion pivotally coupled to the input link 324 by a sixth pivot axle X6, and a second end portion pivotally coupled to the extension link 346 at a seventh pivot axle X7. The extension link 346 is pivotally mounted on the second pivot axle X2 and transmits the movement of the input link 324 to the first link 340 via the connecting link 344. During operation of the operation cable 14a, the extension link 346 pivots about the second pivot axle X2 and transfers the operating force to the first link 340 of the linkage assembly 320. At the same time, the second link 342 pivots about the fourth and fifth pivot axles X4 and X5.

As mentioned above, the cable attachment member 326 is configured to rotate in the cable pulling direction R1 and the cable releasing direction R2 around the fixing axis A2 of the fastener 332 relative to the linkage assembly to which the cable attachment member 326 is mounted. The cable attachment member 326 is configured to be movable in the cable pulling direction R1 in the state where the operation cable 14a is fixed to the cable attachment member 326. In other words, the cable attachment member 326 is movable with respect to the input link 324 around the fixing axis A2, while the operation cable 14a is fixed to the cable attachment member 326. As explained below, this arrangement permits the tension in the operation cable 14a to be adjusted while the operation cable 14a is fixed to the cable attachment member 326.

The cable fixing structure 322 is free of an outer casing holder in which an end of the outer casing 14b for the operation cable 14a is held. In the third embodiment, as explained later, the base member 316 provided with an outer casing holder 316a. The cable attachment member 326 is movable with respect to the one of the chain guide 318 and the linkage assembly 320, to which the cable attachment member 326 is mounted, in a state where the operation cable 14a is fixed to the cable attachment member 326. Thus, broadly speaking, the bicycle cable fixing structure 322 is configured to fix the operation cable 14a, which moves a bicycle component (e.g., the front derailleur 312) in response to an operation of the operation cable 14a.

Referring back to FIG. 31, the chain guide 318 is configured to be movable between retracted and extended positions with respect to the base member 316. Specifically, the chain guide 318 is pivotally supported with respect to the base member 316 to move the chain C in a transverse direction with respect to a center longitudinal plane of the bicycle frame F. In the illustrated embodiment, the extended position is farther from the bicycle frame F than the retracted position in the transverse direction. Here, the chain guide 318 is designed to shift the chain C between the chain rings S1 and S2 as the chain guide 318 moves between the retracted and extended position depending on whether the operation cable 14 is pulled or released. Thus, in the third embodiment, when the chain guide 318 is in the retracted position (best depicted in FIGS. 37 and 39), the derailleur 312 shifts to the extended position (best depicted in FIGS. 38 and 40) in response to the operation cable 14 being pulled. On the other hand, in the third embodiment, when the chain guide 318 is in the extended position, the derailleur 312 shifts to the retracted position in response to the operation cable 14 being released.

As best seen in FIGS. 41 to 47, the cable fixing structure 322 is mounted to the input link 324. Thus, the cable fixing structure 322 is configured to fix the operation cable 14a that moves the linkage assembly 320 in response to an operation of the operation cable 14a. More specifically, in the first illustrated embodiment, when the chain guide 318 is in the retracted position, the chain guide 318 shifts from the retracted position (FIGS. 32 to 37 and 39) to the extended position (FIGS. 38 and 40) in response to the operation cable 14a being pulled.

As explained below, the input link 324 is biased so that the chain guide 318 is biased towards retracted position (FIGS. 32 to 37 and 39). As a result of the operation cable 14a being released, the cable fixing structure 322 and the input link 324 rotate together about the pivot axis A1 in a first operating direction D1. When the operation cable 14a is pulled, the cable fixing structure 322 and the input link 324 rotate together about the pivot axis A1 in a second operating direction D2. Thus, when the chain guide 318 is in the extended position, the chain guide 318 shifts from the extended position (FIGS. 38 and 40) to the retracted position (FIGS. 32 to 37 and 39) in response to the operation cable 14a *being released*.

Figure 32:
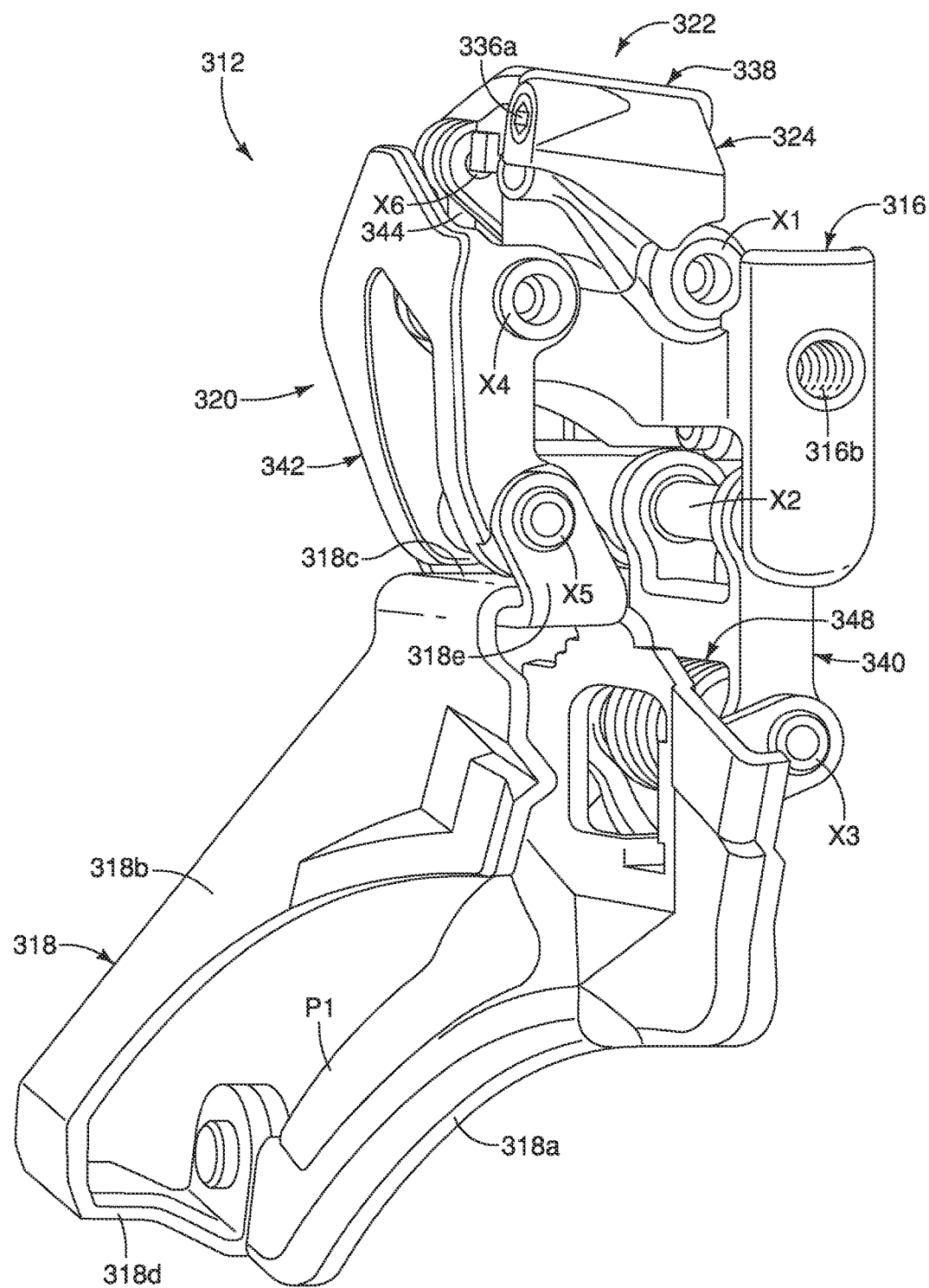
FIG. 32 is a front outside perspective view of the front derailleur illustrated in FIG. 31.
Figure 33:
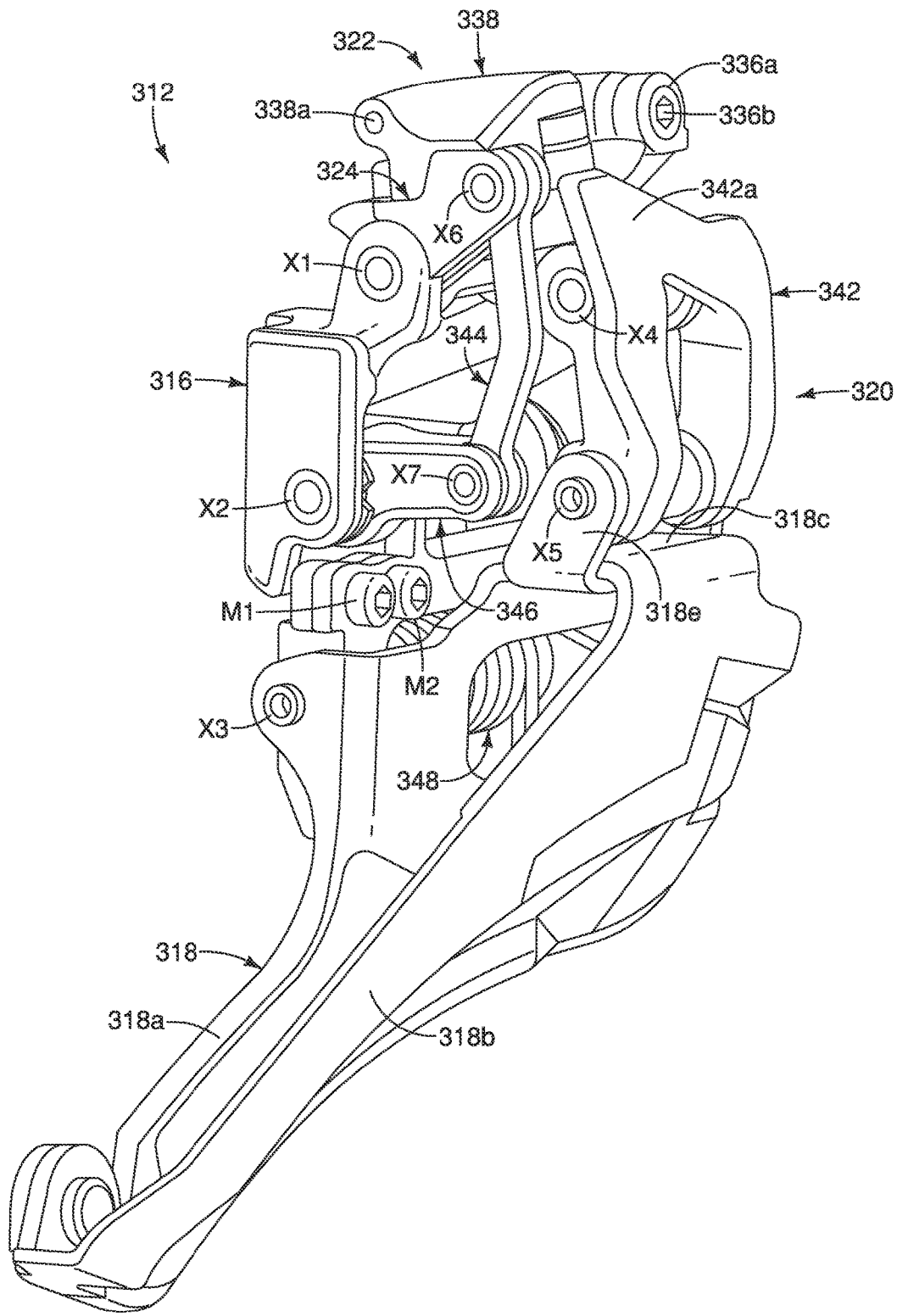
FIG. 33 is a rear outside perspective view of the front derailleur illustrated in FIGS. 31 and 32.
Figure 34:
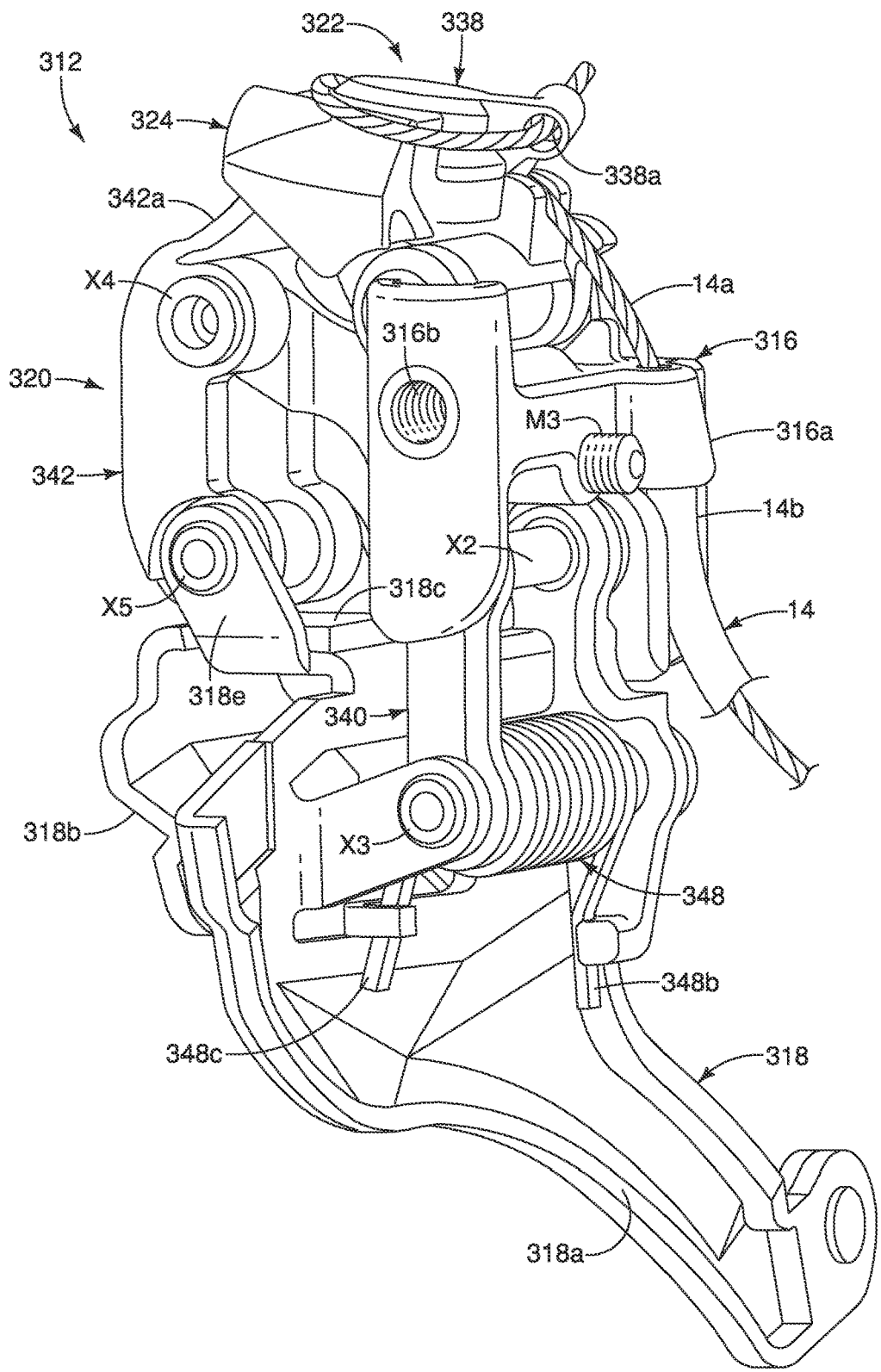
FIG. 34 is a front inside perspective view of the front derailleur illustrated in FIGS. 1 to 3.
Figure 35:
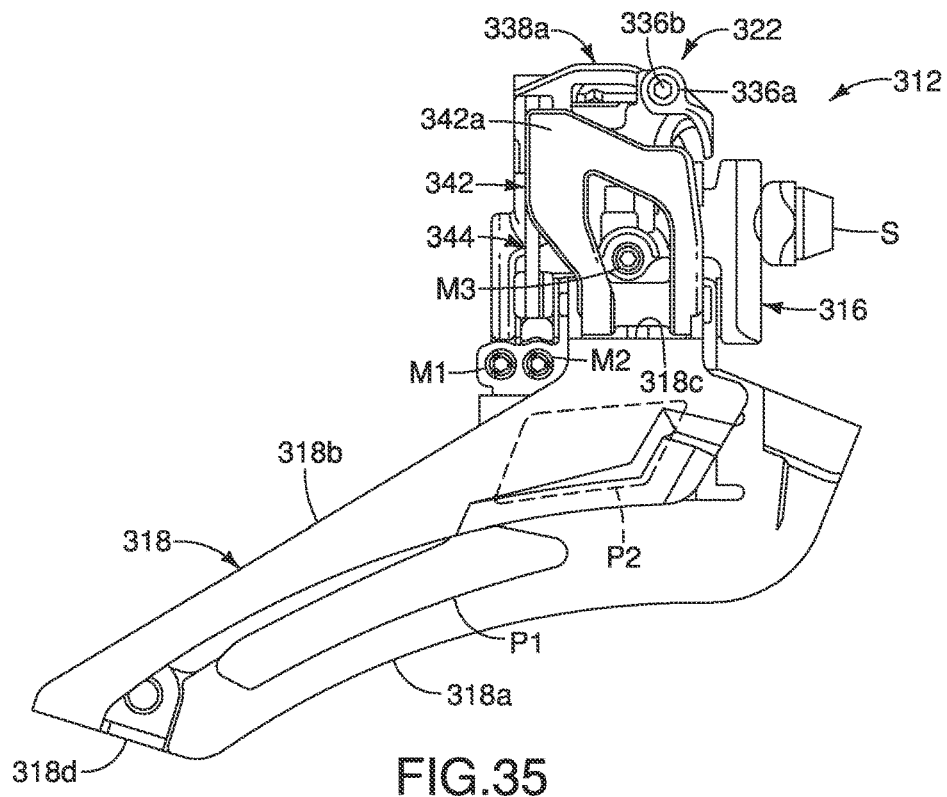
FIG. 35 is an outside elevational view of the front derailleur illustrated in FIGS. 31 to 34.

As best seen in FIGS. 32 to 34, the chain guide 318 includes a first guide plate 318a and a second guide plate 318b disposed farther from the seat tube when the bracket B is mounted to the seat tube. The first and second guide plates 318a and 318b form a chain receiving slot therebetween. The first and second guide plates 318a and 318b are provided with non-metal pads P1 and P2 to aid in the shifting of the chain C between the sprockets S1 and S2. The non-metal pads P2 is attached to an inner surface of the second guide plate 318b by adhesive or fastener. The non-metal pad P2 is configured to protrude from the inner surface of the second guide plate 318b to contact a bicycle chain C to prevent dropping of the chain C from the large chain ring S2, when the chain guide 318 moves from the retracted position to the extended position. The first guide plate 318a is connected to the second guide plate 318b by a first or upper connecting portion 318c and a second or rear-end connecting portion 318d. In the illustrated embodiment, the first guide plate 318a, the second guide plate 318b, the first connecting portion 318c and the second connecting portion 318d are formed as a one-piece, unitary member by bending a single piece of a metal sheet. The first connecting portion 318c includes a pair of attachment flanges 318e. The attachment flanges 318e are pivotally connected to the second link 342 by the fifth pivot axle X5.

Figure 36:
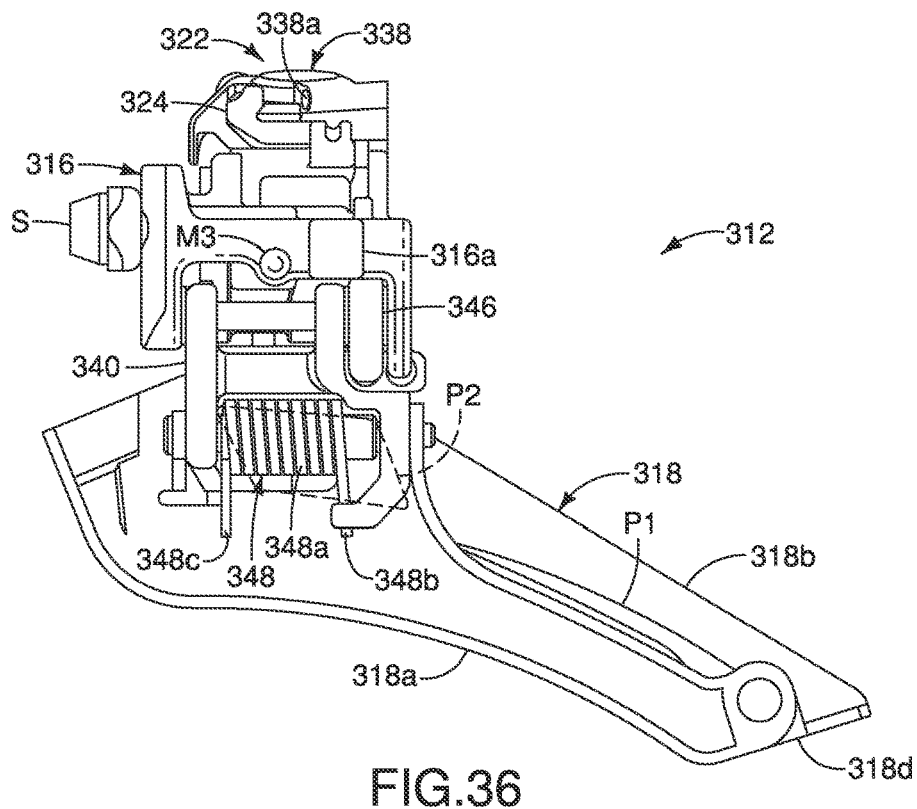
FIG. 36 is an inside elevational view of the front derailleur illustrated in FIGS. 31 to 35.

In the third embodiment, as best seen in FIGS. 34 and 36, the chain guide 318 is biased in the retracted position relative to the base member 316 by a biasing member 348. The biasing member 348 has a coiled portion 348a that is disposed around a pivot axle of the linkage assembly 320. The biasing member 348 has a first free end portion 32b that contacts the linkage assembly 320 and a second free end portion 32c that contacts the second guide plate 318b. Thus, the biasing member 348 is operatively disposed between the base member 316 and the chain guide 318. In the illustrated embodiment, the biasing member 348 biases the chain guide 318 towards the retracted position so as to position the chain guide 318 over the small chain ring S1. Thus, in the third embodiment, the retracted position constitutes an initial state or rest position of the chain guide 318. In particular, the biasing member 348 maintains the chain guide 318 at the retracted position when the operation cable 14 is released or detached from the bicycle front derailleur 312.

In the third embodiment, the biasing member 348 and the linkage assembly 320 are arranged with respect to the base member 316 and the chain guide 318 to form a down-swing derailleur, as previously mentioned. A down-swing derailleur refers to a derailleur that has its chain guide mounted at the bottom pivot axes of the linkage assembly that carries it. The derailleur 312 of the illustrated embodiment is also a bottom-pull derailleur because the operation cable 14 is pulled in a downward direction to move the chain guide 318 against the biasing force of the biasing member 348 while the bicycle frame F is in a level, upright position.

Figure 43:
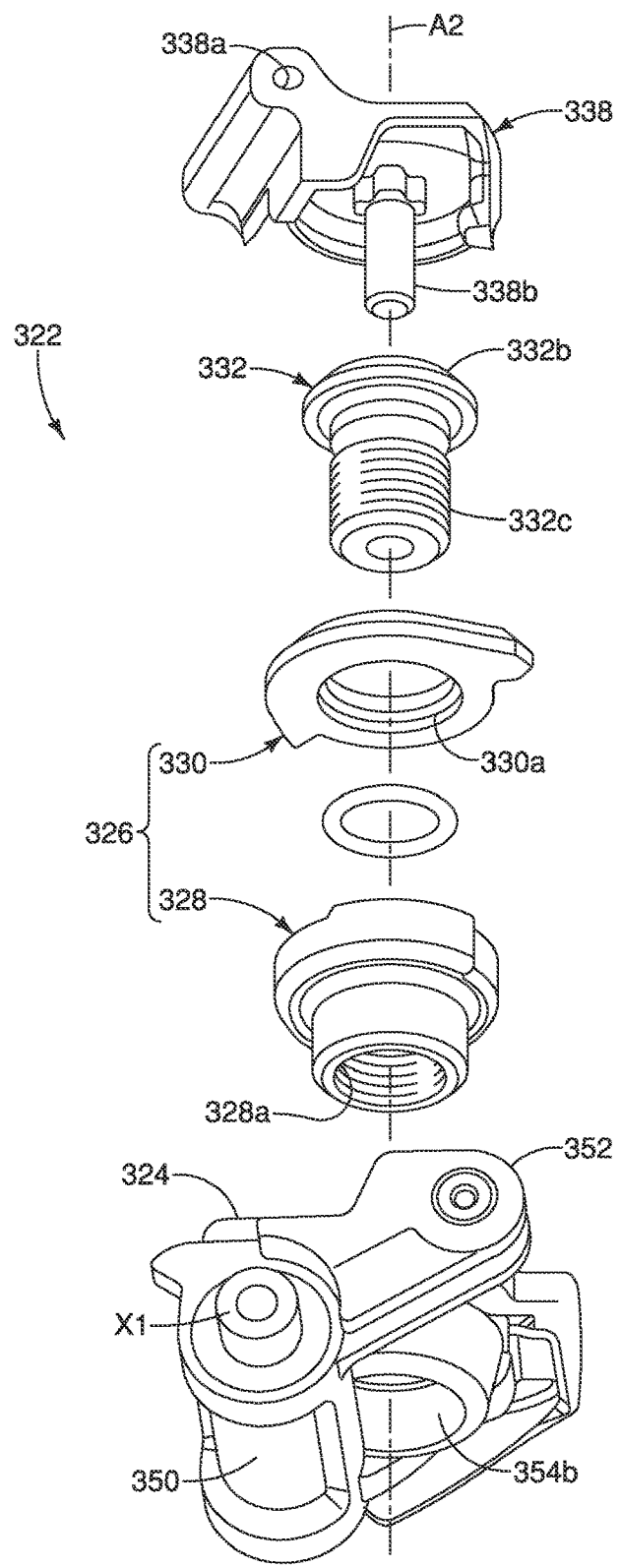
FIG. 43 is an exploded bottom perspective view of the bicycle cable fixing structure and the input link of the front derailleur illustrated in FIGS. 31 to 39.
Figure 44:
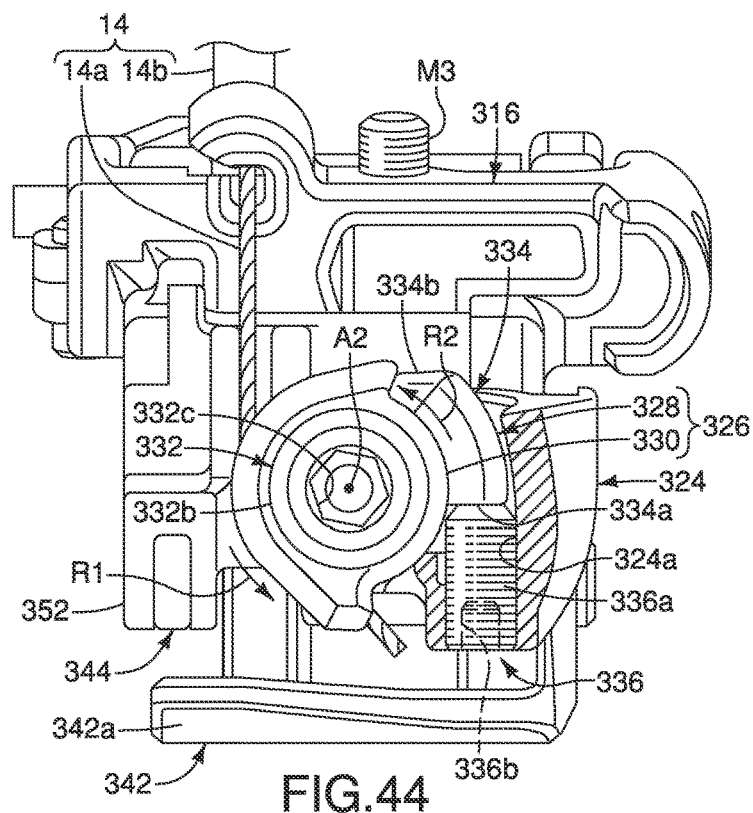
FIG. 44 is a top view, similar to FIG. 41, of the selected parts of the front derailleur illustrated in FIG. 41, but with the cover of the bicycle cable fixing structure removed.
Figure 45:
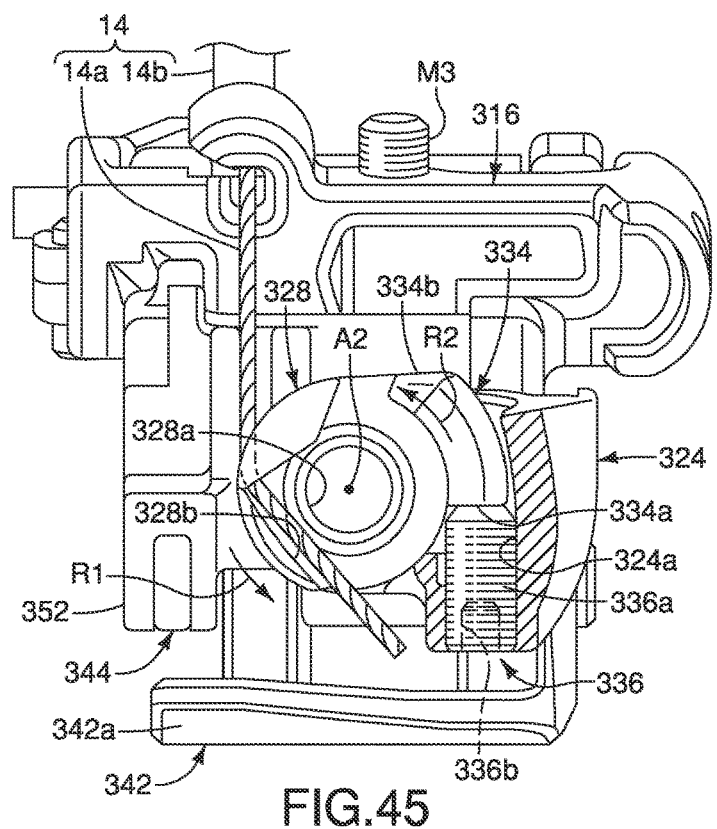
FIG. 45 is a top view, similar to FIG. 44, of the selected parts of the front derailleur illustrated in FIG. 41, but with the fastener and the fixing washer of the bicycle cable fixing structure removed.
Figure 46:
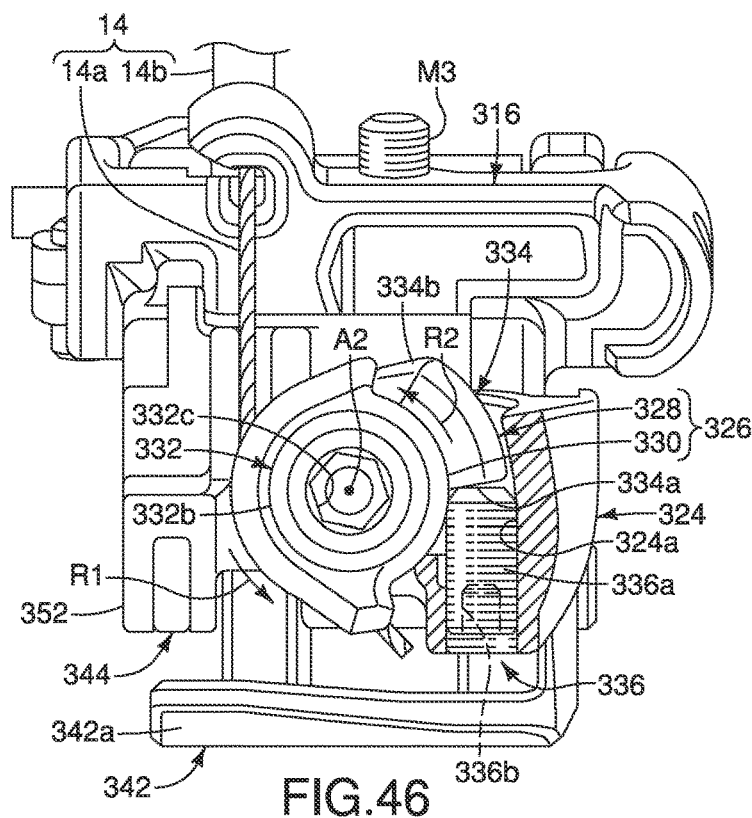
FIG. 46 is a top view, similar to FIG. 44, of the selected parts of the front derailleur illustrated in FIG. 41, but with the bicycle cable fixing structure rotated to increase the tension in the inner wire.
Figure 47:
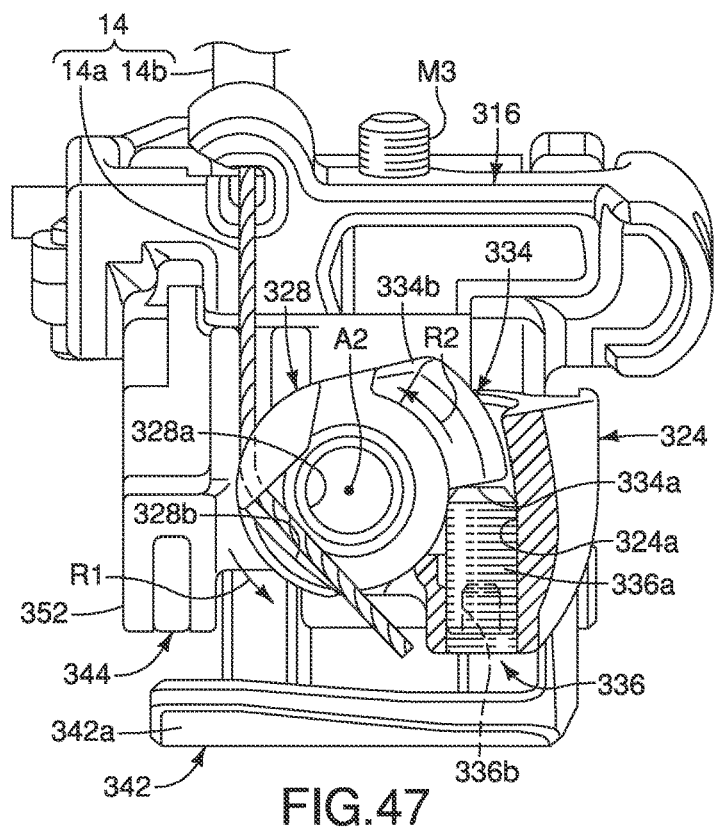
FIG. 47 is a top view, similar to FIG. 46, of the selected parts of the front derailleur illustrated in FIG. 41, but with the fastener and the fixing washer of the bicycle cable fixing structure removed.

Referring mainly to FIGS. 42 and 43, the input link 324 will now be discussed in further detail. The input link 324 basically includes a pivot portion 350, a connecting link coupling portion 352 and a cable attachment part 354. The pivot portion 350 is configured to pivotally attach the input link 324 to the base member 316. In particular, the pivot portion 350 has a pivot axle receiving bore for receiving the first pivot axle X1. The connecting link coupling portion 352 is configured to pivotally attach the connecting link 344 to the input link 324.

The cable attachment part 354 has a bore 354a and a curved recess 354b for rotatably supporting the cable attachment member 326 on the input link 324. In particular, the mounting part 328 is received in the bore 354a while the restricting structure 334 is received in the curved recess 354b. The cable attachment member 326 is installed on the input link 324 by first inserting the mounting part 328 into the bore 354a and that rotating the restricting structure 34 into the curved recess 354b. In this way, the cable attachment member 326 cannot be removed from the input link 324 by pulling the cable attachment member 326 along the fixing axis A2. Thus, a twist mount arrangement is formed that is similar to a bayonet mount for attaching the cable attachment member 326 to the input link 324.

The first link 340 includes a first adjusting member M1 and a second adjusting member M2 attached thereto. The first and second adjusting members M1 and M2 are configured to adjust a movement amount of the chain guide 318. The first and second adjusting members M1 and M2 will be discussed in greater detail at a later point.

In the illustrated embodiment, the second link 342 has an upper protruding portion 342a that extends upward to overlap with a portion of the cable fixing structure 322. The upper protruding portion 342a is disposed adjacent to the input link 324. The upper protruding portion 342a serves as a shield member to protect the space between the input link 324 and the second link 342 from debris. During a gear shifting operation to move the chain C from the first sprocket S1 to the second sprocket S2, the input link 324 receives a pulling force from the operation cable 14, which is transmitted to the first link 340 via the extension link 346 and the connecting link 366. In this way, the amount of force transmitted from the input link 324 to the second link 342 is reduced as compared to a conventional front derailleur in which the operation cable is attached to the outer link (the second link). Because the operation cable 14 is not directly attached to the second link 342 of the derailleur 312, the second link 342 experiences less strain during a gear shifting operation as compared to conventional front derailleurs. Thus, the second link 342 of the illustrated embodiment can be constructed out of plastic, instead of having to be constructed out of metal. This construction of the second link 342 allows the derailleur 312 to be more lightweight.

As previously mentioned, the first and second adjusting members M1 and M2 are disposed on the first link 340 of the linkage assembly 320. In the illustrated embodiment, the first and second adjusting members M1 and M2 are adjustment screws configured to allow a rider to adjust the range of movement of the chain guide 318 during gear shifting as well as the angular orientation of the linkage assembly 320. In the illustrated embodiment, the first adjusting member M1 is configured to restrict a movement of the chain guide 318 at one of the retracted position and the extended position of the chain guide 318. The second adjusting member M2 is configured to adjust of the other of the retracted position and the extended position of the chain guide 318. In other words, the first and second adjusting members M1 and M2 are configured to adjust the range of movement of the chain guide stroke between the retracted position and the extended position during a gear shilling operation. In addition, adjustment of the first and second adjusting members M1 and M2 permits a rider to operatively configure the derailleur 312 such that the bicycle chain C runs optimally between the chain receiving slot of the chain guide 318. In the illustrated embodiment, the first and second adjusting members M1 and M2 are threaded screws.

Figure 40:
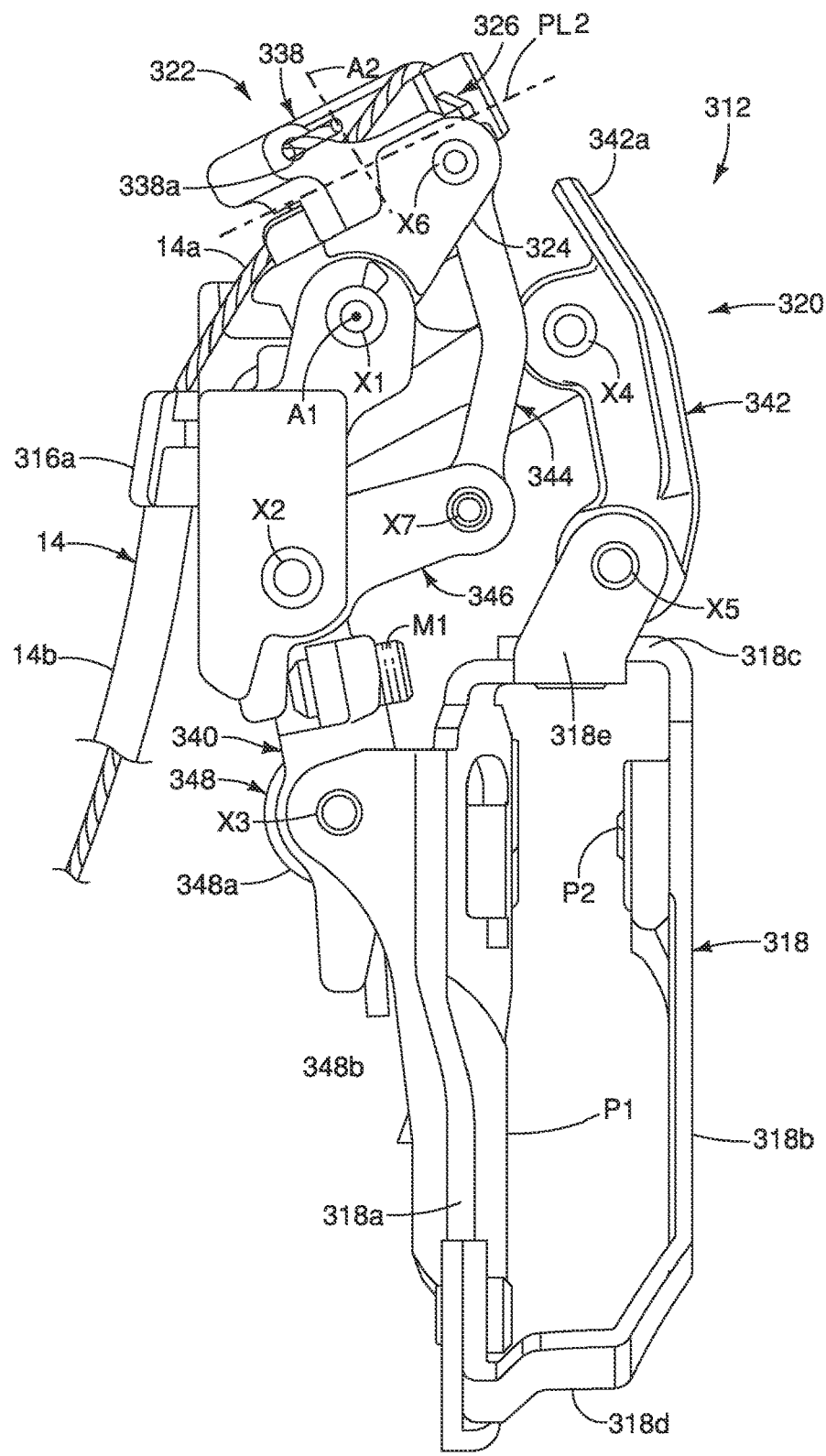
FIG. 40 is a rear elevational view of the front derailleur illustrated in FIGS. 31 to 39 with the chain guide in the extended position.
Figure 41:
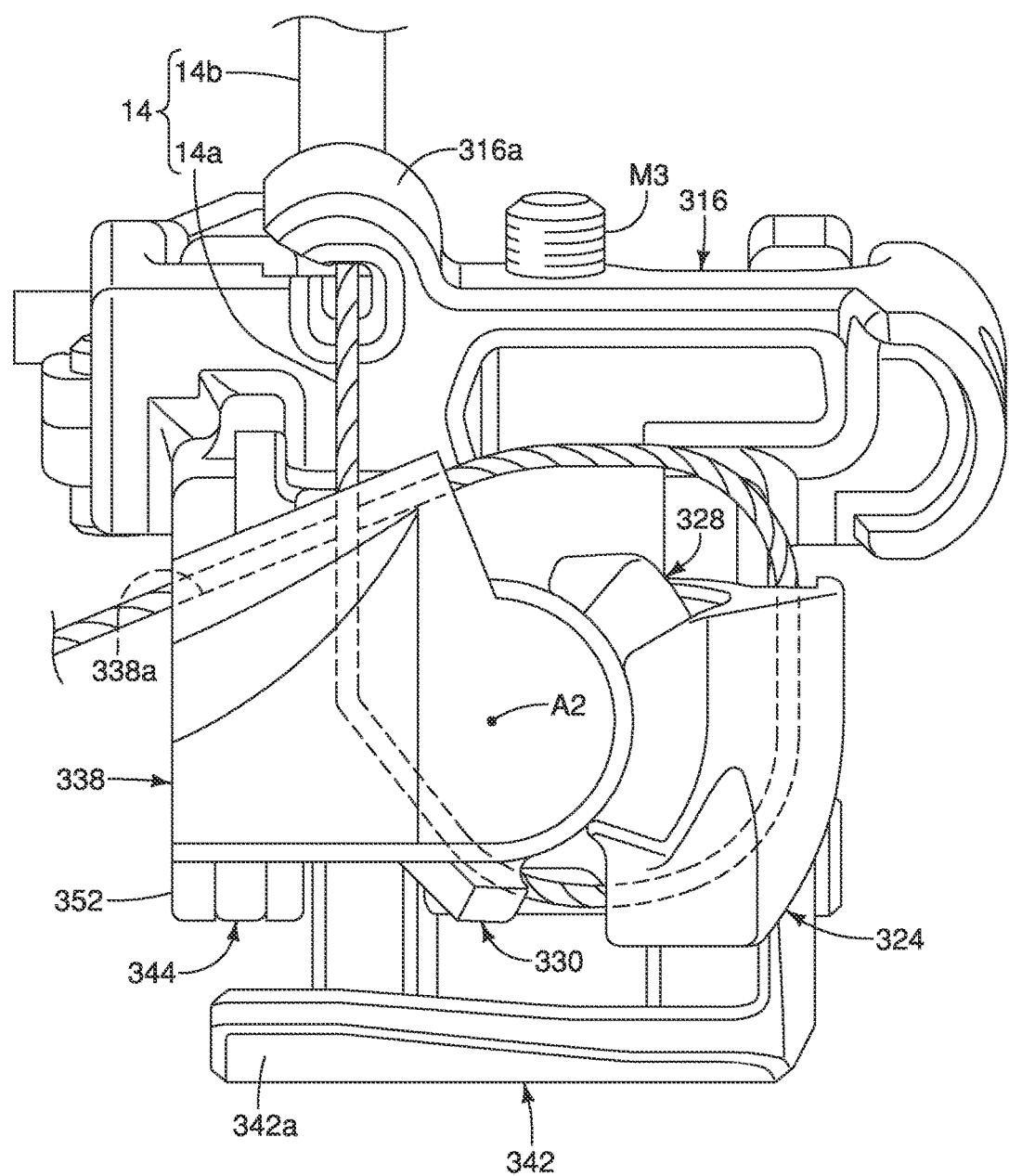
FIG. 41 is a top view of selected parts of the front derailleur illustrated in FIGS. 31 to 39 showing the attachment of an inner wire to the bicycle cable fixing structure.

Specifically, the first adjusting member M1 is screwed into a first threaded bore of the first link 340, while the second adjusting member M2 is screwed into a second threaded bore of the first link 340. A rider can adjust the first adjusting member M1 by means of a tool (not shown) to screw the first adjusting member M1 into and out of the first link 340. Also, as with the first adjusting member M1, a rider can adjust the second adjusting member M2 by means of a tool (not shown) to screw the second adjusting member M2 into and out of the first link 340. In the illustrated embodiment, the first adjusting member M1 is configured to contact the base member 316 to define the retracted position of the chain guide 318. That is, the location of the first adjusting member M1 determines the starting position of a bicycle gear shift operation in which the derailleur 312 shifts from the retracted state (FIG. 39) to the extended state (FIG. 40). In other words, the location of the first adjusting member M1 determines the rest position of the chain guide 318. It will be apparent to those skilled in the art from this disclosure that the first adjusting member M1 can also be configured to contact the chain guide 318 to restrict the retracted or extended position of the chain guide 318. The first adjusting member M1 can be conventionally known as a limit-stop screw because it adjusts one of the starting or end limit of the chain guide 318 during a gear shifting operation. In the illustrated embodiment, the first adjusting member M1 is a low adjust limit-stop screw because it adjusts the retracted or rest position of the chain guide 318. In this manner, the first adjusting member M1 also adjusts the range of movement of the chain guide 318 during a gear shifting operation.

The degree to which the second adjusting member M2 extends out of the first link 340 determines the angular orientation of the extension link 346 with respect to the first link 340. Thus, by adjusting the second adjusting member M2, a rider can adjust the angular orientation of the extension link 346 with respect to the first link 340. Specifically, the second adjusting member M2 is configured to adjust the relative angular orientation between the first link 340 and the extension link 346 about the second pivot axle X2. In this way, the second adjusting member M2 contacts the extension link 346 when the chain guide 318 is in either the retracted position (FIG. 37) or the extended position (FIG. 38). Adjusting the angular orientation of the extension link 346 will in turn adjust the angular orientation of the connecting link 366 and the input link 324. In this manner, a rider may fine tune the derailleur 312 such that the sufficient shifting force to shift the chain C from the small chain ring S1 to the large chain ring S2 is obtained and the sprockets are optimally oriented between the chain receiving slot of the chain guide 318.

The base member 316 has an adjustment member M3 that is threaded into a threaded hole in the base member 316, and has a free end that abuts against the bracket B or the bicycle frame F. By screwing or unscrewing the support member M3, the angle of the chain guide 318 can be adjusted with respect to the longitudinal, vertical center plane. The support member M3 can support the base member 316 so that the base member 316 does not move relative to the bicycle frame F during a shifting operation of the chain guide from the retracted position to the extended position.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a bicycle in an upright, riding position and equipped with the chain tensioning device. Accordingly, these directional terms, as utilized to describe the chain tensioning device should be interpreted relative to a bicycle in an upright riding position on a horizontal surface and that is equipped with the bicycle front derailleur. The terms "left" and "right" are used to indicate the "right" when referencing from the right side as viewed from the rear of the bicycle, and the "left" when referencing from the left side as viewed from the rear of the bicycle.

Also it will be understood that although the terms "first" and "second" may be used herein to describe various components these components should not be limited by these terms. These terms are only used to distinguish one component from another. Thus, for example, a first component discussed above could be termed a second component and vice-a-versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle derailleur comprising:
   a base member configured to be mounted to a bicycle frame;
   a chain guide configured to be movable between a retracted position and an extended position with respect to the base member;
   a linkage assembly operatively coupling the chain guide to the base member; and
   a cable fixing structure configured to fix an operation cable that moves the linkage assembly in response to an operation of the operation cable, the cable fixing structure being mounted to one of the chain guide and the linkage assembly, and the cable fixing structure including:
   a cable attachment member to which the operation cable is fixed, the cable attachment member being movable with respect to the one of the chain guide and the linkage assembly in a state where the operation cable is fixed to the cable attachment member,
   a fastener configured to fix the operation cable to the cable attachment member, the fastener extending through the cable attachment member in a direction of a fixing axis, the fastener being rotatably mounted in a fixing direction about the fixing axis to fix the operation cable to the cable attachment member, and
   a cable tension adjusting structure configured to move the cable attachment member relative to the one of the chain guide and the linkage assembly, the cable tension adjusting structure including an adjusting member to adjust a position of the cable attachment member with respect to the one of the chain guide and the linkage assembly about the fixing axis.

2. The bicycle derailleur according to claim 1, wherein the cable fixing structure is mounted to the linkage assembly.

3. The bicycle derailleur according to claim 1, wherein the adjusting member is a screw that is threaded into a bore of the one of the chain guide and the linkage assembly.

4. The bicycle derailleur according to claim 1, wherein the adjusting member is configured to abut an abutment of the cable attachment member for restricting a movement of the cable attachment member in a cable releasing direction.

5. The bicycle derailleur according to claim 1, wherein the cable attachment member is configured to be movable in a cable pulling direction in the state where the operation cable is fixed to the cable attachment member.

6. The bicycle derailleur according to claim 1, wherein the cable attachment member includes a restricting structure that is configured to selectively restrict a movement of the cable attachment member in a cable pulling direction.

7. The bicycle derailleur according to claim 6, wherein the restricting structure includes a first tool access portion, which is configured for a tool to access in order to restrict the movement of the cable attachment member in the cable pulling direction.

8. The bicycle derailleur according to claim 7, wherein the cable fixing structure includes a cable tension adjusting structure configured to move the cable attachment member relative to the one of the chain guide and the linkage assembly,
the cable tension adjusting structure includes an adjusting member to adjust a position of the cable attachment member with respect to the one of the chain guide and the linkage assembly, and
the adjusting member includes a second tool access portion, which is configured for the tool to access to operate the adjusting member, the first and second tool access portions have profiles configured such that the tool can access both the first and second tool access portions.

9. The bicycle derailleur according to claim 7, wherein the cable fixing structure includes a cable tension adjusting structure configured to move the cable attachment member relative to the one of the chain guide and the linkage assembly,
the cable tension adjusting structure includes an adjusting member to adjust a position of the cable attachment member with respect to the one of the chain guide and the linkage assembly, and
the adjusting member includes a second tool access portion, which is configured for a tool to access to operate the adjusting member, the second tool access portion being arranged relative to the one of the chain guide and the linkage assembly to prohibit the tool from accessing the second tool access portion while the chain guide is positioned in one of the retracted position and the extended position.

10. The bicycle derailleur according to claim 1, wherein the cable attachment member is rotatably mounted around the fixing axis.

11. The bicycle derailleur according to claim 10, wherein the cable fixing structure includes a cable tension adjusting structure configured to move the cable attachment member relative to the one of the chain guide and the linkage assembly,
the cable tension adjusting structure includes an adjusting member to adjust a position of the cable attachment member with respect to the one of the chain guide and the linkage assembly, and the adjusting member is configured to abut an abutment of the cable attachment member to define an angular position of the cable attachment member about the fixing axis.

12. The bicycle derailleur according to claim 1, wherein the cable fixing structure is free of an outer casing holder in which an end of an outer casing of the operation cable is held.

13. The bicycle derailleur according to claim 1, wherein the cable attachment member includes a cable clamping portion to which the operation cable is clamped, the cable attachment member being configured to selectively rotate in a cable pulling direction and a cable releasing direction by the operation of the adjusting member.

14. The bicycle derailleur according to claim 1, further comprising
a cover configured to be detachably attached to the one of the chain guide and the linkage assembly to cover the cable fixing structure.

15. The bicycle derailleur according to claim 14, wherein the cover includes a cable holder configured to hold an end of the operation cable.

16. A bicycle derailleur comprising:
a base member configured to be mounted to a bicycle frame;
a chain guide configured to be movable between a retracted position and an extended position with respect to the base member;
a linkage assembly operatively coupling the chain guide to the base member; and
a cable fixing structure configured to fix an operation cable that moves the linkage assembly in response to an operation of the operation cable, the cable fixing structure being mounted to one of the chain guide and the linkage assembly, and the cable fixing structure including:
a cable attachment member to which the operation cable is fixed, the cable attachment member being movable with respect to the one of the chain guide and the linkage assembly in a state where the operation cable is fixed to the cable attachment member,
a cable tension adjusting structure configured to move the cable attachment member relative to the one of the chain guide and the linkage assembly, the cable tension adjusting structure including an adjusting member to adjust a position of the cable attachment member with respect to the one of the chain guide and the linkage assembly, and
a fastener configured to fix the operation cable to the cable attachment member, the fastener extending through the cable attachment member in a direction of a fixing axis, the adjusting member being configured to abut an abutment of the cable attachment member to define an angular position of the cable attachment member about the fixing axis configured to move the cable attachment member relative to the one of the chain guide and the linkage assembly, the cable attachment member being rotatably mounted around the fixing axis, the fastener being rotatably mounted in a fixing direction about the fixing axis to fix the operation cable to the cable attachment member, the adjusting member being disposed at a downstream side of the abutment with respect to the fixing direction, the cable attachment member being rotatably mounted around the fixing axis.

17. The bicycle derailleur according to claim 16, wherein the linkage assembly includes a first link pivotally coupled to the base member about a mounting axis, the fixing axis extends along a second reference plane that is perpendicular to the mounting axis.

18. The bicycle derailleur according to claim 16, wherein the adjusting member includes a second tool access portion, which is configured for a tool to access to operate the adjusting member, the second tool access portion being accessibly arranged relative to the one of the chain guide and the linkage assembly to allow the tool to access the second tool access portion while the chain guide is positioned in the retracted position and while the chain guide is positioned in the extended position.

19. The bicycle derailleur according to claim 16, wherein the adjusting member includes a second tool access portion, which is configured for a tool to access to operate the adjusting member, the second tool access portion being accessibly arranged relative to the one of the chain guide and the linkage assembly to allow the tool to access the second tool access portion from a side opposite to the bicycle frame in a state where the base member is mounted to the bicycle frame.

20. A bicycle derailleur comprising:
a base member configured to be mounted to a bicycle frame;
a chain guide configured to be movable between a retracted position and an extended position with respect to the base member;
a linkage assembly operatively coupling the chain guide to the base member, the linkage assembly including first and second links pivotally coupling the chain guide to the base member, and an input link pivotally mounted to the base member about a fixing axis that is offset from a pivot axis of the first link and a pivot axis of the second link to transmit a pulling force of the operation cable to one of the first and second links, the cable fixing structure is mounted to the input link; and
a cable fixing structure configured to fix an operation cable that moves the linkage assembly in response to an operation of the operation cable, the cable fixing structure being mounted to one of the chain guide and the linkage assembly, and the cable fixing structure including:
a cable attachment member to which the operation cable is fixed, the cable attachment member being movable with respect to the one of the chain guide and the linkage assembly in a state where the operation cable is fixed to the cable attachment member, the cable attachment member being rotatably mounted to the input link.

21. The bicycle derailleur according to claim 20, wherein the linkage assembly includes at least one connecting link operatively connecting the input link to one of the first and second links.

22. The bicycle derailleur according to claim 20, wherein the cable fixing structure includes a cable tension adjusting structure configured to move the cable attachment member relative to the input link,
the cable tension adjusting structure includes an adjusting member to adjust a position of the cable attachment member with respect to the input link, and
the adjusting member is a screw that is threaded into a bore of the input link.

* * * * *